US008539455B2

(12) United States Patent
Berg et al.

(10) Patent No.: US 8,539,455 B2
(45) Date of Patent: Sep. 17, 2013

(54) SYSTEM FOR AND METHOD OF CAPTURING PERFORMANCE CHARACTERISTICS DATA FROM A COMPUTER SYSTEM AND MODELING TARGET SYSTEM PERFORMANCE

(75) Inventors: Erik Berg, Lidingo (SE); Erik Hagersten, Uppsala (SE); Hakan Zeffer, Santa Clara, CA (US); Magnus Vesterlund, Stockholm (SE); Mats Nilsson, Taby (SE); Mikael Petterson, Koping (SE)

(73) Assignee: Rogue Wave Software, Inc., Boulder, CO (US)

( * ) Notice: Subject to any disclaimer, the term of this patent is extended or adjusted under 35 U.S.C. 154(b) by 1472 days.

(21) Appl. No.: 12/055,996

(22) Filed: Mar. 26, 2008

(65) Prior Publication Data
US 2008/0244533 A1  Oct. 2, 2008

Related U.S. Application Data

(60) Provisional application No. 60/908,122, filed on Mar. 26, 2007.

(51) Int. Cl.
*G06F 9/44* (2006.01)
*G06F 15/00* (2006.01)
*G06F 12/00* (2006.01)

(52) U.S. Cl.
USPC ............................ 717/131; 711/147; 712/225

(58) Field of Classification Search
None
See application file for complete search history.

(56) References Cited

U.S. PATENT DOCUMENTS

| 5,452,440 A | 9/1995 | Salsburg |
| 5,564,015 A | 10/1996 | Bunnell |
| 5,940,855 A | 8/1999 | Kayes et al. |

(Continued)

FOREIGN PATENT DOCUMENTS

| EP | 0 919 923 A2 | 6/1999 |
| EP | 0919923 | 6/1999 |

(Continued)

OTHER PUBLICATIONS

Marin, Gabriel and John Mellor-Crummey. "Cross-Architecture Performance Predictions for Scientific Applications Using Parameterized Models," Jun. 12, 2004. ACM SIGMETRICS Performance Evaluation Review, vol. 32 issue 1. pp. 2-13.*

(Continued)

*Primary Examiner* — Insun Kang
*Assistant Examiner* — Erika Kretzmer

(57) ABSTRACT

A system, method, and computer program product that captures performance-characteristic data from the execution of a program and models system performance based on that data. Performance-characterization data based on easily captured reuse distance metrics is targeted. Reuse distance for one memory operation may be measured as the number of memory operations that have been performed since the memory object it accesses was last accessed. Separate call stacks leading up to the same memory operation are identified and statistics are separated for the different call stacks. Methods for efficiently capturing this kind of metrics are described. These data can be refined into easily interpreted performance metrics, such as performance data related to caches with LRU replacement and random replacement strategies in combination with fully associative as well as limited associativity cache organizations. Methods for assessing cache utilization as well as parallel execution are covered. The method includes modeling multithreaded memory systems and detecting false sharing coherence misses.

20 Claims, 25 Drawing Sheets

(56) References Cited

U.S. PATENT DOCUMENTS

| | | | |
|---|---|---|---|
| 6,347,366 | B1 | 2/2002 | Cousins |
| 6,493,810 | B1 | 12/2002 | Pang et al. |
| 6,557,167 | B1 | 4/2003 | Thelen |
| 6,651,153 | B1 | 11/2003 | Orfali |
| 6,742,084 | B1 | 5/2004 | Defouw et al. |
| 6,952,664 | B1 | 10/2005 | Lahiri et al. |
| 7,032,214 | B1 | 4/2006 | Rodrigues et al. |
| 7,363,450 | B1 | 4/2008 | Fedorova |
| 2002/0091763 | A1 | 7/2002 | Shah et al. |
| 2004/0148152 | A1 | 7/2004 | Horikawa |
| 2004/0260517 | A1 | 12/2004 | Ding et al. |
| 2005/0049847 | A1 | 3/2005 | Miyamoto et al. |
| 2005/0086650 | A1 | 4/2005 | Yates et al. |
| 2005/0120341 | A1 | 6/2005 | Blumenthal et al. |
| 2005/0132336 | A1 | 6/2005 | Gotwals et al. |
| 2005/0177633 | A1 | 8/2005 | Plunkett |
| 2005/0278145 | A1 | 12/2005 | Yamamoto |
| 2005/0283765 | A1 | 12/2005 | Warren et al. |
| 2006/0048101 | A1 | 3/2006 | Krassovsky et al. |
| 2006/0090040 | A1 | 4/2006 | Eschmann |
| 2006/0101421 | A1 | 5/2006 | Bodden et al. |
| 2007/0234307 | A1* | 10/2007 | Luk et al. .................. 717/130 |
| 2009/0055594 | A1 | 2/2009 | Berg et al. |
| 2009/0125465 | A1 | 5/2009 | Berg et al. |

FOREIGN PATENT DOCUMENTS

| | | |
|---|---|---|
| EP | 1 026 591 A2 | 8/2000 |
| EP | 1026591 | 8/2000 |
| WO | WO-2004/061620 A2 | 7/2004 |

OTHER PUBLICATIONS

Berg, Erik, and Erik Hagersten, "Fast data-locality profiling of native execution." Jun. 6, 2005. ACM SIGMETRICS Performance Evaluation Review, vol. 33, No. 1. pp. 169-180.*

Berg, Erik, and Erik Hagersten. "SIP: Performance Tuning through Source Code Interdependence" 2002. Springer-Verlag Euro-Par '02 Proceedings of the 8th International Euro-Par Conference on Parallel Processing. pp. 177-186.*

Berg E., et. al., "Fast data-locality profiling of native execution" ACM SIGMETRICS Performance Evaluation Review, vol. 33, No. 1, Jun. 2005, pp. 169-180.

Noordergraaf L., et. al., "SMP System Interconnect Instrumentation for Performance Analysis" Supercomputing, ACM/IEEE 2002 Conference Nov. 16-22, 2002, Piscataway, NJ, USA, IEEE, Nov. 16, 2002, pp. 53-53.

Communication Relating to the Results of the Partial International Search. Issued May 20, 2008. During the prosecution of International Application No. PCT/US2007/013169.

Beyls, K. et al. "Reuse Distance as a Metric for Cache Behavior," Proceedings of PDCS'01. Parallel and Distributed Computing and Systems. Aug. 21, 2001.6 pages.

European Office Action mailed Oct. 13, 2010, directed to European Patent Application No. 07 795 719.9; 5 pages.

International Search Report and Written Opinion, mailed Jul. 15, 2008, directed to International Patent Application No. PCT/US07/84365; 9 pages.

Berg, E. et al., "Low Overhead Spatial and Temporal Data Locality Analysis." Department of Information Technology, Uppsala University, Technical Report 2003-57, Nov. 2003, Uppsala, Sweden.

Berg, E. et al., "StatCache: A Probabilistic Approach to Efficient and Accurate Data Locality Analysis," Department of Information Technology, Technical Report, 2003-58, Uppsala University, Nov. 2003, Uppsala, Sweden.

International Search Report and Written Opinion, mailed May 18, 2009, directed to International Patent Application No. PCT/IB08/03292; 11 pages.

International Preliminary Report on Patentability, mailed Jan. 13, 2009, directed to International Patent Application No. PCT/US2007/013169; 11 pages.

International Preliminary Report on Patentability, mailed May 12, 2009, directed to International Patent Application No. PCT/US2007/084365; 11 pages.

European Office Action, dated Jun. 19, 2009, directed to European Patent Application No. 07 795 719.9; 5 pages.

Anderson, J., et al. (Nov. 4, 1997). "Continuous Profiling: Where Have All the Cycles Gone?" *ACM Transactions on Computer Systems*. 15(4):357-390.

Berg, E. et al. "SIP: Performance Tuning Through Source Code Interdependence" In Proceedings of the $8^{th}$ International Euro-Par Conference (Euro-Par 2002). Paderborn, Germany. 177-186. Aug. 2002.

Beyls, K. et al. "Visualization Enables the Programmer to Reduce Cache Misses." In Proceedings of Conference on Parallel and Distributed Computing and Systems. 2002.

Browne, S. et al. "A Scalable Cross-Platform Infrastructure for Application Performance Tuning Using Hardware Counters." In Proceedings of International Conference on SuperComputing. *IEEE*. 2000.

Buck, B. et al. "Using Hardware Performance Monitors to Isolate Memory Bottlenecks." In Proceedings of International Conference on SuperComputing. *IEEE*. 2000.

Cascaval, C. et al. "Estimating Cache Misses and Locality Using Stack Distances." *ICS'03. ACM*. In Proceedings of International Conference on SuperComputing. San Francisco, California, USA. Jun. 23-26, 2003.

Chilimbi, T. et al. "Dynamic Hot Data Stream Prefetching for General-Purpose Programs." *PLDI'02.ACM*. Berlin, Germany. Jun. 17-19, 2002.

Chilimbi, T. "Efficient Representations and Abstractions for Quantifying and Exploiting Data Reference Locality." *ACM SIGPLAN '01*. Conference on Programming Language Design and Implementation (PLDI). Jun. 2001.191-202.

Conte, T. et al. (1998). "Combining Trace Sampling with Single Pass Methods for Efficient Cache Simulation." *IEEE Transactions on Computers*. 47(6):714-720.

DeRose, L. et al. "SIGMA: A Simulator Infrastructure to Guide Memory Analysis." In Proceedings of International Conference on SuperComputing. IEEE. 2002.

Eustace, A. et al. (1995). "ATOM: A Flexible Interface for Building High Performance Program Analysis Tools." USENIX Winter. 303-314.

Gecsei, J. et al. (1970). "Evaluation Techniques for Storage Hierarchies." *IBM Systems Journal*.9(2):78-117.

Ghosh, S. et al. (Jul. 4, 1999). "Cache Miss Equations: A Compiler Framework for Analyzing and Tuning Memory Behavior." *ACM Transactions on Programming Languages and Systems*. 21(4):703-746.

ltzkowitz, M. et al. "Memory Profiling Using Hardware Counters." *SC'03 ACM*. 1-13. In Proceedings of SuperComputing. Nov. 15-21, 2003, Phoenix, Arizona, USA.

Kessler, R. E. et al. (Sep. 1991). "A Comparison of Trace-Sampling Techniques for Multi-Megabyte Caches." *IEEE Transaction on Computers*. 43(6):664-675.

Laha, S. et al. (Nov. 1988). "Accurate Low-Cost Methods for Performance Evaluation of Cache Memory Systems." *IEEE Transactions on Computers*. 37(11):1325-1336.

Larus, J. R. et al. "EEL: Machine-Independent Executable Editing." *SIGPLAN* Conference on Programming Language Design and Implementation (PLDI). Jun. 1995; pp. 291-300.

Lebeck, A. et al. (Jun. 1994). "Cache Profiling and the SPEC Benchmarks: A Case Study." *IEEE Transactions on Computers*.27(10):15-26.

Maebe, J. et al."DIOTA: Dynamic Instrumentation, Optimization and Transformation of Applications." In Compendium of Workshops and Tutorials. Held in conjunction with International Conference on Parallel Architectures and Compilation Techniques. Sep. 2002.

Magnusson, P. S. et al."SimICS/sun4m: A Virtual Workstation." In Proceedings of the Usenix Annual Technical Conference.119-130. 1998.

Marin, G. et al. "Cross-Architecture Performance Predictions for Scientific Applications Using Parameterized Models." *SIGMETRICS/Performance '04*. In Proceedings of Joint International Conference on Measurement and Modeling of Computer Systems. New York, New York, USA. Jun. 12-16, 2004.

Martonosi, M. et al. "MemSpy: Analyzing Memory System Bottlenecks in Programs." ACM SIGMETRICS In Proceedings on Conference on Measurement and Modeling of Computer Systems. 1992.

Martonosi, M. et al. (Apr. 1995). "Tuning Memory Performance of Sequential and Parallel Programs." IEEE Computer. 28(4):32-40.

Mellor-Crummey, J. et al. "Tools for Application-Oriented Performance Tuning." 15th ACM In Proceedings of the International Conference on SuperComputing. Sorrento, Italy. Jun. 2001; 154-165.

Mohan, T. et al. "Identifying and Exploiting Spatial Regularity in Data Memory References." In Proceedings of the ACM/IEEE Conference on SuperComputing (SC'03).2003; 12 pages.

Perelman, E. et al. "Picking Statistically Valid and Early Simulation Points." In Proceedings of the International Conference on Parallel Architectures and Compilation Techniques (PACT). Sep. 2003; 12 pages.

Perelman, E. et al. "Using SimPoint for Accurate and Efficient Simulation." In Proceedings of the SIGMETRIC '03/ACM. San Diego, California, USA. Jun. 10-14, 2003; 2 pages.

Petoumenos, P. et al. "Modeling Cache Sharing on Chip Multiprocessor Architectures." In Proceedings of the 2006 IEEE International Symposium of Workload Characterization, San Jose, California, USA. 2006; 160-171.

Petoumenous, P. et al. "STATSHARE: A Statistical Model for Managing Cache Sharing via Decay." In 2006th Workshop on Modeling, Benchmarking and Simulation held in conjunction with the 33rd Annual International Symposium on Computer Architecture. Boston, Massachusetts, USA. Jun. 2006.

Rosenblum, M. et al. (Jan. 1, 1997). "Using the SimOS Machine Simulator to Study Complex Computer Systems." *ACM Transactions on Modeling and Computer Simulation.* 7(1):78-103.

Uhlig, R. et al. "Trap-Driven Simulation with Tapeworm II." 6th International Conference on Architectural Support for Programming Languages and Operating Systems (ASPLOS-VI). San Jose, California, USA. Oct. 5-7, 1994. 132-144.

Vera, X. et al. "Let's Study Whole-Program Cache Behaviour Analytically." In Proceedings of 8th International Symposium on High-Computer Architecture. 2002.

Wood, D. et al. "A Model for Estimating Trace-Sample Miss Ratios." Conference on Measurement and Modeling of Computer Systems. ACM SIGMETRICS Evaluation Review. 91(1).May 21-24, 1991; 79-89.

Wunderlich, R. et al. "SMARTS: Accelerating Microarchitecture Simulation via Rigorous Statistical Sampling." In Proceedings of International Symposium of Computer Architecture. 2003.

Zhong, Y. et al. "Miss Rate Prediction Across All Program Inputs." In Proceedings of Parallel Architectures and Compilation Techniques. 2003.

SPEC: Standard Performance Evaluation Corporation. Available at http://www.spec.org; printed Jun. 22, 2010; 2 pages.

Intel VTune: Performance Analyzer 9.1 for Windows and Linux. Available at: http://www.intel.com/software/products/vtune; printed Jun. 22, 2010; 2 pages.

Berg, E. et al. "StatCache: A Probabilistic Approach to Efficient and Accurate Data Locality Analysis." 2004 IEEE International Symposium on Performance Analysis of Systems and Software, Austin, TX., Mar. 10-12, 2004, p. 20-27.

Berg, E. et al. (Jun. 2005). "Fast Data-Locality Profiling of Native Execution." *ACM SIGMENTRICS Performance Evaluation Review.* 33 (1):169-180.

Noordergraaf, L. et al. "SMP System Interconnect Instrumentation for Performance Analysis." *Supercomputing, The Computer Society.* Proceedings of the IEEE/ACM SC2002 Conference. Nov. 16, 2002. p. 1-9.

Berg, E. et al. "A Statistical Multiprocessor Cache Model." 2006 IEEE International Symposium on Performance Analysis of Systems and Software, Austin, TX. Mar. 19, 2006. p. 89-99.

International Search Report and Written Opinion, mailed Dec. 22, 2008, directed to related International Patent Application No. PCT/US2007/013169; 22 pages.

* cited by examiner

Example from a Multithreaded Execution

Thread J:  | A | B | C | C | B | D | A | E | B | . | . |
Global order: 1  3  5  7  9  11  13  15  17  19  21  23 reuse distance = 5
reuse distance = 3

Thread K: | G | A | H | G | I | I | B | K | B | . | . |
Global order: 2  4  6  8  10  12  14  16  18  120  22  24 time →

*Fig. 23*

SYSTEM FOR AND METHOD OF CAPTURING PERFORMANCE CHARACTERISTICS DATA FROM A COMPUTER SYSTEM AND MODELING TARGET SYSTEM PERFORMANCE

RELATED APPLICATIONS

The present application claims the benefit of the earlier filing date of U.S. provisional patent application No. 60/908,122 filed Mar. 26, 2007 in accordance with 35 U.S.C. §119(e), Article 4 of the Paris Convention for the Protection of Industrial Property, and Article 8(1) of the Patent Cooperation Treaty, as applicable.

BACKGROUND OF THE INVENTION

1. Field of the Invention

The present application relates in general to systems, methods and software for analyzing, parallelizing, debugging, optimizing and profiling computer systems and, more specifically to capturing application characteristic data from the execution of a system or multiple systems, and modeling system behavior based on such data.

2. Description of the Related Art

Increasing demands to improve software efficiency with ever-increasing system complexity have dictated the use of tools to evaluate target software operation, identify inefficiencies, suggest and/or implement improvements, optimize software operation, etc. Optimization and profiling tools often embed monitoring code into the target software under scrutiny and/or create a real or simulated (e.g., model) run-time environment that interacts with the target software to analyze its operation. See, for example, "StatCache: A Probabilistic Approach to Efficient and Accurate Data Locality Analysis", E. Berg and E. Hagersten, Technical report 2003-58 Dept. of Information Technology, Uppsala University, Uppsala, Sweden, November 2003, Proceedings of the 2004 IEEE International Symposium on Analysis of Systems and Software (ISPASS-2004), Austin, Tex., USA, March 2004; "Low Overhead Spatial and Temporal Data Locality Analysis", E. Berg and E. Hagersten, Technical report 2003-57 Dept. of Information Technology, Uppsala University, Uppsala, Sweden, November 2003; and, A Statistical Multiprocessor Cache Model by Erik Berg, Hakan Zeffer, and Erik Hagersten. In Proceedings of the 2006 IEEE International Symposium on Analysis of Systems and Software (ISPASS-2006), Austin, Tex., USA, March 2006, each of which is incorporated herein by reference in its entirety.

Other publications applicable to the related technology include:
STATSHARE: A Statistical Model for Managing Cache Sharing via Decay by Pavlos Petoumenos, Georgios Keramidas, Håkan Zeffer, Stefanos Kaxiras, and Erik Hagersten. In 2006th Workshop on Modeling, Benchmarking and Simulation held in conjunction: with the 33rd Annual International Symposium on Computer Architecture, Boston, Mass. USA, June, 2006.
Modeling Cache Sharing on Chip Multiprocessor Architectures by Pavlos Petoumenos, Georgios Keramidas, Håkan Zeffer, Erik Hagersten, and Stefanos Kaxiras. In Proceedings of the 2006 IEEE International Symposium of Workload Characterization: San Jose, Calif., USA, 2006.

An ideal profiling tool should have low run-time overhead and high accuracy, it should be easy and flexible to use, and it should provide the user with intuitive and easily interpreted information. Low run-time overhead and high accuracy are both needed to efficiently locate bottlenecks with short turn-around time, and the ease-of use requirement excludes methods which need cumbersome experimental setups or special compilation procedures.

It is unfortunately hard to combine all the requirements above in a single method. For example methods based on hardware counters usually have a very low run-time overhead, but their flexibility is limited because hardware parameters like cache and TLB sizes are defined by the host computer system. Simulators on the other hand are very flexible but are usually slow. At worst, they may force the use of reduced data sets or otherwise unrepresentative experiment setups that give misleading results.

There are a variety of methods to perform cache behavior studies. These include simulation, hardware monitoring, statistical methods and compile-time analysis. Compile-time analysis tools [35][8] estimate cache miss ratios by statically analyzing the code and determine when cache misses occur. Compile-time analysis major advantage is that it doesn't require the program to be executed, and can potentially be parameterized in terms of workloads etc. Its drawback is that it is limited to relatively well-structured codes where for example loop limits are known at compile time.

Cache simulators may be driven by instrumented code [13, 14, 20, 21, 23, 26, 27], on source code [17] or machine code levels, or the cache simulator incorporated in a full system simulator [24][22]. Their major limitation is their large slowdown. Simulation-based analysis can possibly combined with sampling (see below) to reduce the runtime overhead.

Cache-sampling techniques include set sampling and time sampling. In time sampling a cache model simulates continuous sub-traces from the complete access trace.

This is explored in papers [11, 15, 18, 19, 36]. It works well for smaller caches, but the need for long warm-up periods makes time sampling less suitable for large caches. The problem of selecting statistically representative samples is explored in Perelman et al.[32] Set sampling is another approach, were only a fraction of the sets in a set-associative cache is simulated [11, 18]. It generally suffers from poor accuracy and can only be used as a rough estimate.

More recently, sampling guided by phase detection has been proposed [31, 37]. The idea is based on the observation that most applications have different phases during their execution. Within each phase, the system performs in a fairly invariant (often repetitive) way. Guided by phase detection algorithms, very sparse samples can still provide a representative behavior for the entire execution. While most work on phase-guided sampling has been targeting detailed pipeline simulation, similar techniques could also be applied to memory system modeling. Cutting down the number of samples for time-sampling of caches could turn out to be especially valuable, since the need to warm the large caches requires so many memory operations per sample. Phase detection could also work well together with our tool. Phase detection could guide us to sample more or less often during the execution which could cut back on out runtime overhead further. The fact that we do not need to warm the caches before our model is valid further speaks in our favor.

Hardware counters are available on most modern computers. Events that can be counted include L1 and L2 cache misses, coherence misses and number of stall cycles. Examples of use include DCPI [1], which uses an advanced hardware support to collect detailed information to the programmer, PAPI [6] which is a common programming interface to access hardware monitoring aids, and several commercial tools [12, 16]. Histogramming and tracing hardware may be used to detect for example cache conflicts [30] and locate problem areas [7]. Their limitations are mainly that only architectural parameters realized on the hardware may be studied, and that it can be hard to capture entities not directly present in the hardware, such as spatial locality. Trap-driven trace generation has also been suggested [34]. It can trace unmodified code, but requires OS modification.

Other approaches to describe and quantify memory behavior include the concept of data streams or strides. Information about data streams can be used to guide prefetching [9][10] and help choose between optimizations such as tiling, prefetching and padding[29]. Abstract cross-platform models for analyzing and visualizing cache behavior exist [25, 5, 38], mostly based on a reuse distance definition similar to the stack distance [28].

[1] J. Anderson, L. Berc, J. Dean, S. Ghemawat, M. Henzinger, S. Leung, D. Sites, M. Vandevoorde, C. Waldspurger, and W. Weihl. Continuous profiling: Where have all the cycles gone? ACM Transactions on Computer Systems, 1997.
[2] E. Berg and E. Hagersten. SIP: Tuning through Source Code Interdependence. In Proceedings of the 8th International Euro-Par Conference (Euro-Par 2002), pages 177-186, Paderborn, Germany, August 2002.
[3] E. Berg and E. Hagersten. StatCache: Low-Overhead Spatial and Temporal Data Locality Analysis Technical report 2003-57, Department of information technology, Uppsala University, Sweden, 2003.
[4] E. Berg and E. Hagersten. StatCache: A probabilistic approach to efficient and accurate data locality analysis. In Proceedings of International Symposium on Analysis of Systems And Software, 2004.
[5] K. Beyls, E. D'Hollander, and Y. Yu. Visualization enables the programmer to reduce cache misses. In Proceedings of Conference on Parallel and Distributed Computing and Systems, 2002.
[6] S. Browne, J. Dongarra, N. Garner, K. London, and P. Mucci. A scalable cross-platform infrastructure for application tuning using hardware counters. In Proceedings of SuperComputing, 2000.
[7] B. Buck and J. Hollingsworth. Using hardware monitors to isolate memory bottlenecks. In Proceedings of Supercomputing, 2000.
[8] C. Cascaval and D. A. Padua. Estimating cache misses and locality using stack distances. In Proceedings of International Conference on Supercomputing, 2003.
[9] T. M. Chilimbi. Efficient representations and abstractions for quantifying and exploiting data reference locality. In SIGPLAN Conference on Programming Language Design and Implementation, pages 191-202, 2001.
[10] T. M. Chilimbi. Dynamic hot data stream prefetching for general-purpose programs. In PLDI, 2002.
[11] T. M. Conte, M. A. Hirsch, and W. W. Hwu. Combining trace sampling with single pass methods for efficient cache simulation. IEEE Transactions on Computers, 47(6):714-720, 1998.
[12] Intel Corporation. Intel VTune Analyzers http://www.intel.com/software/products/vtune/.
[13] L. DeRose, K. Ekanadham, and J. K. Hollingsworth. Sigma: A simulator infrastructure to guide memory analysis. In Proceedings of SuperComputing, 2002.
[14] A. Eustace and A. Srivastava. ATOM: A flexible interface for building high program analysis tools. In USENIX Winter, pages 303-314, 1995.
[15] S. Ghosh, M. Martonosi, and S. Malik. Cache miss equations: a compiler framework for analyzing and tuning memory behavior. ACM Transactions on Programming Languages and Systems, 21(4):703-746, 1999.
[16] M. Itzkowitz, B. J. N. Wylie, C. Aoki, and N. Kosche. Memory profiling using hardware counters. In Proceedings of Supercomputing, 2003.
[17] R. Fowler J. Mellor-Crummey and D. Whalley. Tools for application-oriented tuning. In Proceedings of the 2001 ACM International Conference on Supercomputing, 2001.
[18] R. E. Kessler, M. D. Hill, and D. A. Wood. A comparison of trace-sampling techniques for multi-megabyte caches. IEEE Transactions on Computers, 43(6):664-675, 1994.
[19] S. Laha, J. A. Patel, and R. K. Iyer. Accurate low-cost methods for evaluation of cache memory systems. IEEE Transactions on computers, 1988.
[20] J. R. Larus and E. Schnarr. EEL: Machine-independent executable editing. In SIGPLAN Conference on Programming Language Design and Implementation, pages 291-300, 1995.
[21] A. R. Lebeck and D. A. Wood. Cache profiling and the SPEC benchmarks: A case study. IEEE Computer, 27(10): 15-26, 1994.
[22] S. Devine M. Rosenblum, E. Bugnion and S. Herrod. Using the simos machine simulator to study complex systems. ACM Transactions on Modelling and Computer Simulation, 7:78-103, 1997.
[23] J. Maebe, M. Ronsse, and K. De Bosschere. DIOTA: Dynamic instrumentation, optimization and transformation of applications. In Compendium of Workshops and Tutorials. Held in conjunction with International Conference on Parallel Architectures and Compilation Techniques, September 2002.
[24] P. Magnusson, F. Larsson, A. Moestedt, B. Werner, F. Dahlgren, M. Karlsson, F. Lundholm, J. Nilsson, P. Stenström, and H. Grahn. SimICS/sun4m: A virtual workstation. In Proceedings of the Usenix Annual Technical Conference, pages 119-130, 1998.
[25] G. Marin and J. Mellor-Crummey. Cross-architecture predictions for scientific applications using parameterized models. In Proceedings of Joint International Conference on Measurement and Modeling of Computer Systems, pages 2-13, New York, N.Y., June 2004.
[26] M. Martonosi, A. Gupta, and T. Anderson. Memspy: Analyzing memory system bottlenecks in programs. In Proceedings of International Conference on Modeling of Computer Systems, pages 1-12, 1992.
[27] M. Martonosi, A. Gupta, and T. E. Anderson. Tuning memory of sequential and parallel programs. IEEE Computer, 28(4):3240, 1995.
[28] R. L. Mattson, J. Gecsei, D. R. Slutz, and I. L. Traiger. Evaluation techniques for storage hierarchies. IBM Systems Journal, 9(2):78-117, 1970.
[29] T. Mohan, B. R. de Supinski, S. A. McKee, F. Mueller, A. Yoo, and M. Schultz. Identifying and exploiting spatial regularity in data memory access. In Proceedings of Supercomputing, 2003.
[30] L. Noordergraaf and R. Zak. Smp system interconnect instrumentation for analysis. In Proceedings of Supercomputing, 2002.
[31] E. Perelman, G. Hamerly, M. Van Biesbrouck, T. Sherwood, and B. Calder. Using SimPoint for accurate and efficient simulation. In Proceedings of SIGMETRICS, 2003.
[32] E. Perelman, G. Hamerly, and B. Calder. Picking statistically valid and early simulation points. In Proceedings of Parallel Architectures and Compilation Techniques, 2003.
[33] SPEC. Standard evaluation corporation http://www.spec.org/.

[34] R. Uhlig, D. Nagle, T. N. Mudge, and S. Sechrest. Trap-driven simulation with tapeworm II. In Proceedings of Architectural Support for Programming Languages and Operating Systems, pages 132-144, 1994.
[35] X. Vera and J. Xue. Let's study whole-program cache behaviour analytically. In Proceedings of 8$^{th}$ International Symposium on High-Computer Architecture, 2002.
[36] D. A. Wood, M. D. Hill, and R. E. Kessler. A model for estimating trace-sample miss ratios. ACM SIGMETRICS Evaluation Review, 19(1), May 21-24, 1991.
[37] R. E. Wunderlich, T. F. Wenisch, B. Falsafi, and J. C. Hoe. SMARTS: Accelerating microarchitecture simulation via rigorous statistical sampling. In Proceedings of International Symposium of Computer Architecture, 2003.
[38] Y. Zhong, S. G. Dropsho, and C. Ding. Miss rate prediction across all program inputs. In Proceedings of Parallel Architechtures and Compilation Techniques, 2003.

CHECK: BRIEF SUMMARY OF THE INVENTION

Embodiments of the invention are directed toward computer system measuring techniques used for estimating the behavior of some application running on a specific piece of hardware or hardware platform. Another object of embodiments of the invention includes identifying a specific problem related to a specific piece of software with respect to one or many different hardware architectures, or to find opportunities to dynamically adjust the functionality of the system to avoid some problems.

More specifically, systems, methods and techniques according to various aspects of the invention may be directed toward targeting efficient techniques for capturing representative characteristics data associated with a piece of software and to using this data for modeling computer hardware in a way that can translate that characteristic into measurements (e.g., "numbers") and/or for identifying problems and opportunities.

Thus, an object of the invention is to provide a tool for the evaluation software that can be used to enhance of the target software. One embodiments of the invention focus on such parameters as Memory Access and identify ways to predict cache misses and their associated slow Memory Access. A preferred embodiment of the invention is a software profiling tool. All forms of caches, including but not limited to disk caches, web caches, the caching of virtual memory to physical memory, TLB translation caches, and the caching functionality of branch target buffers, can be targeted using the described techniques, even though the examples used herein are for ease of illustration alone, centered around caches used in memory systems.

According to one aspect of the invention, embodiments employ statistical modeling as an alternative to or in addition to hardware-counter-based and simulation-based approaches. Such methods have the potential to satisfy demands for flexibility, speed and ease-of-use.

Further, methods according to various embodiments of the invention can be parameterized since they do not rely on the host hardware configuration, are potentially very fast because they can be based on sparse sampling and can also provide a simple and efficient user environment.

Further aspects, features, objectives and advantages of the present invention can be found in the publications "Fast Data-Locality Profiling of Native Execution", E. Berg and E. Hagersten, SIGMETRICS '05, June 6-10, Banff, Alberta, Canada and "A statistical Multiprocessor Cache Model", E. Berg, H. Zeffer and E. Hagersten, Uppsala University, Department of Information Technology, Uppsala, Sweden, March, 2006, each of which is incorporated by reference in their entirety.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

According to one aspect of the invention emphasizing a sampling feature, a method of gathering memory usage information may include the steps of starting the execution of a sequence of operations in response to a program of instructions; selecting a set of the operations to be monitored; recording access information associated with respective operations of the set of operations and identifying one or more memory objects; enabling a trap mechanism to detect one or more next operations accessing one or more of the memory objects; and recording information about the next operations. The program of instructions may be any set of executables, commands, directives, etc. that may be read and control the operation of a computer or other programmable apparatus.

The step of selecting may be accomplished randomly, implement some set of rules, or otherwise target certain types, classes, categories and/or specified operations to be monitored. For example, operations targeted and selected for monitoring may be those (i) requiring some threshold number of machine cycles to execute and/or memory accesses; (ii) subject to some threshold value of repeated executions such as present within an inner loop of a program; (iii) identified as a bottleneck to the execution of multiple subsequent instructions; and/or having some other characteristic that may be relevant to program performance.

According to a feature of the invention, the step of storing access information may further include storing an identity of the one of more memory objects being accessed. The identity may be a relative or absolute memory address of the memory object, a variable name associated with the memory object, a link referencing the memory object, a value or variable name stored in or associated with the memory object, etc.

According to another feature of the invention, the step of enabling a trap mechanism may include enabling a hardware device to provide a signal indicative of the next operations accessing the one or more of the memory objects. This may include using a breakpoint register or some other device that is not directly used by the program and storing a breakpoint corresponding to the one or more of the memory objects in the breakpoint or other register. The hardware device may include logic for detecting an attempted access to a designated portion of or location in memory and, as a result, generating an interrupt such as a hardware interrupt signal, etc.

According to another feature of the invention, the step of enabling a trap mechanism may include enabling an externally provided trap mechanism to detect the one or more next operations accessing the one or more of the memory objects. The externally provided trap mechanism may be in the form of software, such as a shell or operating system, and/or hardware, e.g., a breakpoint register and related logic.

According to another aspect of the invention including a cold miss feature, a method of estimating the amount of memory objects used by a programs sequence may include the steps to gather memory usage information followed by followed by the steps of estimating the fraction of the monitored instruction for which no corresponding next instruction was detected; and multiplying that fraction with the total number of operations executed by the program sequence.

The step of estimating the fraction of monitored instructions for which no corresponding next instruction may be performed by assessing the number of initiated trap mechanisms that still have not found any other instruction accessing the same memory object as the corresponding selected operation when the end of the program sequence is reached.

According to another feature the memory space used by the program may be estimated by identifying the monitored instruction for which no corresponding next instruction was detected and compute the sum their memory objects sizes.

According to another aspect of the invention including a random replacement feature, a method of estimating cache miss rate for a cache system including the steps of: executing a sequence of accesses to a memory system; recording reuse distance information for a selected fraction of memory accesses of this sequence; and solving an unknown miss rate variable from an equation equating the total number of memory accesses multiplied by the unknown miss rate, with the number of unique memory objects in the sequence plus the sum of the miss probabilities for the selected of memory accesses divided by the fraction of memory accesses for which reuse distance information was recorded.

Reuse distance for one memory operation may be measured as the number of memory operations that have been performed since the memory object it accesses was last accessed. The number of unique memory objects accessed in the sequence may be estimated by the number of cold misses in the sequence.

According to another aspect of the invention incorporating stack distance features, a method of estimating a number of unique memory objects touched for a segment of a program of instructions include the steps of; executing the program and estimating a representative reuse distance distribution for memory operations of the studied segment; estimating the amount of memory operation performed during the segment; for each number between that amount and one, use the distribution to calculate the probability a memory operation of has a reuse distance larger than the number; and add all those probabilities together. The number of unique memory object touched is sometimes referred to as stack distance.

A representative reuse distribution may be comprised of the a histogram based on reuse distance from a randomly chosen set of memory operations executed during, or reasonably close to, the studied segment. In some situations, the reuse distribution of memory operations collected during the entire execution may be sufficient for this task. For each bucket in the histogram, the population number recorded is divided by the fractions between the number of randomly chosen memory operations and the total number of memory operations executed during the timeframe from which the random selection was made.

In one feature of the invention the ability to estimate the number of unique memory objects accessed during a segment of the execution may be used in the following steps to estimate the miss rate of an LRU cache: finding the smallest reuse distance value for which the number of unique memory object is larger than the number of memory objects that can be stored in the cache; and calculating the fraction of memory operations of said reuse distribution with a reuse value larger than said number.

According to another aspect of the invention, an apparatus may provide the functionalities and perform the methods and steps according to the above described features and aspects of the invention as further set forth below by way of example.

Thus, according to another aspect of the invention, an apparatus for gathering memory usage information may include a processor operating to execute a sequence of operations in response to the program; selecting logic for selecting a set of operations from the sequence of operations; monitoring logic for monitoring respective operations of the set of operations; a first memory storing access information associated with respective operations of the set of operations including an identify one or more memory objects being accessed by respective ones of the set of operations; a trap mechanism operable to detect one or more next operations accessing one or more of the memory objects; and a second memory storing access information about the next operations. The processor may be part of, for example, a conventional computer such as a personal computer, workstation, mainframe, etc, capable of reading and executing the program of instructions. The selecting and/or monitoring logic may be software, firmware, and/or hardware, or any combination thereof capable of performing or causing to be performed the recited steps and/or operations. The first and second memories may be the same or different portions of one or more physical or virtual devices, e.g., registers or memory locations, etc.

According to a feature of the invention, the selecting logic may be further operable to enable an imprecise hardware trap with a maximum skid of S operations to signal S operations before one of the next operations is executed, and to advance the execution using a technique having less skid, until the one next operation is reached.

According to another feature of the invention wherein the first memory stores the access information about the selected set of operations, such information may include one or more pieces of information selected from the group consisting of: (i) identities of the selected operations; (ii) identities of the memory objects; (iii) memory addresses being accessed; (iv) identities of memory operations following next after respective ones of the selected set of operations; and (v) identities of memory operations preceding before respective ones of the selected set of operations.

According to another feature of the invention wherein the first memory stores the access information about the next operations, such information may include one or more pieces of information selected from the group consisting of: (i) identities of the next operations; (ii) identities of the memory objects; (iii) memory addresses being accessed; (iv) identities of memory operations following next after respective ones of the next operations; and (v) identities of memory operations preceding before respective ones of the next operations.

According to another feature of the invention, the apparatus may further include estimating logic (e.g., programming, software, hardware, firmware, or other means for performing or causing to be performed the recited steps or processes) for estimating an amount of memory objects used by the sequence of instructions including estimating logic for estimating a fraction of the monitored instructions for which no next instruction is detected; and a multiplier for multiplying the fraction with a total number of the operations executed by the sequence of instructions.

According to another feature of the invention, the apparatus may further include estimating logic for estimating an amount of memory space used by the sequence of operations including identifying logic for identifying the monitored instruction for which no the next instruction is detected; and an adder for summing each memory object size accessed for each the identified instruction to form a total.

According to another feature of the invention, the apparatus may further include estimating logic for estimating an amount of cache space used by the sequence of operations wherein a memory object size is equal to a cache line size of the cache, the step of estimating further including estimating logic for estimating a fraction of the monitored instruction for which no next instruction is detected; and a multiplier for multiplying the fraction with a total number of the operations executed by the program sequence and the memory object size of the cache.

According to another feature of the invention, an apparatus or estimating a cache miss rate for a cache system may include a processor for executing a sequence of accesses to a memory system; a memory storing reuse distance information for a selected fraction of the memory accesses of the sequence; and logic for solving an unknown miss rate variable from an equation equating the total number of memory accesses multiplied by the miss rate, with a number of unique memory objects in the sequence plus a sum of the miss probabilities for the selection fraction of memory accesses divided by the fraction.

According to another feature of the invention, an apparatus for estimating a number of unique memory objects accessed for a segment of a program of instructions may include a processor for executing the program and estimating a representative reuse distance distribution for memory operations of the segment; estimating logic for estimating an amount of memory operations performed during the segment; logic using the reuse distance distribution to calculate, for each natural number between the amount and the number one, a probability a memory operation of the distribution has a reuse distance larger than the natural number; and an adder for adding all the probabilities together.

According to another aspect of the invention, a computer readable medium may include code including instructions for implementing and/or performing the methods, steps and actions set forth above. Thus, by way of example, according to another aspect of the invention, a computer readable medium may include code for gathering memory usage information, the code including instructions for executing a sequence of operations in response to a program of instructions; selecting a set of the operations to be monitored; storing access information associated with respective operations of the set of operations including an identity of corresponding operations accessing each of one or more memory objects; enabling a trap mechanism to detect one or more next operations accessing one or more of the memory objects; and recording information about the next operations. The computer readable medium may be, for example, random access memory, read only memory, permanent and removable magnetic and/or optical storage devices and media, etc.

According to another aspect of the invention, a computer readable medium may include code for gathering memory usage information, the code including instructions for starting to execute a sequence of operations in response to the program; selecting a set of operations from the sequence of operations; monitoring respective operations of the set of operations; recording access information associated with respective operations of the set of operations and identifying one or more memory objects being accessed by respective ones of the set of operations; enabling a trap mechanism operable to detect one or more next operations accessing one or more of the memory objects; and recording access information about the next operations.

According to a feature of the invention, the code for selecting a set of operations further may include code for enabling an imprecise hardware trap with a maximum skid of S operations to signal S operations before one of the next operations is executed, and to advance the execution using a technique having less skid, until the one next operation is reached.

According to another feature of the invention, code may be included for estimating an amount of memory objects used by the sequence including instructions for estimating a fraction of the monitored instructions for which no next instruction is detected; and multiplying the fraction with a total number of the operations executed by the sequence of instructions.

According to another feature of the invention, code may be included for estimating an amount of memory space used by the sequence including instructions for identifying the monitored instruction for which no the next instruction is detected; and summing to form a total of each memory object size accessed for each the identified instruction.

According to another feature of the invention, code may be included for estimating an amount of cache space used by the sequence of operations wherein a memory object size is equal to a cache line size of the including instructions for estimating a fraction of the monitored instruction for which no next instruction is detected; and multiplying the fraction with a total number of the operations executed by the program sequence and the memory object size of the cache.

According to another aspect of the invention, a computer readable medium may include code for estimating a cache miss rate for a cache system, the code including instructions for executing a sequence of accesses to a memory system; recording reuse distance information for a selected fraction of the memory accesses of the sequence; and solving an unknown miss rate variable from an equation equating the total number of memory accesses multiplied by the miss rate, with a number of unique memory objects in the sequence plus a sum of the miss probabilities for the selection fraction of memory accesses divided by the fraction.

According to another aspect of the invention, a computer readable medium may include code for estimating a number of unique memory objects accessed for a segment of a program of instructions, the code including instructions for executing the program and estimating a representative reuse distance distribution for memory operations of the segment; estimating an amount of memory operations performed during the segment; for each natural number between the amount and the number one, using the reuse distance distribution to calculate a probability a memory operation of the distribution has a reuse distance larger than the natural number; and adding all the probabilities together.

According to another aspect of the invention a method of recording memory usage information for a program of instructions includes the steps of starting to execute a sequence of operations in response to the program of instructions; selecting a set of operations from the sequence of operations; recording memory usage information associated with respective operations of the set of operations; wherein at least one of the steps of starting, selecting and recording is implemented by modifying the sequence of operations after the execution has started to provide a modified sequence of operations having functionality enabling the at least one step, wherein the modified sequence of operations is re-modified again to remove the enabling functionality after at least one of the steps of starting, selecting and recording has been performed so as to provide a re-modified sequence of operations.

According to a feature of the invention the re-modified sequence of operations executes faster than the modified sequence of operations.

According to another feature of the invention the re-modification is performed in response to a completion of activity of at least one of the steps of starting, selecting and recording.

According to another feature of the invention the re-modification is performed after it has been determined that at least one of the steps of starting, selecting and recording should not presently be performed.

According to another feature of the invention the re-modified sequence of operations is identical to the sequence of operation of the program of instructions.

According to another feature of the invention the step of recording memory usage information further includes recording an identity of an instruction of the program corresponding to a selected operation of the selected set of operations.

According to another feature of the invention the step of recording memory usage information further includes recording an identity of a data object accessed by a selected operation of the selected set of operations.

According to another feature of the invention the sequence of operations are partitioned into groups of operations and at least one group of the groups of operation is re-modified between executing two such the groups of operations.

According to another aspect of the invention a method of reconstructing a sequence of instructions executed by a program of instructions includes the steps of starting to execute a sequence of operations in response to the program of instructions; selecting a set of operations from the sequence of operations; and, recording memory usage information associated with respective operations of the set of operations from which several partial sequences of the sequences of instructions can be determined; determining one of the partial sequences wherein a first sequence of instructions is followed by a second sequence of instructions; determining that the second sequence of instructions is followed by a third sequence of instructions; and reconstructing a longer sequence of instructions to be the first sequence followed by the second sequence followed by the third sequence.

According to another aspect of the invention a method of identifying a cycle of instructions in a program of instructions includes the steps of starting to execute a sequence of operations in response to the program of instructions; selecting a set of operations from the sequence of operations; recording memory usage information associated with respective operations of the set of operations; and identifying a partial sequence of operations from the memory usage information; wherein a cycle of instructions is identified to be a set of instructions corresponding to a cyclic set of operations of the partial sequence of operations that occur between a recurring operation and an immediately subsequent occurrence of the recurring operation, including the recurring operation.

According to another feature of the invention a further step counts a number of recorded instructions between the recurrences of the recurring operation so as to identify the number as the number of instructions executed in the cycle of instructions.

According to another feature of the invention the cycle of instructions is only considered if the cyclic set of operations all have some determined parts of their call stack identical.

According to another feature of the invention the step of identifying a partial sequence of operations includes identifying a plurality of sequences of operations and combining the plurality of sequences to form the partial sequence.

According to another feature of the invention the cycle is selectively terminated in response to the immediately subsequent operation having a part of its corresponding call stack in common with a call stack corresponding to an earlier occurrence of the recurring operation.

According to another aspect of the invention a method of identifying data-chained instructions in a program of instructions includes the steps of starting to execute a sequence of operations in response to the program of instructions; selecting a set of operations from the sequence of operations; recording memory usage information associated with respective operations of the set of operations; and based on the memory usage information, detecting an identity of a first operation of the sequence of operations accessing a data object and an identity of a second operation of the sequence of operations accessing the data object so as to identify data-chained instructions.

According to another feature of the invention a third operation associated with a third instruction is identified as accessing a same data object as either the first or the second operation and, in response, a determination is made that the third instruction is data-chained on the instructions corresponding to the first and the second operation.

According to another feature of the invention the data-chain property is only identified in response to the first, second and third operations all having at least a portion of their call stacks identical.

According to another feature of the invention the data chain is recursively extended to comprise and identify instructions belonging to the same data chain.

According to another feature of the invention it is further determined that the data object accessed by a write instruction can be used to identify the data structure accessed by a read instruction, if the write instruction and the read instruction belong to the same data chain.

According to another feature of the invention it is further determined that the a first operation and a second operation are data dependent if they belong to the same data chain and at least one of the operations is of write type.

According to another aspect of the invention a method of detecting performance shortcomings for a program of instructions includes the steps of starting to execute a sequence of operations in response to the program of instructions; selecting a set of operations from the sequence of operations; recording memory usage information associated with respective operations of the set of operations; based on the memory usage information determining for a part of the program of instructions corresponding to the set of operations, at least one of the following properties: (i) temporal reuse distance, (ii) spatial reuse distance, (iii) spatial usage; and, based on at least one of the properties determining a performance shortcoming of the program of instructions.

According to another feature of the invention the selection of set of operations corresponds to a subset of instructions of the program; wherein the subset of instructions comprises either (i) a single instruction or (ii) several instructions belonging to the same cycle of instructions and further are determined to be data-chained and wherein the at least one property and the performance shortcoming are attributed to the subset of instructions.

According to another feature of the invention the performance shortcoming is determined to be poor spatial usage if the property spatial usage, for the subset of instructions, is determined to be below a threshold. The threshold may be predetermined, static, dynamic, or otherwise determined as appropriate.

According to another feature of the invention the spatial locality is with respect to some specific cache size.

According to another feature of the invention the performance shortcoming is determined to be completely inefficient loop nesting, if for all the subsets of instructions of a loop, the respective the property spatial locality is lower than a threshold. Again, the threshold may be static or dynamic, predetermined, computed or otherwise set/established.

According to another feature of the performance shortcoming is determined to be partially inefficient loop nesting if the spatial reuse distance, for the subset of instructions, is higher than a threshold.

According to another feature of the invention the performance shortcoming is determined to be sparse data layout if the property spatial locality, for the subset of instructions, is lower than a threshold when evaluated for infinitely large caches.

According to another feature of the invention the performance shortcoming is determined to be an unused data reuse blocking opportunity, the method further comprising the steps of: identifying a spatial or temporal reuse of a data object from one instruction to itself or to another instruction in the same loop; and, establishing that either of the properties of spatial reuse distance or temporal reuse distance for the reuse of a data object is greater than a threshold.

According to another feature of the invention the performance shortcoming is determined to be unused data reuse loop fusion opportunity, the method further comprising the steps of: identifying a spatial or temporal reuse of a data object from an instruction in a first loop to an instruction in a different second loop; and establishing that either of the properties spatial or temporal reuse distance of the reuse of a data object is above a certain threshold.

According to another feature of the invention a predetermined type of the performance shortcoming is used to select a corresponding passage in a manual.

According other aspects of the invention, computer readable medium may include program code and/or instructions for causing a computer or other suitable device or platform to execute a sequence of operations for performing the steps of the methods disclosed herein.

According to further aspects of the invention, various devices are provided for performing and implementing the various methods disclosed herein, such devices including but not limited to programmable processors and computers.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims . . . .

BRIEF DESCRIPTION OF THE DRAWINGS

For a more complete understanding of the present invention, reference is now made to the following descriptions taken in conjunction with the accompanying drawing, in which:

FIG. 23 is a diagram illustrating two streams of memory references stemming from the simultaneous execution of two threads;

DESCRIPTION OF A PREFERRED EMBODIMENT

The ensuing description provides exemplary embodiments only, and is not intended to limit the scope, applicability, or configuration of the invention. Rather, the ensuing description of the exemplary embodiments will provide those skilled in the art with an enabling description for implementing an example embodiment of the invention. It should be understood that various changes may be made in the function and arrangement of elements without departing from the spirit and scope of the invention.

System Overview

Figure 1:
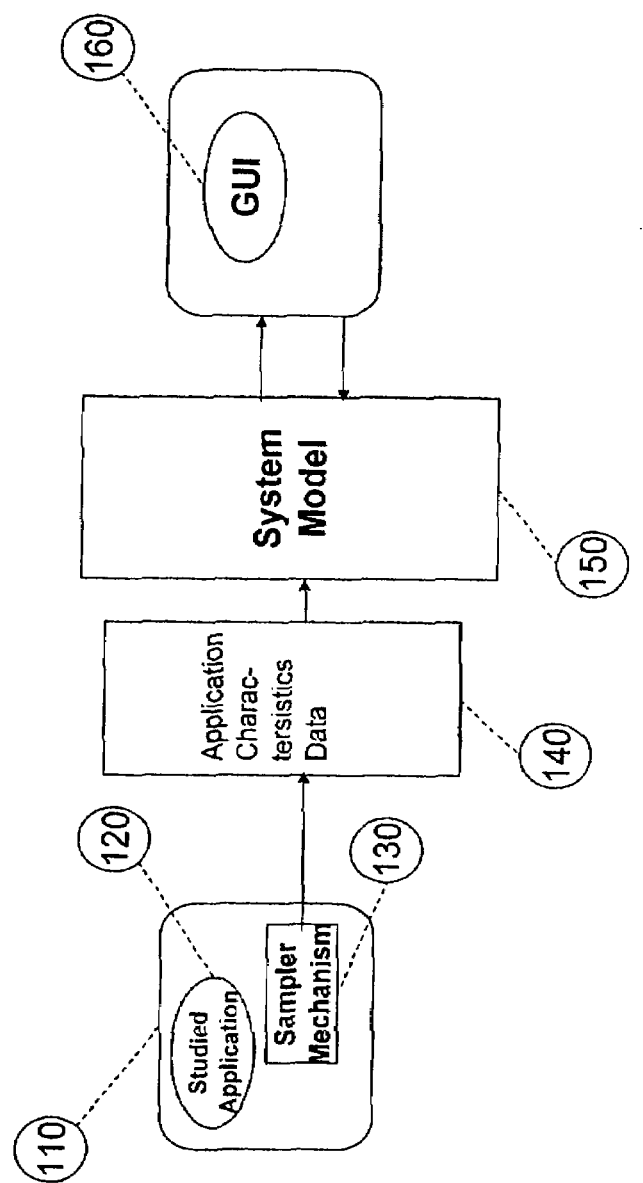
FIG. 1 is a block diagram of a system for gathering characteristics of a program using a sampler method and wherein the captured characteristics may be used as input to a system model.

FIG. 1 is a diagram of a system according to an embodiment of the invention for measuring thereof a specimen or target software or other code to be analyzed. Host Computer System 110 may be used to execute a sequence of instructions in response to a program, a group of programs or an entire system, that is the target of the analysis, here designated as Studied Application 120, for which memory usage information should be captured. The memory usage information is gathered by a sampler method, represented as Sampler Mechanism 130, and collected as Application Characteristic Data (ACD) 140. The sample method includes selective monitoring of system parameters which can be used to estimate cache usage, cache hit/miss ratio, overall software execution time, etc. ACD may for example be stored as a data file on the host Computer System 110 and may be used as input to the System Model 150, which can model the behavior of a system, such as Host Computer System 110 or other computer systems. System Model 150 determines the characteristics of the Studied Application with respect to some modeled computer system. The characteristics can be provided for display using a suitable Graphical User Interface, 160, as depicted in FIG. 1, or any other means of transferring such information. The characteristics can also be fed directly to the runtime system of Studied Application 120 to allow for on-line and/or real-time adjustments; to the operating system of Host Computer System 110: to the compiler used to produce the binary of Studied Application 120 (e.g., machine executable object code); to a virtualization layer that may be controlling system resources; or, to any other piece of the system used to produce and manage the Studied Application or any aspect of the Host Computer System it is running on. In one embodiment of the described system, the gathering of memory usage information ACD is performed at runtime while system modeling may be performed as an off-line activity.

In one embodiment, the collected ACD information is an address trace of the accesses taking place during the corresponding execution of the studied application. The recorded information of such an address trace may include, but is not limited to, the identity of each memory operation and the identity of the memory object accessed by each such operation. The information may further include the type of access performed by each operation.

In one embodiment, recording ACD information includes methods to record the corresponding identity of executed instruction of the application. In other embodiments, it further includes methods to record the identity of accessed memory object.

Figure 18:
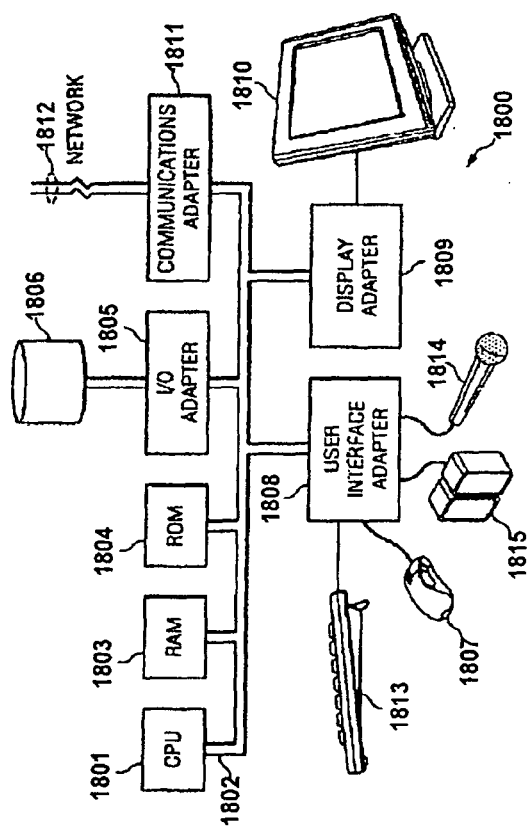
FIG. 18 is a block diagram of a computer system.

FIG. 18 is a diagram of a computer system 1800. Computer system 1800 includes a CPU 1801, a connection 1802, RAM 1803, ROM 1804, an I/O adapter 1805, a storage location 1806, a user interface adapter 1808, a display adapter 1809, a display 1810, user interface devices 1807, 1813, 1814, 1815, and a communications adapter 1811. Computer system 1800 can be coupled to a network 1812.

Gathering Memory Usage Information

Figure 2:
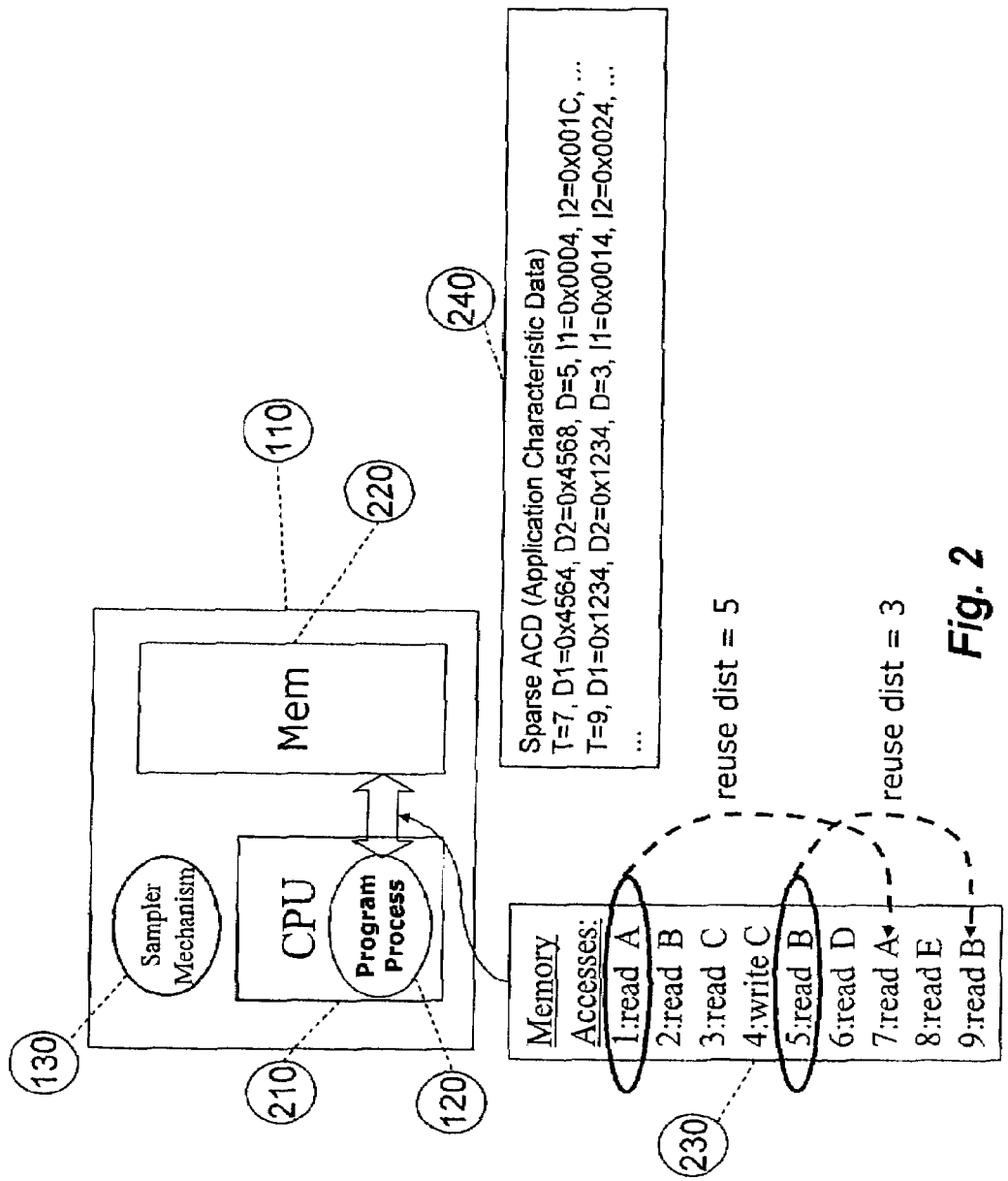
FIG. 2 is a diagram illustrating a sparse selection of samples chosen from a stream of Memory Accesses and examples of different types of characteristic data that may be recorded.

Information of memory usage of Studied Application 120 (i.e., ACD 140) is gathered by a Sampler Mechanism that monitors various system parameters including, but not limited to, for example, properties of Memory Access, etc. The activity of such a Sampler Mechanism is shown in FIG. 2. Host Computer System 110 includes at least one Central Processing Unit, CPU 210 and a Memory System 220. Memory System 220 of the Host Computer System 110 may include one or more data and instruction caches as shown in further detail in FIG. 3. Studied Application 120, for which the ACD is to be captured, is assumed to be currently executing on or under the direction of CPU 210 and continuously producing a stream of Memory Accesses 230 to Memory System 220). For ease of illustration and explanation, in the present example, nine Memory access are shown, each representing either a read or write access to one of five different Memory Objects of Memory System 210, referenced to as A-E. A Memory Object (i.e., data referenced for retrieval or storage by an operation of memory access type) may be of a fixed size, for example corresponding to the cache line size, or may be of different sizes.

While it would be possible to collect information about every Memory access in the ACD, such a Sampling Method would be very slow and produce a vast amount of data in ACD. A faster method according to embodiments of the present invention is to only collect ACD from a relatively small subset of the accesses to Memory System 220, the data from this sampling method herein references as Sparse Application Characteristic Data. The terms Sparse Application Characteristic Data and ACD used in this document can mean both full ACD information as well as sparse ACD information.

Such sparse sampling is shown for the Memory Access of FIG. 2, where the Sampling Mechanism is configured to sample Memory Access number 1 and 5 (e.g., accesses made during sampling events 1 and 2). Since only a sparse subset of Memory Access is monitored, a substantial amount of memory usage data may be gathered for each Memory Access studied, here called Sample. In one embodiment, the Sparse Application Characteristic Data is collected in completely or effectively random or pseudorandom way. If the Samples are selected in such a way that Memory Access produced by the execution event of one instruction are sampled with a higher probability than Memory Access produced by the execution event of another instruction, some types of conclusions drawn by the System Model may not be representative of actual program execution. Other embodiments include Sampling systems with a more biased selection of operations to be monitored.

One parameter targeted by embodiments of the present invention is Reuse Distance as computed based on sampled Memory Accesses of each sample, i.e., the duration between the sampled Memory Access and the next Memory Access directed to the same Memory Object in the Memory System. It should be noted that many different time units would be possible for implementing the Methods described herein for purposes of the present illustration: including but not limited to the number of instructions; wall-clock time (e.g., real-time); or system time. In one preferred embodiment, duration is measured by counting the number of intervening memory instruction.

For example, referring to FIG. 2 and Memory Access stream 230, the first and the fifth access are randomly or otherwise selected to be sampled. For the first of these Samples the Reuse Distance is five, since there are five Memory Accesses between the sampled access and the next Memory Access touching the same Memory Object (object A at time 1 and next at time 7). The Sparse ACD 240, shown to be recorded in FIG. 2, is but one example of information that may be collected in the ACD for each of the two samples including a timestamp for the second access to Memory Object A (T=7), the address accessed during the first access to Memory Object A (D1=0x4564), the address accessed the second time Memory Object A was referenced (D2=0x4568), the Reuse Distance between the Memory Access (D=5), the address of the first instruction accessing Memory Object A (I1=0x0004), and the address of the second instruction accessing Memory Object A (I12=0x001C). The corresponding information is also shown for the second Sample with reference to Memory Object B (T=9, D1=0x1234, D2=0x1234, D=3, I1=0x0014, I2=0x0024). Examples of other types of information that mat be collected, include but are not limited to, I1+: the address of the next Memory Access instruction following I1, I1−: the address of the Memory Access instruction preceding I1, CID: the identity of the current context, and CS: the call stack information with hierarchical information about the instructions from which calls were made which led to the invocation of the current function/procedure for each of the instruction addresses of the sample, etc. It should be noted that the type of information collected shown for each sample is just one of many possible combinations of information that may be collected in an ACD.

Sampling Techniques

There are several options for the implementation of Sparse Sampling Methods. One realization is based on a hardware-based implementation that randomly collects samples and records the corresponding ACD information.

Another implementation uses an instrumentation-based approach based on code instrumentation, where some of the Studied Application's instructions that accesses memory has been expanded into several instructions which add the additional functionality to perform the sample selection as well as recording the necessary ACD information for each sample. Examples of such rewriting techniques include, but are not limited to, static rewriting techniques and a dynamic rewriting technique. One technique for such an instrumentation-based sampling selection approach may be implemented as a counter which is initialized to the number of memory instructions remaining until the next sample should be taken. The counter is decremented each time a new memory instruction is executed, after which the counter's value is checked to determine if it is time to take a sample. Taking a sample mechanism may include the steps of recording of the necessary ACD data and enabling a trap for some Memory Objects in such a way that the next access to the memory objects will cause further actions of the sampling mechanism and possible collection of more ACD data.

Collection of ACD data may require special processing considerations. For example, measuring the reuse distance of a sample may require recording the corresponding data address and comparing each following memory instruction with this value in order to determine if the same data has been referenced again. If so, the number of times the counter has been incremented since the corresponding sample was initiated will determine its reuse distance. Someone skilled in the art realizes that there are many efficient alternatives for implementation of the comparison mechanisms searching the Memory Object addresses of all active watchpoint, including some hashing techniques.

Instead of explicitly implementing the trap mechanism, some externally provided trap mechanisms. The externally provided trap mechanism may be in the form of software, such as a shell or operating system, and/or hardware, e.g., a breakpoint register and related logic.

Still another method to collect ACD uses a trap-based implementation, relying on hardware counters and trap mechanisms often present in modern CPUs to implement the sampling selection as well as recording of ACD associated with the samples. Modern CPUs often have hardware counters configured or configurable to monitor various events, such as the number of memory instructions executed or the number of CPU stall cycles that have occurred. Each time such a counter reaches some maximum value or otherwise reaches some predetermined threshold, an overflow trap is generated. Such a memory instruction counter can be initiated in such a way that a trap is generated exactly when a new sample is to be taken. This method allows the Sample Mechanism 130 in FIG. 2 to be "woken up" in response to a counter-initiated trap event using such a software trap handler. In response to the counter-initiated trap event, the trap handler can determine access information, such as the address of the Memory Object being referenced or "touched" by sampled memory instruction, the address of the instruction performing the access and the point in time the attempted access was initiated or occurred.

The trap mechanism can also be enabled as a so-called Watch Point for the Memory Object containing the accessed data. A Watch Point is a mechanism often supported by an operating system, and may be supported and/or implemented in hardware. Enabling such a trap mechanism of the Watch Point will ensure a software trap is generated the next time that Memory Object with a specified address and size is touched. This way, Sample Mechanism 130 of FIG. 2 will also be woken (e.g., activated) the next time that Memory Object is touched. At such time the handler can determine the access information, such as address of the instruction making this second access to the Memory Object, and the address of the part of the Memory Object being touched. The reuse distance between the sample event and this next access to the Memory Object may also be determined by assessing the value of a hardware counter counting the number of memory instruction when the Watch Point was initiated as well as when the Watch Point trap occurred. Many alternative ways for enabling trap mechanisms to detect the next access to a Memory Object, similar to a Watch Point, exist. One method is to alter the representation of the data such that an access to it could be recognized. Examples of this include setting a recognizable signature in the EEC code associated with the Memory Object or writing some value to some other bits associated with the Memory Object which could cause a trap or be recognized by any other means by some future access.

Compensating for Skid

The exact functionality of the hardware counters and the trap mechanism available in many processors sometimes requires more elaborate methods to perform the trap-based sampling. One problem that arises is the skid property of the overflow trap, i.e., the trap may occur several cycles after the instruction generating the counter overflow. For example, an interrupt routine responsive to an overflow condition may be delayed so that subsequent interrupt processing is not timely. This is referred to as an imprecise hardware trap. To further complicate the picture, skidding often has a property that makes it more likely to stop on certain instructions than others after such an event. So, using the overflow trapping mechanism would violate the randomness property used by the modeling method according to preferred embodiments of the present invention.

One method to overcome the skidding problem is to initialize a counter (hardware or software implemented) to generate a corresponding trap several memory cycles in advance of when a target sample is to be taken, i.e., trap "too early". Turning again to FIG. 2, the sampling mechanism intending to sample instruction 5 would instead initialize the hardware counter to generate a trap for the $2^{nd}$ Memory Access of Memory Access stream 230. The skid phenomenon might result in the next ($3^{rd}$) instruction executing before the trap is generated and the sampling mechanism can be activated, but prior to the targeted fifth instruction. The sampling mechanism would read the hardware counter to determine that the sample should be taken exactly two memory instruction further down in the memory instruction stream (5−3=2). The sample mechanism would thereupon implement a more careful, but also may be more costly, method than the counter overflow trap, such as instruction single-stepping, to advance to the chosen $5^{th}$ instruction of the instruction stream.

Figure 8:
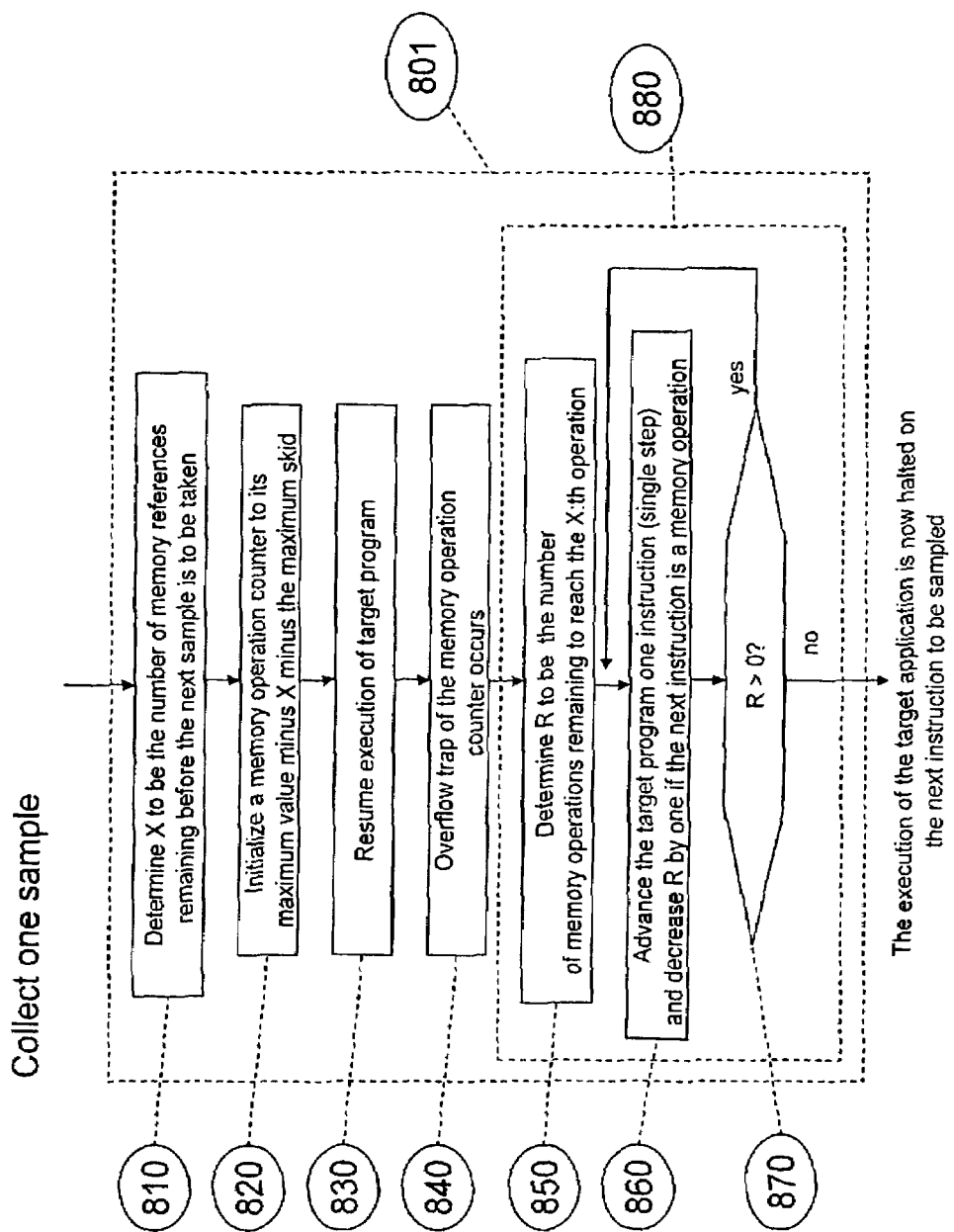
FIG. 8 is a flow chart of a method for randomly selecting one sample using a combination of hardware traps and single stepping.

A more detailed example of one method to handle the skid problem can be found in FIG. 8.

At step 810, the number of remaining Memory Access X before a sample is to be collected is determined. One way to determine X is to generate a random number between one and twice an expected average sample rate (the average ratio between monitored operations and the total number of operations), which yields a uniformly distributed random value between one and twice the designated sample rate. All other known distributions functions, such as Poison and exponential distributions, may also be candidates in this step. Furthermore, it is sometimes preferable to vary the sample rate over time, for example collecting several samples close in time to form a Sample Batch, and to place the Sample Batches further in time. Such consideration may also be incorporated in this step.

Step 820 shows one way to calculate the number of Memory Access that can safely be executed before a trap event occurs, while still guaranteeing that the corresponding trap will halt the execution of the Studied Application before the memory instruction that step 810 decided to sample, and to enable such a trap mechanism. The trap event may be based on a memory operation counter that generates an overflow trap when it reaches its maximum value, or some other available mechanisms. In one embodiment, a different kind of counter, such as an instruction counter, memory read counter or timer interrupt, may be used. It should be noted that many more sample time units than the number of Memory Access would be possible for implementing the Methods described herein for purposes of the present illustration: including but not limited to the number of instructions; wall-clock time (e.g., real-time); or system time. Examples in accordance with preferred embodiments of the present invention where the unit corresponding to the number of Memory Accesses is used, such as where the reuse distance is estimated, other kinds of suitable time units or equivalent temporal or sequence indicators may also be used, such as the time units listed above.

At step 830 the execution of the Studied Application is resumed in a "run" mode of operation wherein the Studied Application is executed normally.

Step 840 occurs at the point in time when the trap event has occurred plus the time the skid has added. In one embodiment of this step, the execution of the Studied Application is halted and a trap handler has been activated and will perform step 880, which is an alternative way of advancing the execution in a more controlled manner which may be realized as sub-steps 850 through 870.

At step 850 it is determined how many more operations should be performed before a sample is collected. This could be done by reading the memory operation counter to determine exactly how many more memory operations should be executed before the sample is taken. Another embodiment would be to calculate a random number according to some distribution function to randomly decide how many more memory operations should occur before a sample is taken.

At step 860 the execution is advanced by some known quanta. One implementation would be to advance the execution one instruction, while another possibility would be to advance the execution one memory operation. Other options include, but are not limited to, advancing several instructions or memory operations.

At step 870 it is determined if the correct (e.g., desired) number of memory operations have been executed. If not, some means of executing more memory instructions is invoked. One way of executing more instructions is to go back to step 860 again along the "yes" leg. If step 870 determines that the right number of instructions has been executed, the execution is halted on the memory operation to sample. Another embodiment would be to perform the sampling at this point without stopping the execution.

Multistepping

Figure 9:
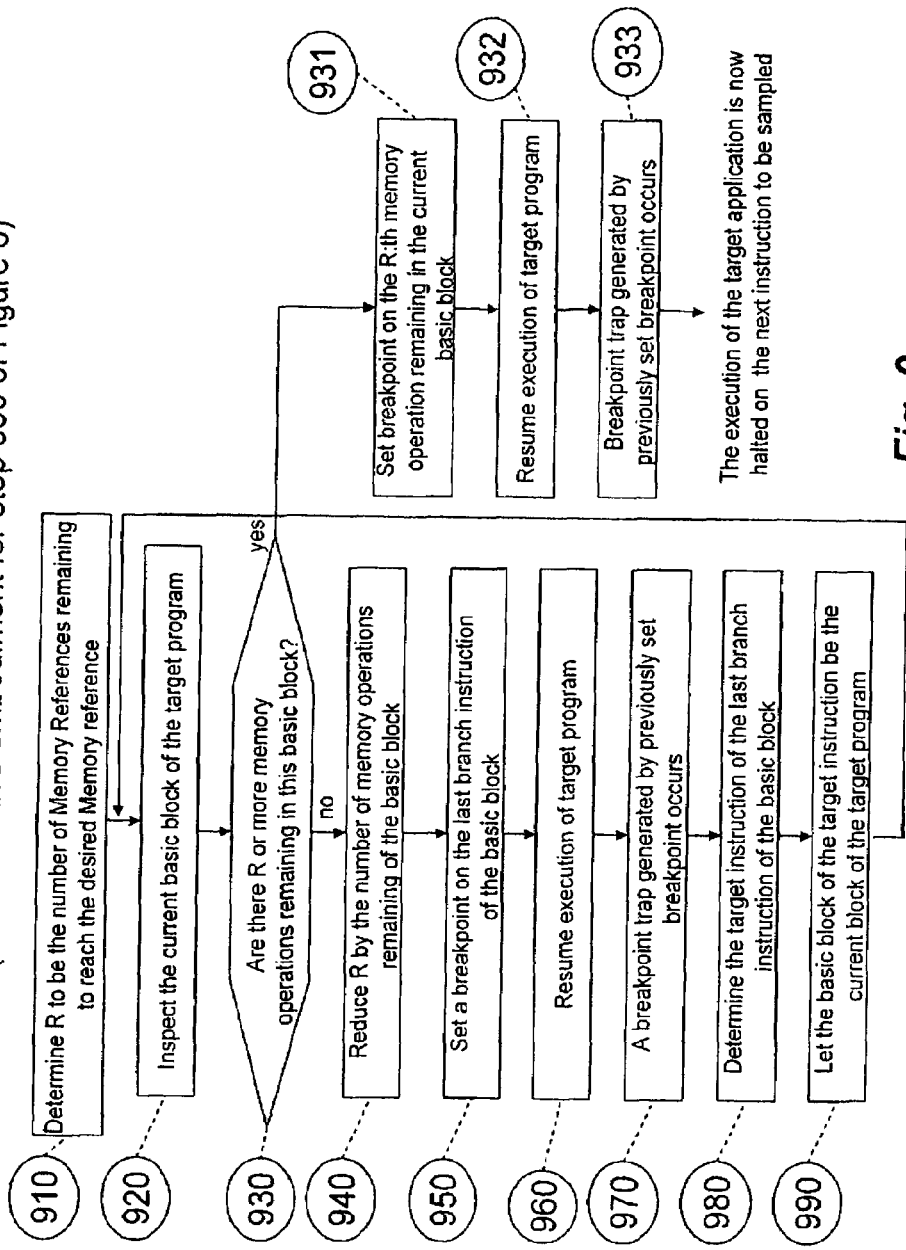
FIG. 9 is a flow chart of a method for an alternative to the single-stepping techniques of FIG. 8.

In one embodiment, step 880 is realized by the steps shown by the flow diagram of FIG. 9 illustrating a particularly efficient method for exactly advancing to the chosen memory operation.

At step 910 it is determined how many more operations of a certain type should be performed before a sample is collected. This may be implemented using similar techniques to step 850 of FIG. 8. The number of remaining operations is referred to as R.

At step 920 the instructions of the current basic block are inspected. This may be done by a disassembly function where the identity of each instruction in the basic block is decoded. At this step the number of operation of different type of the current basic block may be counted.

At step 930 it is determined if the current basic block contains R or more memory operations. If so, step 931 is the next step, as show by the right leg of 930.

At step 931 the R:th operation of the designated type in the current basic block is marked in a certain way. One way to do this is to set a breakpoint for that operation, another way would be to alter the representation of this instruction such that the operation could be recognized the next time it is executed.

At step 932 the execution of the Studied Application is resumed.

At step 933 the previously marked instruction is executed and recognized in a way that wakes up the Sampler Mechanism. In one embodiment, the execution is halted on this operation to allow for a Sample to be taken. Another embodiment would be to perform the sampling at this point without stopping the execution.

If step 930 determines that there is not R or more operations of the designated type remaining in the current basic block, 940 is the next step, as shown by the "no" leg of 930.

At step 940 the number of remaining operations of the designated type is reduced by the number operations of that type that remain in the basic block.

At step 950 the last operation of the current basic block is marked in a certain way. One way to do this is to set a breakpoint for that operation, another way would be to alter the representation of this instruction such that the operation could be recognized the next time it is executed At step 960 the execution of the Studied Application is resumed.

At step 970 the previously marked instruction is executed and recognized in a way that they wake up the Sampler.

At step 980 the next operation to be performed following the last operation of current basic block is determined. This may be done by interpreting the execution of this operation. Another embodiment would access this information directly from hardware, such as reading the "next program counter" register or some similar information. Yet another possibility include single-stepping this very instruction and then determining the address of the next instruction. Further options include disassembling the branch instruction and determining the outcome of the branch based on register and/or stack content.

At step 990 the current basic block is set to the basic block containing the next operation determined by step 980, after which step 920 is performed again.

Sampling Memory Objects of Different Sizes

Figure 3:
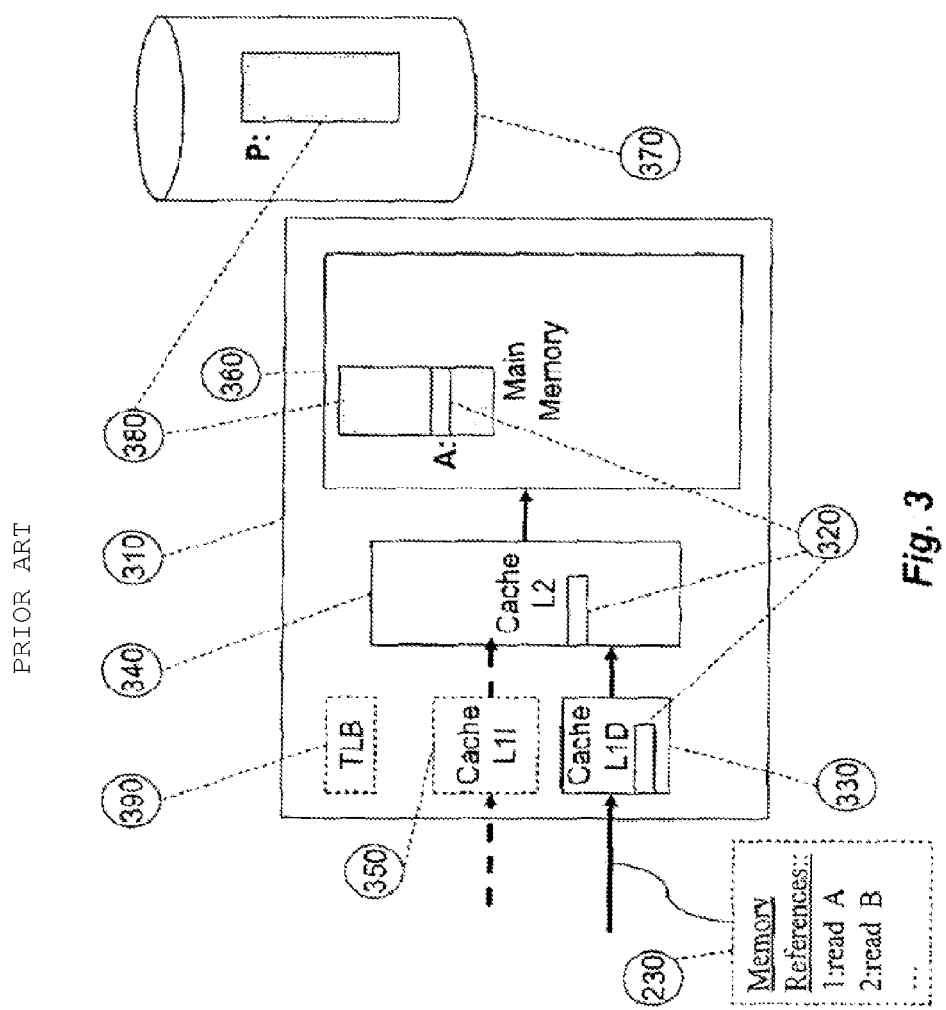
FIG. 3 is a block diagram of a prior art memory system including main and cache memories.

Some memory system models require that samples corresponding to Memory Object of several different sizes be sampled simultaneously. In some configurations one sample may require the trap mechanisms to be enabled in such a way that several Memory Object sizes are monitored. This could, for example, be required for modeling a memory system as shown in FIG. 3, if different block sizes are used, e.g., if the block size of the first level data cache 330 is 16 bytes and the block size of the second level cache 340 is 64 bytes. There are also for example situations where the explicit data object size corresponding to the size of the data read or written by the sampled memory operation should or needs to be monitored, such as monitoring accesses to one word in memory. This necessitates that ACD be collected for Memory Objects corresponding to both sizes on the Host Computer System.

One efficient way to collect ACD for Memory Objects of different sizes is to first set up the Sampler Mechanism to monitor the reuse for the largest object size, in the case of the present illustrative example, 64 bytes. Once the next reuse to this larger object has been detected it is determined if this to the largest object also accessed the smaller object (i.e., the 16 byte object). If so, the reuse of the smaller Memory Object is identical to the reuse of the larger object. If not, the sampling mechanism is configured to determine the reuse from this point in time to the next time the next smaller Memory Object is touched and calculate its reuse distance as the sum of this distance and the reuse distance of the larger object. There are several advantages to this approach over the technique of setting up a Watch Point for each memory object size. This approach only requires one active Watch Point for each sample regardless of the number of different Memory Object sizes. Furthermore, the spatial locality often present in the access pattern of a Studied Application will cause the trap generated by a large Memory Object to often also detect reuse for several of the smaller Memory Object sizes.

Figure 10:
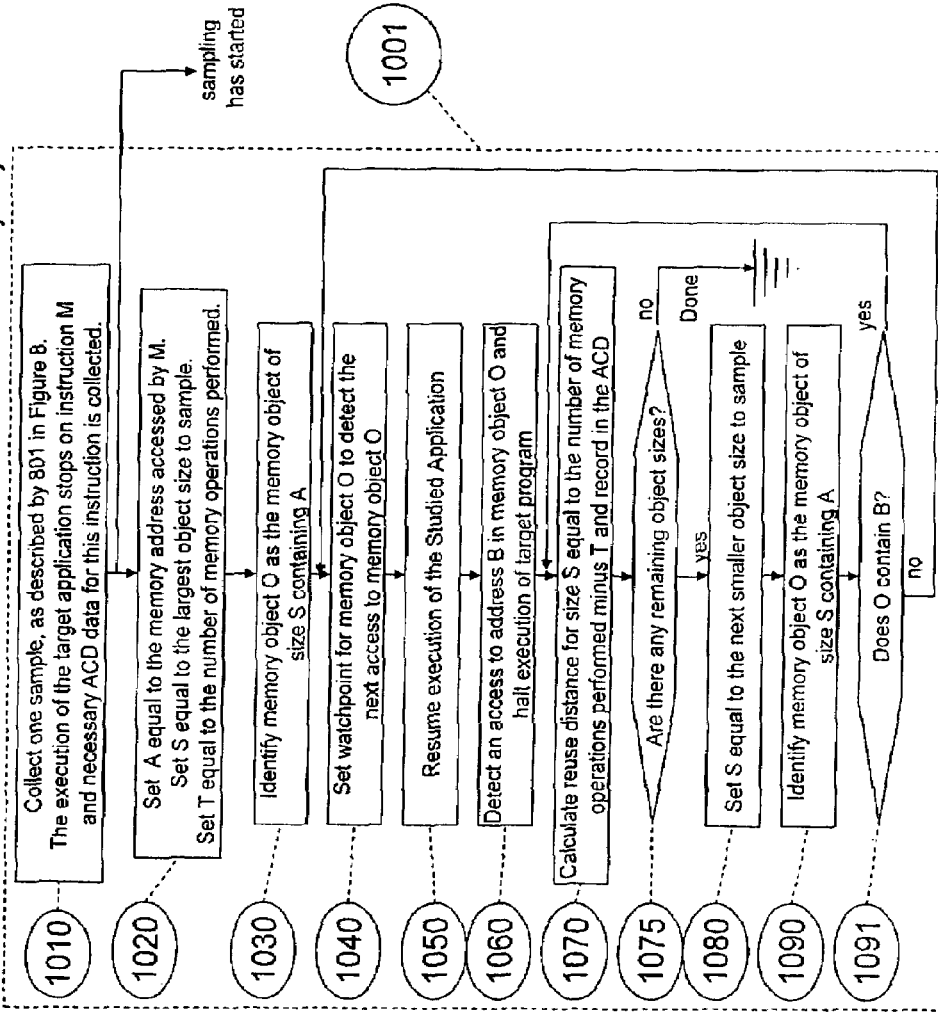
FIG. 10 is a flow chart of a method for simultaneously detecting reuse distances for Memory Objects of different sizes.

FIG. 10 is a flowchart for an efficient method of monitoring Memory Object of several sizes.

As step 1010 the appropriate sample is selected and necessary ACD data, such as the address of the instruction address of the sample, the address being accessed by it and a timestamp of when the sample occurred, is recorded. It should be noted that once this step has completed the collection of ACD data for this sample has been started. Meanwhile new sampling activities for other Samples may be started in parallel with the remaining steps for this Sample, marked as sampling has started in FIG. 10. It should be noted that the exact point in time (or other suitable demarcation) after which other sampling activities may be started vary between different implementations. For example, the arrow corresponding to a start of sampling may originate right after box 1050.

As step 1020 the accessed address A of the accessed Memory Object and the number of memory operations performed (T) is recorded. In one possible embodiment this information is retrieved by reading special hardware counters and registers. Furthermore, the largest Memory Object size to be sampled is recorded as S.

At step 1030 a Memory Object of size S containing the address A is selected. One implementation applies the same division of the memory address space into Memory Objects as is used by the memory system to model, such as hashing on some specific address bits, but other ways of defining Memory Object boundaries may also be implemented At step 1040 the Memory Object selected is marked in a certain way. One way to do this is to set a Watch Point for a Memory Object of the selected address and size, another way would be to alter the representation of the data such that the an access to it could be recognized.

At step 1050 the execution of the Studied Application is resumed.

At step 1060 the previously marked Memory Object is accessed by an access to address B, which is recognized in a way that wakes up the Sampler Mechanism. In one embodiment, the execution is halted on this operation to allow for a ACD data to be recorded by the Sampler Mechanism. Another embodiment would be to collect this data at this point without stopping the execution.

At step 1070 the reuse distance of this sample for the studied Memory Object size S is recorded. One way of doing this is to determine the current number of memory operations performed and to subtract the recorded value T. At this step necessary ACD data, such as I2 address, D2 address, the reuse distance, etc, may be recorded, At step 1075 it is determined if ACD data for all studied Memory Object sizes have been recorded for this Sample. If so, the activity for this sample is terminated as shown by the "no" leg of 1075, else we turn to step 1080 as shown by the "yes" leg of 1075.

At step 1080 the next largest Memory Object size is set to S.

At step 1090, a Memory Object O of size S containing the address A is selected similarly to step 1030.

At step 1091 it is determined if the new Memory Object O contains the address B, if so we turn to step 1070 to record the reuse distance for this Sample as shown by the "yes" leg, else we turn to step 1040 as shown by the "no" leg to set up a Watch Point for Memory Object O with size S.

Automatic Adjustment of Sample Rate

Figure 11:
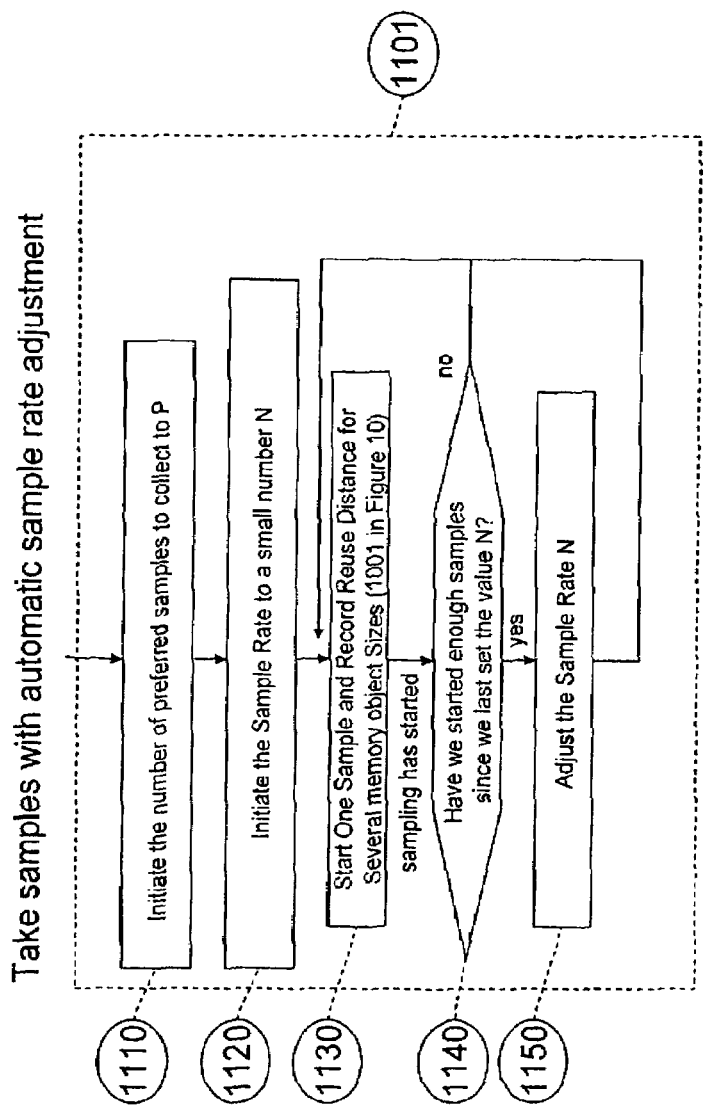
FIG. 11 is a flow chart of a method collecting many samples and automatically adjusting the sample rate of the method.

Short-running programs typically require a lower sample rate (i.e., will need to sample more often) that long-running applications. A sample method which dynamically adjusts the sample-rate would be beneficial. For example, the sample rate can be adjusted such that samples are taken less often (i.e., less frequently) for long-running applications. One embodiment of such a method is described with reference to the flowchart of FIG. 11.

At step 1110 the preferred number of samples P to be collect during the execution is determined. This may be done by predefining the value of P or by making the value of P configurable. In one embodiment the value of P predefined to 20.000.

At step 1120, the initial Sample Rate N is determined. This may be done by predefining the value of N or by making the value of N configurable. In one embodiment the value of N could be set to 100.000 resulting in one sample taken on average for every 100.000 Memory Access.

At step 1130 we start taking one Sample and record necessary ACD data. One way of doing this is according to the steps defined for 1001 in FIG. 10.

At step 1140 it is determined if we have taken a specified fraction of the preferred amount of samples using the current Sample Rate already. In one embodiment we could determine if at least half the preferred number of samples has been taken using the current Sample Rate. If so, we turn to step 1150 to adjust the Sample Rate, if not we turn to step 1130 as shown by the yes leg of 1140 to start to take yet another sample, else the "no" leg of 1140 will lead to step 1150.

At step 1150 the Sample Rate is adjusted. In one embodiment the rate N will be doubled to cause samples to be taken half as often on average.

Figure 19:
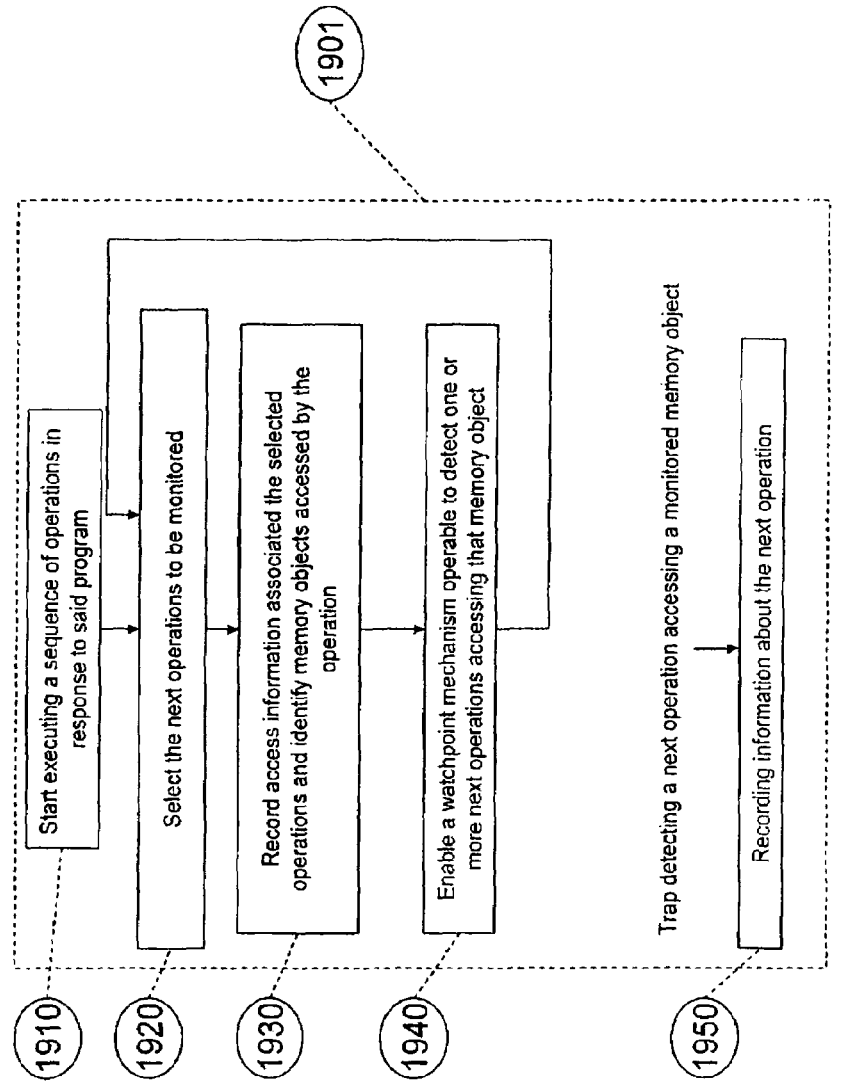
FIG. 19 is a flow chart of a method gathering memory usage information for a program of instructions.

Turning now to FIG. 19, describing steps for gathering memory usage information for a program of instructions. As a first step 1910, the execution of the program from which the memory usage information should be gathered is started. This will cause a sequence of operations, such as CPU instructions, database accesses, accesses to disk, or any other operations, to be initiated.

As a next step 1920, an operation to be monitored is chosen. This may be done according to a random selection scheme (e.g., uniformly distribution selection), or as a more biased selection (e.g., the next time an operation of a specific type, from a specific function is executed or an operation touching memory objects from a specific address range), or any other selection scheme.

Step 1930 may record specific information associated with the selected operation, such as the address of the memory objects it is accessing, instruction type of the selected operation. Another kind of information than may be recorded is call stack information. Call stack information identifies the history of functions, procedures, methods, tasks and similar program constructs used as a conduit to reach the operation. In one embodiment, the call stack information consists of the sequence of return addresses present in the activation records on the stack. In another embodiment, the call stack information contains the addresses of function entry points. In yet another embodiment, the call stack is augmented with function call parameter values. The call stack may be complete and leading up to the program's or thread's initial entry point, or it may be truncated so that only a few levels of call stack below the top frame are included. At this step the identity of an of memory objects accessed by the operator is identified.

At step 1940 some kind of trap mechanism is enabled. The trap mechanism will detect the next time an operation accesses the identified memory object.

Step 1950 is triggered the next time an operation accesses the identified memory object. That operation is sometimes referred to as the next operation. During this step, specific information about this operation is recorded, for example the address of the memory objects it is accessing, instruction type of the selected operation. Another kind of information than may be recorded is call stack information.

Modeling a Memory System

FIG. 3 shows an example of a conventional Memory System 310 including separate first level (L1) caches for data (330) and instructions (350), a unified second level (L2) cache storing both instructions and data (340) and main memory (360). Also shown is the mass storage or persistent memory here represented by a disk system (370) and the Translation Lookaside Buffer (TLB) (390) which caches address translations from virtual to physical memory and quickly can determine the physical location in main memory which has been allocated to store a page P. Note that the system described here is just an example of one embodiment of a system according to the invention for purposes of illustration and explanation. An ample number of alternative combinations of different topology and cache types exists.

Modeling of such a system may be performed using ACD or Sparse ACD collected on a Host Computer System running the Studied Application even though the Memory System to model may be very different from the memory system of the Host Computer System where the ACD 230 was collected. The goal is to estimate the behavior of the Model System 310 as if it was executing the Stream of Memory Access 230 of the Host Computer System. One functionality of such a system includes the following: Each time a new access from the Stream of Memory Access 230 attempts to access a specific Memory Object from the memory system, the contents of the caches in the hierarchy are first searched for that Memory Object. First the smallest and fastest cache at the L1 level is searched, secondly, the second level of caches are searched and so forth. Only if the data cannot be found at any level of caches will the slow main memory need to be accessed.

Modeling the memory system involves algorithms for determining if the Memory Object where the instruction being executed resides, and in case of a Memory Access also determining if the Memory Object accessed by the instruction can be found in a cache, and if so, in which level of cache they can be found. The algorithms and techniques described in this disclosure according to various embodiments of the invention are not limited to caches of memory system, but can also be applied to any other systems implementing similar kinds of caching systems including, but not limited to, disk caching, web caching and the caching performed by the virtual memory system.

Cache Algorithms

In one method of modeling a Memory System, such as 310, the model chosen for each level of cache in the memory hierarchy should closely correspond to the kind of cache at that level. Most importantly, the size of the modeled cache must be appropriate. Further, caches can be classified according to the size of Memory Objects handled by the cache, called its block size (sometime referred to a cache line size); in how many optional places a specific Memory Object can be placed, called its associativity; and, its strategy for picking a victim among the optional places where a new Memory Object can be placed, for example random replacement (RAND), round-robin (RR), least recently used (LRU), pseudo LRU (PLRU) and not most recently used (NMRU) algorithms.

Another method of modeling a Memory System, such as 310, the model chosen would instead model an idealized system. Here, the purpose of the modeling is to study some specific property of the studied application. Examples of such systems include but are not limited to systems with infinitely large caches, with fully associative caches or with cache where the Memory Object size is equal to the data size accessed by each Memory Access.

Modeling a Fully Associative Cache

Figure 4:
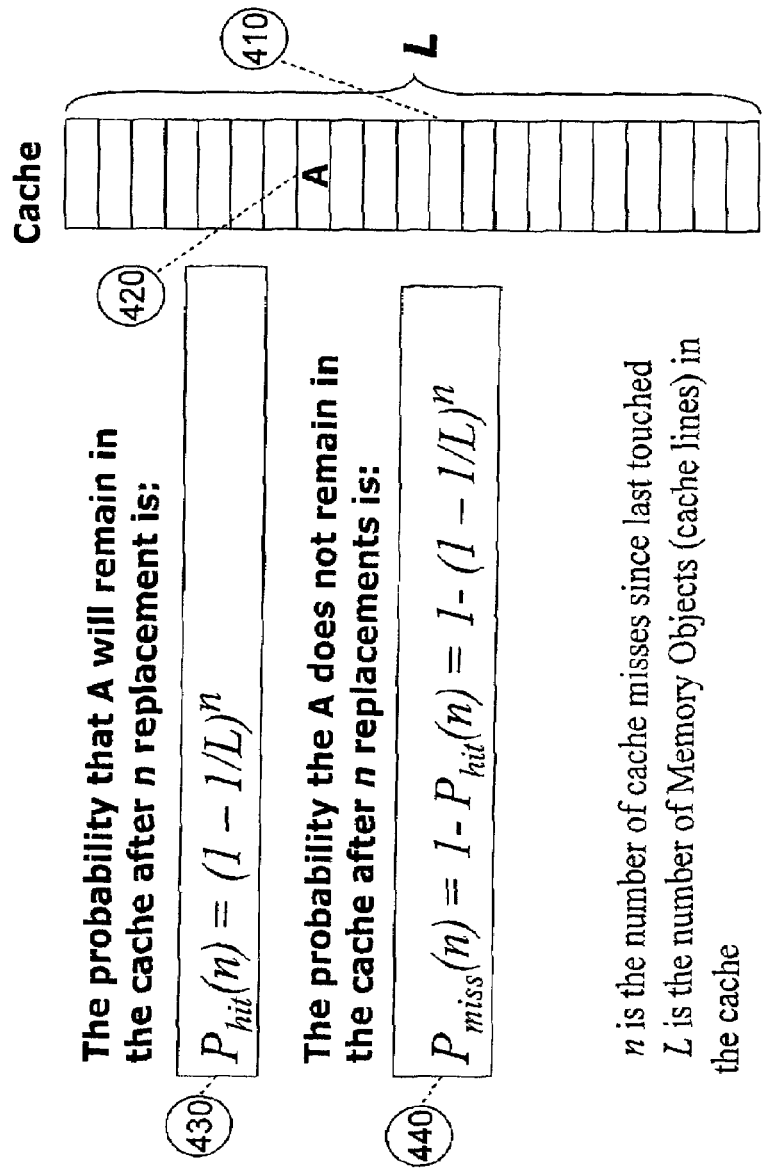
FIG. 4 is a diagram of a fully associative cache illustrating how a random replacement may be model.

A fully associative cache 410 is shown in FIG. 4. A fully associative cache has the property that a specific Memory Object may be stored in any of its L location dedicated for storing Memory Objects. The Memory Object A (420) is depicted as placed in one such places. Assuming that Memory Object always gets installed in the cache in the case of a cache miss, we can conclude that the Memory Object A would reside in the cache with the probability 1.0 right after it has been touched. Further, assuming a random replacement (RAND) the probability that A resides in the cache after one cache replacement has occurred is $(1-1/L)$. Subsequently, if n Replacements have occurred since A was last touched the likelihood of finding A in the cache can be calculated by the function P_hit 430 in FIG. 4, and the probability of not finding A in the cache can be calculated by function P_miss 440.

Figure 12:
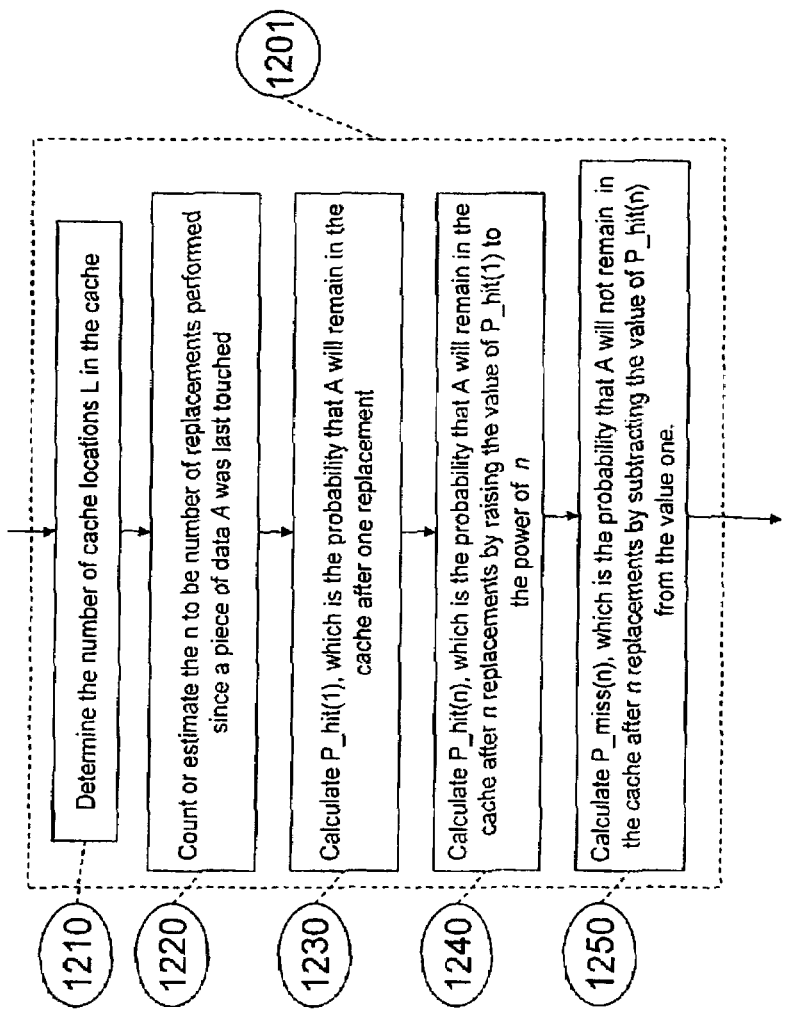
FIG. 12 is a flow chart of a method estimating miss probability for a specific memory object based on the notion of how many replacements have occurred since this memory object was last touched.

FIG. 12 shows a flow chart of a sequence of steps to determine the probability of a miss in a cache.

At step 1210 the number of locations L of the cache is determined. One way to determine this is to divide the cache size with the block size of this cache corresponding to the Memory Object size.

At step 1220 the number of replacements performed since a specific Memory Object A was last touched is determined. This may be done through counting of such events or by estimating the number of such events. In one embodiment, the number of replacements can be estimated by multiplying the assumed miss rate R with the reuse distance of the studied Memory Object A.

At step 1230 the probability P_hit(1), which is the probability that a given Memory Object resides in the cache after exactly one replacement, is calculated. In one embodiment, this is done using the formula, i.e., the value one subtracted by the result of a division between the value one and L At step 1240 the probability P_hit(n), which is the probability that a given Memory Object resides in the cache after n replacement, is calculated. In one embodiment, this is done using the formula, where n is the estimated number of replacement performed.

At step 1250 the probability P_miss(1), which is the probability that a given Memory Object will not resides in the cache after n replacement, is calculated. In one embodiment, this is done using the formula, where n is the estimated number of replacements performed.

Figure 5:
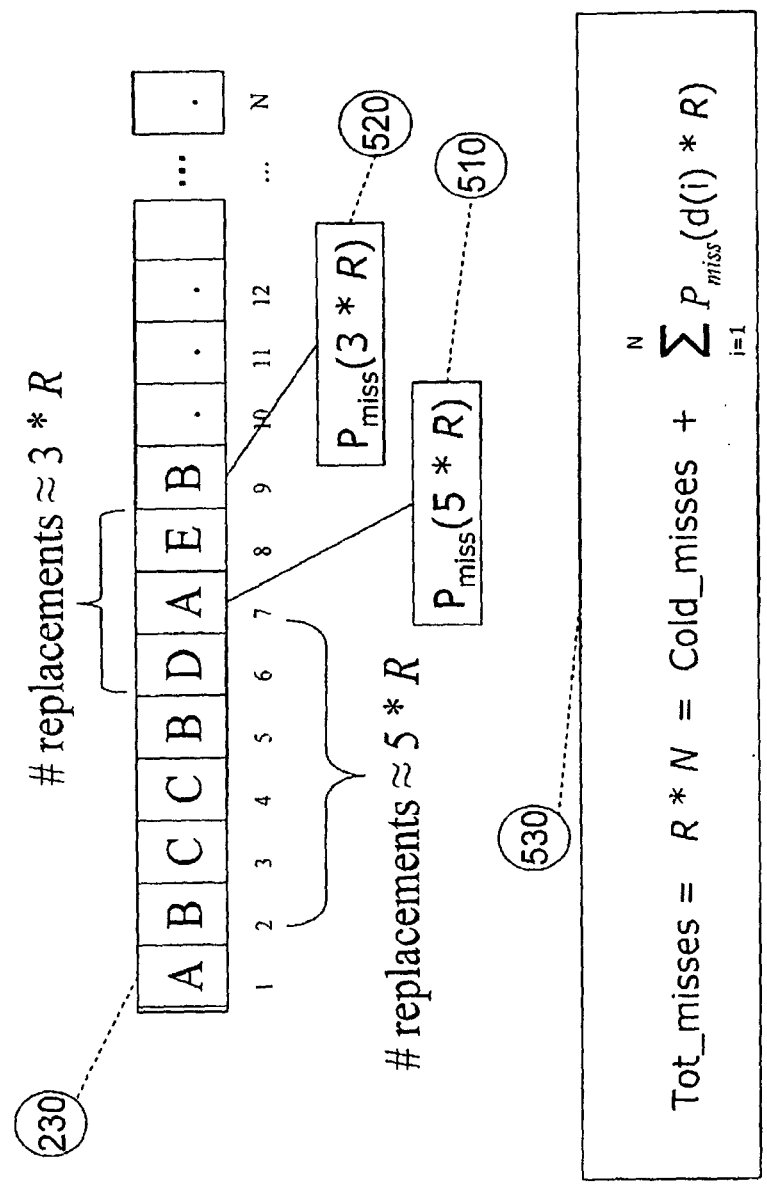
FIG. 5 is a diagram of a stream of Memory Accesses illustrating a method of estimating a miss probability for each access in a stream of Memory Accesses based on a reuse distance and an equation from which the miss rate of the application may be solved.

Turning now to FIG. 5, the memory instructions from the memory stream 230 can be found in the sequence at the top. If we assume that the miss rate is R, i.e., the likelihood that a memory instruction will not find its requested Memory Object in the cache is R, we can estimate the number of replacement that have occurred between the first and second access to the Memory Object to be its reuse distance multiplied by the assumed miss rate R. For the first sampled access of 230, 5R replacements are estimated to occur between the first and the second access to the Memory Object A and for the second selected sample 3R replacement will occur between the two accesses to the Memory Object B. Thus, the likelihood of a miss can be estimated by estimating P_miss by performing the steps described in FIG. 12. For the two examples in FIG. 5 such estimation is indicated by boxes 510 and 520. However, the P_miss equation only holds for misses caused by replacement activity, here called Capacity Misses. The likelihood of a cache miss is equal to 1.0 the first time a Memory Object with a size equal to the block size of the modeled cache is touched. One example of such a Cold Miss is Memory Access number 2 of 230, which is the first access to the Memory Object B.

Estimating Cold Misses and Working Set Size

Figure 13:
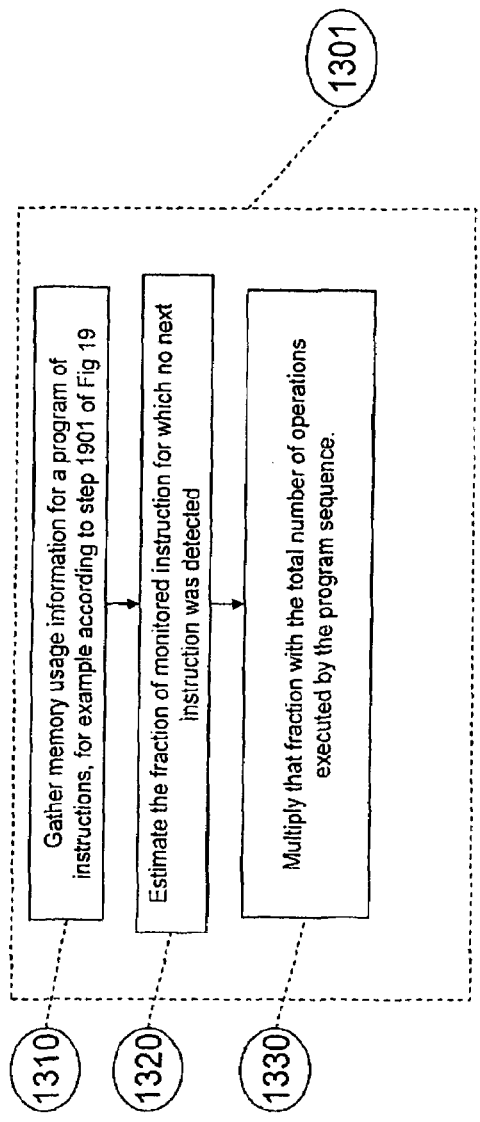
FIG. 13 is a flow chart of a method estimating the amount of memory objects used by a programs sequence including of a target application based on data from sparse samples.

The name Cold Misses is used to refer to cache misses that occur because the data is touched (e.g., accessed or addressed) for the first time. FIG. 13 is a flowchart of a method for estimating the amount of memory objects used by a program's sequence including, the cold miss rate and the working set for a fraction of execution of a Studied Application. The strategy outlined in FIG. 13 is to detect the last time a Memory Object is touched, rather that the first time it is touched. This is a novel way of estimating cold misses.

At step 1310 Application Characteristic Data is gathered including information about enabled trap mechanisms for which no reuse distance (i.e., no next operation) have been recorded. The Application Characteristics Data collected at this step may be sparse. In one embodiment, this is done by performing the steps 1101 of FIG. 11. In another embodiment, the number of samples for which no reuse distance has been recorded is estimated to be the number of dangling Watch Points of step 1070, which is the number of enabled trap mechanisms for which no next operation has been detected. Another alternative is to read previously recorded Application Characteristic Data including information about samples for which enabled watchpoint traps no reuse distance have been recorded. In one embodiment, only Characteristic Data associated with a Memory Object size equal to the block size B of a modeled cache are being considered. It is further possible that only a certain selection of Characteristic Data, such as for example data from one segment of the execution, data associated with certain Memory Objects or data associated with certain instructions are collected at this step.

At step 1320 it is determined how many of the initiated samples' trap mechanisms that still have not detected a next access to the corresponding Memory Object of the studied Memory Object size O. In other words, the fraction of enabled traps for which no next operations has been identified is measured. In one embodiment, this involves determining how many samples that have not recorded a reuse distance value for the selected Memory Object size according to step 1070 of FIG. 10.

At step 1330 the fraction number produced by step 320 is multiplied by the total number of operations executed by the program.

In one embodiment, the number of samples collected at step 1310 is from one segment of the execution of the Studied Application why the calculations performed in the following steps result in estimations of corresponding parameters for that segment only.

Estimating Capacity Misses

The total number of capacity misses caused by replacement as discussed in FIG. 12, can be calculated by a summation over the total number of Memory Accesses not experiencing cold misses.

The total number of cache misses may be calculated in two different ways: first, the total number of Memory Accesses N is multiplied by the estimated miss rate R, secondly the number of cold misses plus the miss probability of all Memory Objects touched at least a second time. The likelihood that a Memory Objects touched at least a second time will experience a miss may be estimated by using the P_miss steps of FIG. 12, using its distance d(i) multiplied with the estimated miss rate R as the number of replacements. This results in the equation for the total number of misses:

$$\text{Tot\_misses} = R \cdot N = \text{Cold\_misses} + \sum_{i=1}^{N} \text{P\_miss}(d(i) * R) \quad \text{[Equation 530]}$$

Someone skilled in the art realizes that if the total number of Memory Accesses N, as well as the number of Cold misses K, as well as a reuse distance d(i) for the N Memory Accesses, we can solve the value of R from Equation 530 numerically. It should be noted that d(i) is defined as zero if no reuse distance has been recorded and that P_miss(0) is zero according to the definition of P_miss(n).

A rewritten version of the equation, as defined by Equation 540, only estimates P_miss for samples with a recorded reuse distance, and thus does not require a definition of d(i) if no reuse has been detected.

$$\text{Tot\_misses} = \quad \text{[Equation 540]}$$
$$R \cdot N = \text{Cold\_misses} + \sum_{i=1}^{N-\text{Cold\_misses}} \text{P\_miss}(d(i) * R).$$

Equations 530 and 540 are both valid also for sparsely sampled ACD data where N is the number of samples and Cold_misses is the number of those samples which are estimated to be cold misses.

Each unique Memory Object used by an application will cause exactly one cold miss, why the Cold_miss variable in equations 530 and 540 may be replaced by Number_of_Memory_Objects.

Using Histograms

Figure 6:
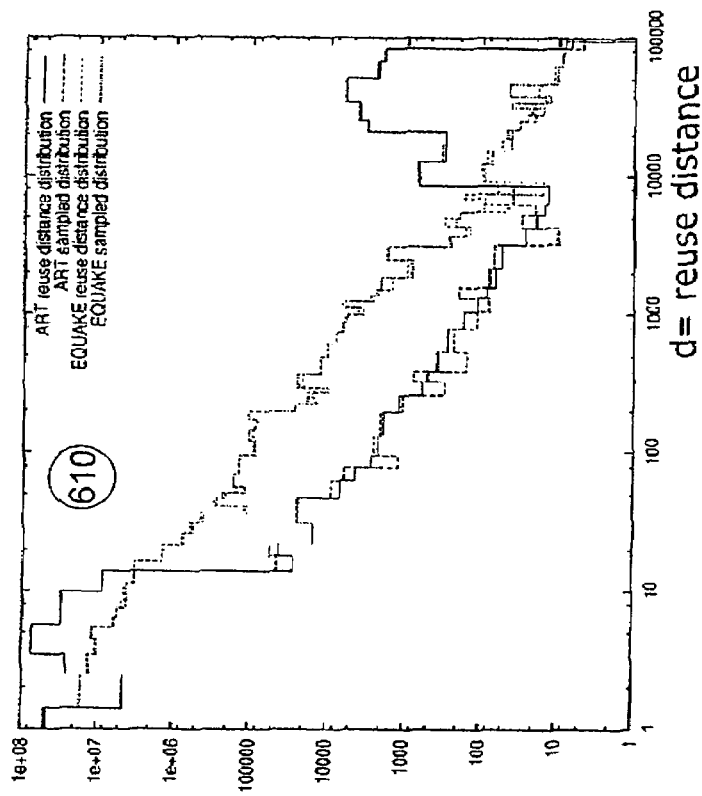
FIG. 6 is a reuse histogram for two applications based on data that may be captured using sparse information about the reuse distance of Memory Accesses.

Furthermore, if we only know the reuse distance d(i) for a small but representative subset M of the Memory Accesses, equation 530 still hold for those M references and will result in a representative estimation of the R value. Here, the letter N is replaced with the letter M, Tot_misses is the estimated number of the M Memory Accesses that misses, the Cold misses is the estimated number of the M Memory Accesses that cause a cold miss and the summation goes from 1 to M. To further convince ourselves of this thesis, FIG. 6 shows the reuse histogram 610 for two Studied Applications. The value h(d) on the Y-axis for each X-value of d shows the number of Memory Accesses recorded with exactly that value. Each application shows the shape of their corresponding reuse histogram based on every access as well as based on the sparse sampling of every 10,000$^{th}$ access (but scaled up). Such a histogram is one way of presenting the reuse distance distribution for a program, or a segment of a program. If the sparse sampling is done in a random and completely independent way, it should come as no surprise that the sampled shape corresponds well with the shape based on every access. Multiplying each h(d) value for a histogram build from sparsely sampled ACD with its Sample Rate results in a new histogram equivalent with histogram based on non-sparse data.

Since equation 530 can be transformed to the equation 620 based on histogram data it can easily be understood that sparse sampling can be used for solving the value of R.

Estimating Cache Misses for a Random Replacement Cache

Figure 14:
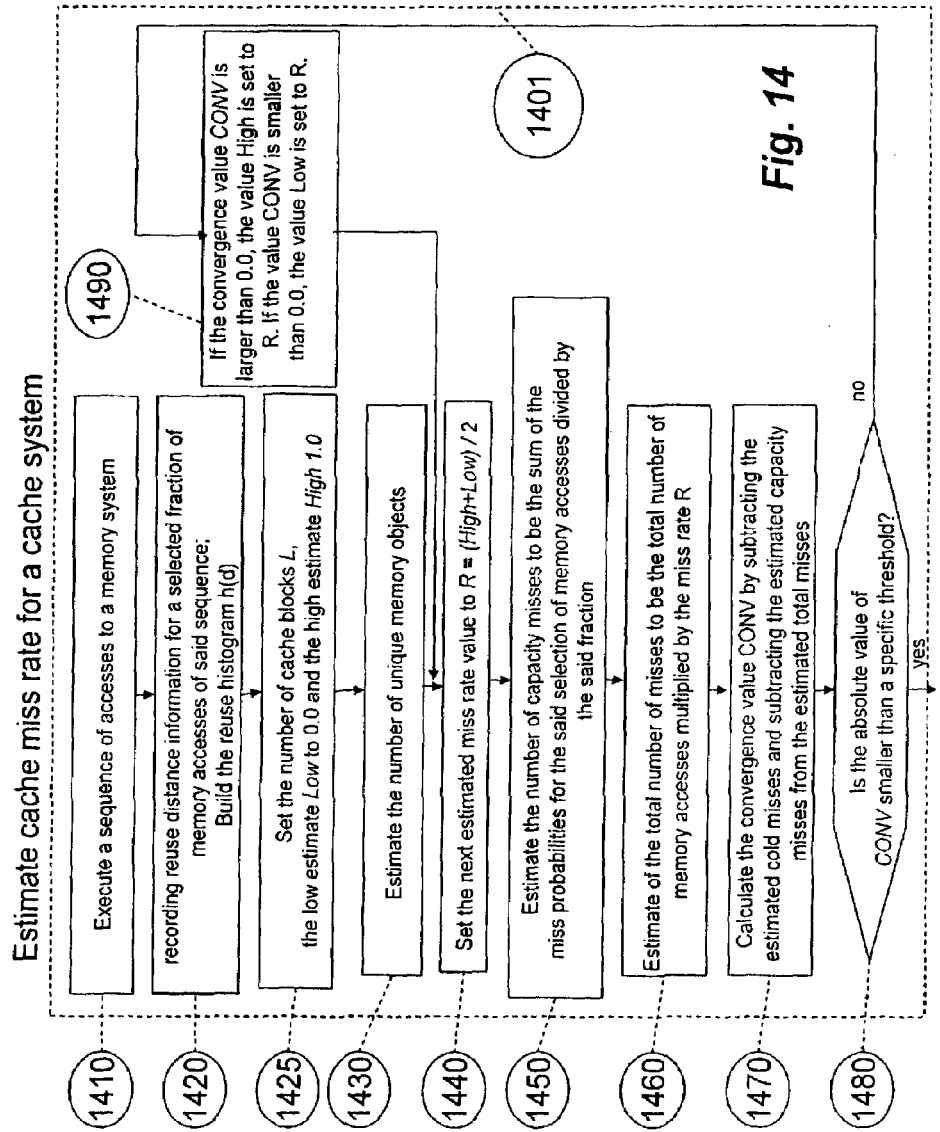
FIG. 14 is a flow chart of a method estimating miss rate for a fully associative cache with random replacement based on data from sparse sampling.

FIG. 14 is a flow chart of a sequence of steps for estimating the miss rate of a cache with respect to a sequence of accesses to a memory system.

Steps 1440 through 1490 are all one example of an iterative solver. Many alternative ways of alternative solvers exist and they are all possible embodiments for steps 1440 through 1490.

At step 1410 Application Characteristic Data is collected for example in a similar way to step 1310 of FIG. 13. This may be done by collecting reuse distance information for a selection of memory operations At step 1420 a histogram based on the Characteristic Data collected may be built. In one embodiment, reuse distance property of the Characteristic Data is being targeted to make the entry h(d) of the histogram represent the number of Samples in the Characteristic Data that has a reuse distance equal to the value d. One may build a more coarse histograms where each entry h(d) represents the number of Samples for a range of reuse distances.

At step 1425 certain parameters of the target cache and values for the iterative solver are initiated. In one embodiment the number of locations L of the modeled cache is estimated by dividing the cache size S with the block size B. Possible iteration values initiated are a high guess value High, set to 1.0 and a low guess value Low, set to 0.0.

At step 1430 the number of cold misses is estimated. One way of doing this is to use the steps described in FIG. 13. In one embodiment, only Cold misses associated with the selected data of step 1410 are considered. Since the number of cold misses is equal to the number of unique Memory Objects, of the same size as the Objects in the cache, accessed by the sequence of accesses, the number of unique Memory Objects may be used instead of the number of cold misses.

At step 1440 a value of the miss rate R is estimated. This may be done by calculating the average between the high guess High and the low guess Low values.

At step 1450 the number of capacity misses is estimated. This may be done by summing up each histogram value h(d) multiplied by the corresponding Miss Probability 1201, where the number of replacement n is of step 1240 is estimated to be the value d multiplied by R. In an alternative embodiment, the miss probability for Samples selected in 1410 may be estimated individually and then summed together. The individual miss probability may be calculated using the Miss Probability steps in 1201 of FIG. 12, where the number of replacement n is of step 1240 is estimated to be the reuse distance d of the Sample multiplied by R.

At step 1460 the total number of misses caused by the samples selected in 1410 is estimated. This may be done by multiplying the number of samples selected with the estimated value of R.

At step 1470 a convergence value CONV is calculated. This may be done by setting the value CONV to the result of subtracting the estimated cold misses and subtracting the estimated capacity misses from the estimated total misses.

At step 1480 a convergence test is performed. In one embodiment, it is determined of the absolute value convergence value CONV is smaller than a threshold. If so, the estimated miss rate is R, if not we turn to step 1490.

At step 1490 new values for the estimate variables are estimated. In one embodiment, the value of the convergence test is assessed. If the convergence value CONV is larger than 0.0, the value High is set to R. If the convergence value CONV is smaller than 0.0, the value Low is set to R. Following step 1490, we turn again to step 1440 to perform a new estimation of the miss rate R.

Modeling an LRU Cache

A cache based on least recently used (LRU) replacement algorithm will require a different method for estimating its miss rate. Knowing the so-called stack distance for each Memory Accesses would here be a good help. While reuse distance is the total number of Memory Accesses between the two accesses to the same Memory Object, stack distance is the number of Memory Accesses to unique Memory Objects. If the stack distance is smaller than the number of Memory Objects that the cache can hold, called L for the cache 410 in FIG. 4, the second access to a Memory Object will result in a cache hit, or else a cache miss has been estimated.

In order to make use of the reuse distance data collected to also model LRU caches, a new method for conversion between reuse distance and stack distance is needed.

Figure 7:
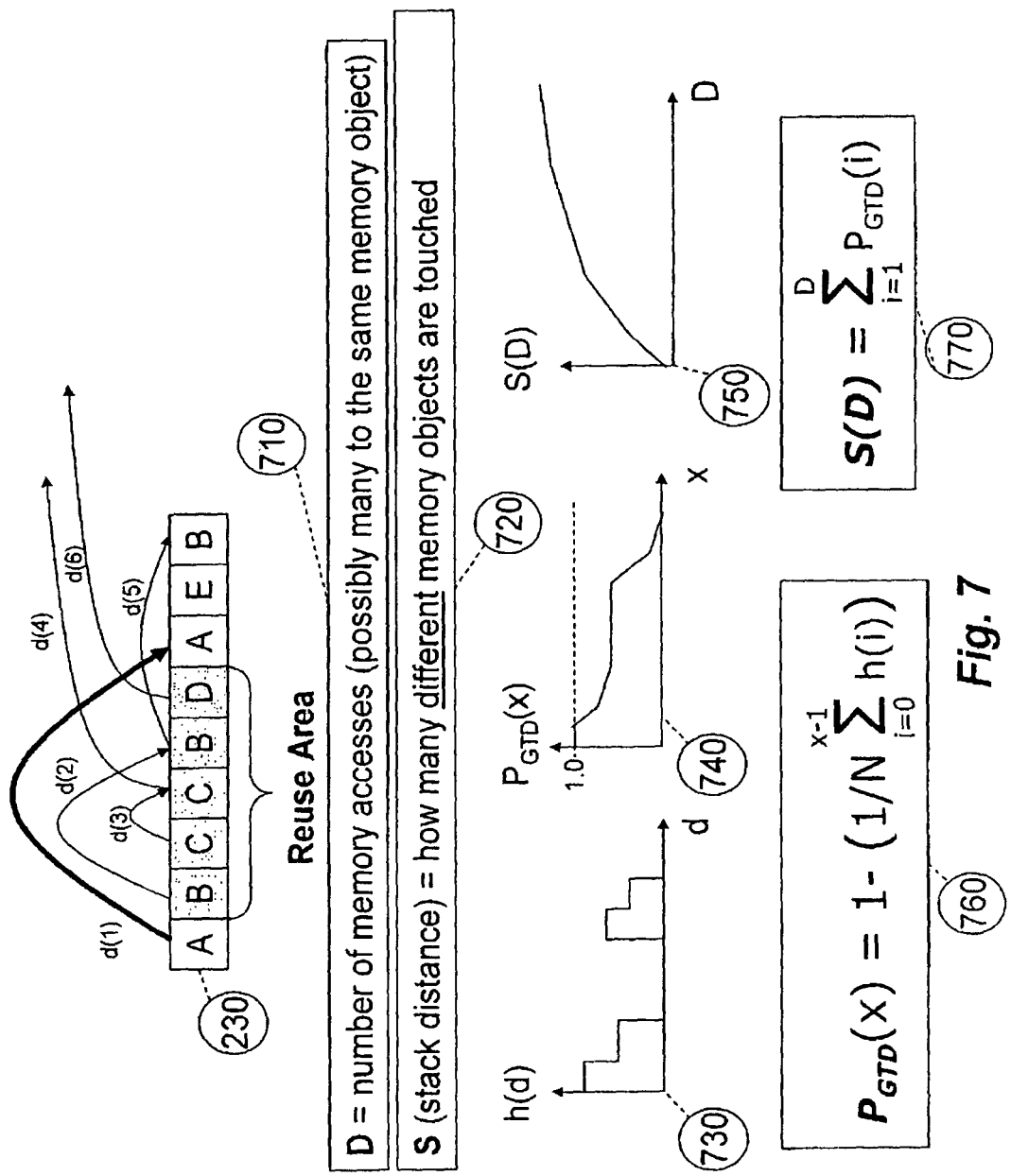
FIG. 7 is a diagram of a stream of Memory Accesses illustrating how the shape of a reuse histogram can be used to estimate a method for calculating the application's stack distance.

Turning now to FIG. 7, the sequence of Memory Accesses 230 have been augmented with the reuse distance arrows for each the first six Memory Accesses, named d(1) through d(6). By studying the different Memory Object accessed during the Reuse Area of A, defined as the Memory Accesses between the first and the second access to A, we can determine that the corresponding stack distance for this access is 3, since only the objects B, C and D are touched during this time period.

Another way to draw this conclusion is to look at the reuse distance arrows for d(2) through d(6), and determine how many of these point beyond the Reuse Area. In this example d(4), d(5) and d(6) all point beyond the second access to A, this tells us that the stack between the two references to A is 3. This way of estimating the stack distance can be generalized for a Studied Application with a reuse histogram h(d). Starting with a histogram 730 in FIG. 7, we can calculate the function 740 $P_{GTD}(X)$, showing the probability that a Memory Access of the application has a reuse distance which is larger than a certain value x, based on the summation of the reuse histogram values from i=0 to i=x−1 as shown by the formula 760. Determining the average stack distance S(D) 750 can now easily be done for a given value of D by summing up the probability that each of the D Memory Accesses in the Reuse Area is pointing beyond the Reuse Area, as shown by formula 770. We can now calculate the miss probability for each memory access i by determining if its stack distance S(d(i)) is larger or smaller than L. In one embodiment the reuse histogram of a Studied Application, which easily can be estimated by sparse sampling as shown in FIG. 6, can be used as input to estimate the stack distance S(d(i)) using the above method.

Estimating Stack Distance

Figure 15:
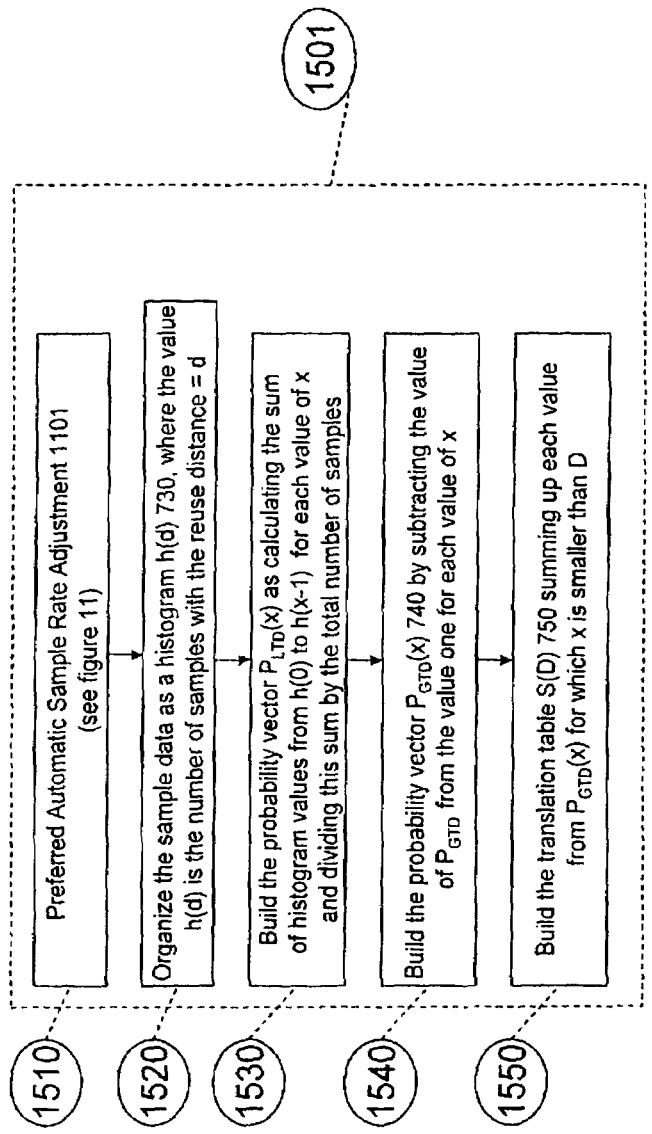
FIG. 15 is a flow chart of a method building a translation table to convert reuse distance data into stack distance data.

FIG. 15 shows a flow chart of how to build a translation mechanism translating reuse distance to stack distance, this implies that for a given sequence of memory operations consisting of some number of memory operations FIG. 15 describes one method of estimating the number of unique memory objects touched during that segment.

At step 1510 Characteristic Data is collected similarly to step 1310 of FIG. 13. In one embodiment, this collection could be done by performing step 1101 of FIG. 11. Another way may be to read already saved ACD data from memory or from a file.

At step 1520 a histogram is built similar to step 1420 of FIG. 14.

At step 1530 the probability vector is $P_{LTD}$ (probability that a sample has a reuse distance smaller than d). In one embodiment, this may be done by summing up all histogram values between h(0) and h(d−1) and dividing the result by the total number samples.

At step 1530 the probability vector is $P_{GTD}$ (probability that a sample has a reuse distance greater than d). In one embodiment, this may be done by subtracting the corresponding value $G_{LTD}$ from the value 1.0.

At step 1550 the actual translation table S(D) is put together. Each entry of S(D) is calculated by summing up all values between and including $P_{GTD}(1)$ to $P_{GTD}(D)$.

Given the translation table S(D), the stack distance for each Sample i can be estimated by performing a lookup SD using its distance rd(i): Stack_distance(i)=S(rd(i)). Let L total number of Memory Objects in the modeled cache. Then, an estimated stack distance smaller than L result in a hit estimate with the estimated probability of 1.0, while a stack distance larger than L result in a miss estimate for the Sample. This yields the equation for the total number of misses in an fully associative LRU cache:

$$\text{Tot\_misses} = \text{Cold\_misses} + \sum_{i=1}^{N} (\text{if}(S(\text{rd}(i)) < L) \text{then } 1 \text{ else } 0),$$

where N is the number of selected Samples from ACD to use as input.

Figure 20:
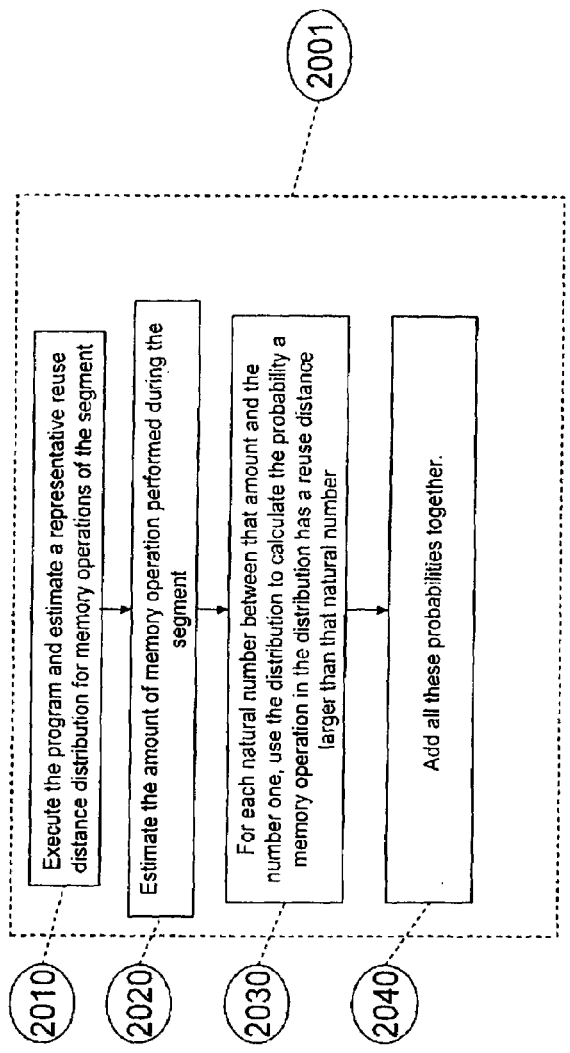
FIG. 20 is a flow chart of a method estimating the number of unique memory objects in a segment of a program.

Turning now to FIG. 20, estimating the number of unique memory objects in a segment of a program of instructions. At step 2010, a representative reuse distance distribution for memory operations of the segment is collected. One way to do this is to create a histogram over the reuse distance recorded for all operations of the segment, or to estimate a histogram based on a selection of operations of the segment. A histogram may also be collected based on operations close to the segment or based on the operations of the entire program, if that will produce a representative distribution.

At step 2020, the number of memory operations performed during the segment is estimated to be D. This corresponds to the reuse distance of the segment.

At step 2030 the natural number series from one up to D defined in step 2030 is examined and for each such number, a probability fraction is calculated as the amount of objects with a larger reuse distance than that number in the histogram is divided by the total number of objects in the histogram.

As step 2040, the probabilities estimated in step 2030 are added together.

In summary, steps 2030 and step 2040 can be summarized by the equation:

$$\text{number\_of\_unique\_memory\_objects} = \sum_{i=1}^{D} P(\text{reuse\_dist} \geq i)$$

A More Accurate LRU Model

While the stack distance estimation described above will result in a good estimate for large reuse distance values, shorter reuse distances would need to include more detailed information or knowledge about the relationship between reuse distance and stack distance. Especially, the histogram bin that corresponds to the reuse distance minus one will require more attention. That particular reuse distance would correspond to a distance that coincides with the trigger instruction for the reuse distance under consideration. Since we know that none of the memory operation in the Reuse Area of FIG. 7 can have their reuse distance d(x) pointing to the second occurrence of A, this has to be reflected in the Equation.

Consider an example where the reuse distance between two Memory Accesses to A is zero. Clearly, there can be no other accesses between the two Memory Accesses to A and the stack distance should be defined to be 0. This yields that S(0)=0 Now, consider a situation with a reuse with distance of one, i.e., between the two consecutive Memory Accesses to A is one access to a different memory object X (i.e., {A, X, A}). Despite the acquired sample's reuse distance distribution, the access X cannot have reuse distance 0, since it would then collide with the trigger access corresponding to the second access to A. From this example, it is evident that in this scenario, X's reuse distance cannot be one, since it would then coincide with the second access to A. When we calculate the reuse distance probability, we therefore temporarily remove the contribution from samples with exactly this reuse distance. This yields that S(1)=1

Now consider a situation with a reuse with distance of two, i.e., there are two references X and Y within this interval (i.e., {A, X, Y, A}), and where the projected average stack distance is between one and two. Now, consider access X. The sample histogram offers some information on the distribution of its reuse distance. For instance, the probability that X's reuse distance equals zero is h(0)/N, where N is the total number of samples included in the histogram. Generally, the probability that the reuse distance is D is given by h(D)/N. However, if X's reuse distance is one, both X and Y must access the same memory object while the stack distance between the two references to A is one. For all other histogram values for X and Y are to different memory objects and the stack distance between the two references to A is two.

$$S(2) = 1 * h(0)/(N - h(1)) + 2 * (1 - h(0)/(N - h(1)))$$
$$= 1 + 1 - h(0)/(N - h(1))$$
$$= S(1) + 1 - h(0)/(N - h(1))$$

Continuing this reasoning gives the general recursive formula:

$$S(r) = S(r-1) + \sum_{k=0}^{r-2} h(k)/(Nh(r-1)), \text{ where } S(0) = 0.$$

Adjusting for Variable Miss Rate

All System Modeling techniques discussed so far assume a uniform distribution of the memory instruction's properties. Example of such assumptions is the miss rate R of equations 530 and 620, as well as the property of the Reuse Area of FIG. 7. While the described methods will still be a fairly good approximation, adding adjustments for the variations can improve the results even further.

One way to overcome this is to split up the execution in many time windows and to apply each equation to one time window at a time. In one embodiment the reuse histogram of one time window is used to calculate the miss rate R for that time window. The miss rate of the entire application is then calculated based on the miss rate of each time window. One alternative to statically division into time windows is to have sliding time windows.

Compensating for Set Imbalance

Figure 16:
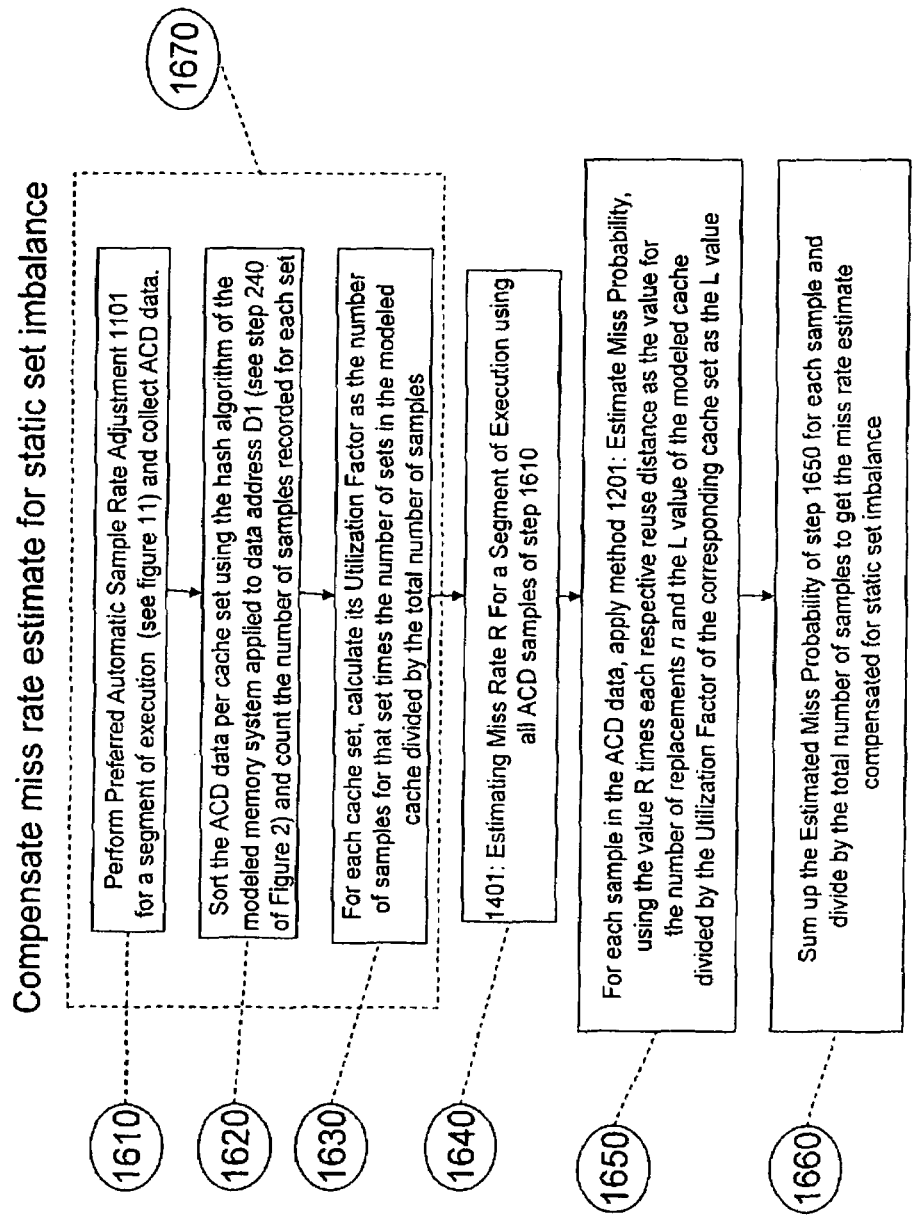
FIG. 16 is a flow chart of a method compensating the miss rate estimation on FIG. 14 for limited associativity cache implementations.

FIG. 16 shows a flow chart describing how to compensate for set imbalance for a cache with random replacement.

At step 1610 Application Characteristic Data is collected similarly to step 1310 of FIG. 13. In one embodiment, this collection could be done by performing step 1101 of FIG. 11. Another way may be to read already saved ACD data from memory or from a file or from a different computer for example using a network connection.

At step 1620, the samples collected in 1610 are sorted according to the set-hash function of the modeled cache, i.e., the function used to select one specific cache set as a function of the memory address accessed, and the number of samples per set is determined.

At step 630 the Utilization Factor is calculated for each set. The Utilization Factor is 1.0 for a set which received the average number of samples. A Utilization Factor higher then 1.0 indicate that the set is overused. The Utilization Factor for a set may be calculated by multiplying the number of samples targeted to the set with the number of sets of the modeled cache and then dividing the result by the total number of samples.

At step 1640 the miss rate without any consideration of set imbalance is calculated, for example using the method 1401 described in FIG. 14.

At step 1650 the samples of the ACD collected at step 1610 are used one by one to estimate their individual miss probability, for example using the method 1201 described in FIG. 12, using L of the modeled cache divided by the Utilization factor as the L value of method 1201.

At step 1660 the average of the miss probabilities of step 1650 is calculated.

Figure 17:
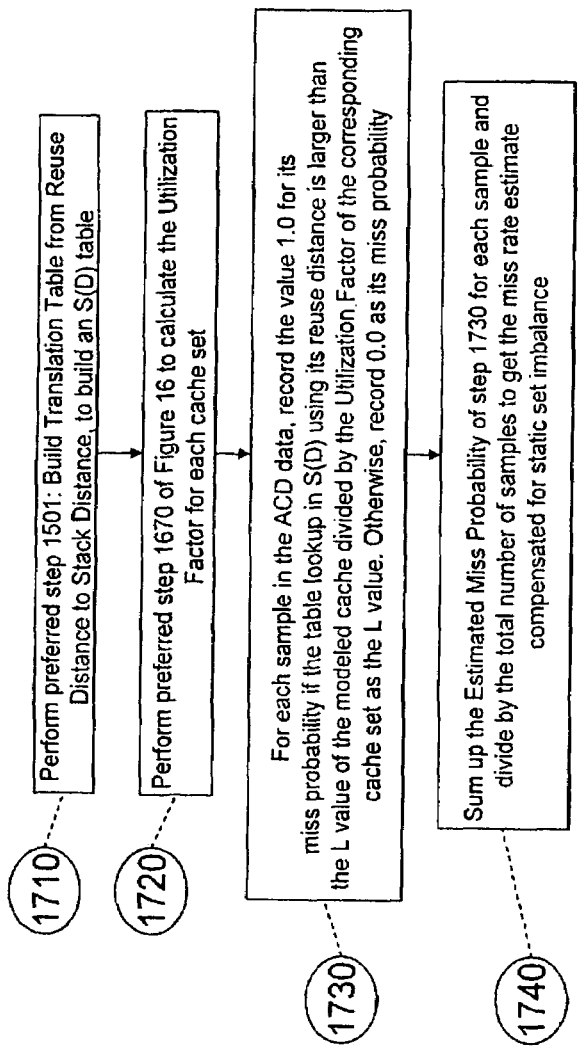
FIG. 17 is a flow chart of a method estimating miss rate for a LRU taking limited associativity into account.

FIG. 17 describes a method to estimate the miss ratio of an LRU cache while taking set imbalance into consideration.

At step 1710 a translation table S(D), translating reuse distance ACD into stack distance values, is built. One way to do this is according to step 1501 of FIG. 15.

At step 1720 the Utilization Factor is determined for each set. In one embodiment, this is done in accordance with step 1670 of FIG. 16.

At step 1730 all the samples of the ACD samples collected at step 1710 is accessed one by one. If the lookup of the table S(D) using the reuse distance D of a sample results in a stack distance value is larger than the L value of the modeled cache divided by the Utilization Factor of the corresponding set, a miss probability of 1.0 is recorded for that set. Else, the miss probability of 0.0 is recorded.

At step 1740, the average miss probability estimated for each sample in step 1730 is calculated as an estimate of the average miss probability for the Studied Application.

Adjusting for Semi-Static Conflicts

All System Modeling techniques discussed so far are targeting caches organized as fully associative caches with the property that a Memory Object may be placed in any of their L locations. A more common organization for caches is the so-called set-associative organization, where each specific Memory Object can only be placed in the subset consisting of W locations of the L total locations in the cache. Such an organization is called W-way associative. Organizations ranging between 4-way and 16-way are common today. The collection of possible places where a Memory Object can be placed is called a Set. A part of the Memory Object's address is often used to determine which Set it belongs to. An N-way associative cache with L locations has L/W Sets, where W is the number of associative ways in each set of the cache. We denote the number of sets in a cache S.

N-way associative caches result in a higher miss rate that fully associative in practice for two reasons: Memory Objects accessed by a program are not uniformly distributed over the sets and the replacement algorithm, such as random or LRU, can only make their pick among W Memory Objects rather than L object.

We can measure the Set Ratio describing how the Sampled Memory Object are spread over the different Sets during the execution of the Studied Application. With an even distribution of Memory Accesses, each set should be accessed with the Set Ratio 1/S. The reference to a set with the ratio 2/S will effectively experience a cache with only L/2 location using the formulas. Adjusting the cache size in such a way on a per-sample basis in the above mentioned methods will effectively take some of the negative effects of set-associative caches into account. If the Set Ratio is measured and their effect adjusted for Samples from shorter time windows during the execution, even some semi-dynamic effect of cache conflicts will be taken into account.

Adjusting for Frequent Reuse Areas

For some Studied Applications one specific Reuse Area measuring the reuse between the same two instructions I1 and I2 may be common (Reuse Area contains all intervening accesses between instruction I1 and I2). If so, special measures can be taken to study this Reuse Area extra carefully. By collecting statistics about the other instructions and Memory Objects sampled during the different occurrences of the Reuse Area, it can be determined if conflicts in the caches of different levels are likely to occur with the reuse Memory Object of the Reuse Area. If one occurrence of the specific Reuse Area is measuring the reuse distance for a Memory Object with the address A and three new Samples accessing different Memory Objects are taken during this Reuse Area, one of which accesses a Memory Object hashing to the same Set as A, we record a 33% conflict rate for this occurrence of the Reuse Area. Combining such information with those of other occurrences of the same Reuse Area allows for the conflict rate for the Reuse Area to be calculated. Through this technique it can be determined that a Reuse Area recording a reuse distance smaller than L still would yield a cache miss due to cache conflict. This way, also dynamic conflicts can be calculated for frequent Reuse Areas.

The usefulness of this technique will increase if samples are collected in Batches, i.e., time periods during which Samples are collected more frequently. The time period between the Batches can be rather long though, depending on the Sample Rate.

Modeling Instruction Misses

Even though the methods described so far describe how to estimate the miss rates of memory caches, such as cache 330 of FIG. 3, someone skilled in the art can easily use the described methods to also estimate miss rates of instruction caches (350) or unified caches (340). The reuse distance for Instruction Objects can be measured using so-called trace-points on the instruction addresses of the Instruction Objects.

Modeling Multiple Cache Levels

FIG. 3 shows an example of a modern memory system consisting of several cache levels. Assuming full inclusion between the different cache levels, the above described methods may be used to model such a system. Full inclusion between cache levels implies that if a Memory Object or Instruction Object resides in the higher-level and larger caches, they should also reside in the corresponding lower-level caches. With that assumption, the number of misses can be estimated independently for the L1 instruction cache 350 and the L1 data cache 330 using separate reuse histograms for instructions and data with appropriate block sizes. In order to estimate the number of misses for the unified L2 cache a joint histogram with instructions and data with the block size of the L2 cache needs to be merged from the separate instruction and data histograms. If the technique with time windows is used for the histograms, such a merge is needed for each time window.

Estimating Spatial Locality

Once a Memory Object has been brought into a cache, execution speed may be enhanced if all data items residing in the Memory Object are actually referenced by the Studied Application before the Memory Object is evicted from the cache. The larger fraction of the Memory Objects that are used by a Studied Application, the better is its so-called spatial locality.

We define Spatial Usage to be the average fraction of the Memory Objects that are used before their eviction from cache. Spatial Usage can be estimated for the entire execution of the Studied Application, or for a subset thereof, including but not limited to the Memory References of one of its loops, its Memory References to a selection of its data structures, or its Memory References performed by one of its functions.

One way of measuring the Spatial Usage is to first estimate the number of misses MO for a studied cache size Z and a Memory Object size O corresponding to the cache line size of the studied cache. Secondly the number of misses MA assuming the same size cache Z but a Memory Objects size corresponding to various data sizes A accessed by each Memory Reference is estimated. Assuming a perfect Spatial Usage, the fraction between the two miss estimates (MA/MO) should be equal to the fraction between the Memory Object size O and the average Memory Object size A.

In the case of a non-perfect Spatial Usage, the Spatial Usage ratio, where 1.0 indicates a perfect usage, can be estimated as a function of the modeled caches size S:

Spatial_usage(S)=MA*avg(A)/MO*O. A more generalized formula for Spatial Usage is:

$$\text{Spatial\_usage}(Z) = \frac{\sum_{i=1}^{M}(Asize(i) * Pm_A(i))}{Osize * \sum(Pm_O(i))} \approx \frac{\sum_{i=1}^{M}(Asize(i) * Pm_A(i))}{M * Osize * Pmisstot_O},$$

where M is the number of studied Samples from the ACD, Asize(i) is the accessed size for each such Sample and Osize is the Memory Object size for the modeled cache. Pm(i) is the miss probability for each Sample assuming the Object size indicated by the subscript letter and Pmisstot is the average miss probability for all the studied Samples assuming a Memory Object size of O.

$Pmisstot_O$ can be estimated for cache size Z using any of a number of suitable or appropriate methods, including but not limited to the methods described with reference to FIG. 14 (for random replacement) or FIG. 17 (for LRU replacement).

$Pm_A(i)$ can be estimated individually for each Sample, for example by using the Pmiss Method 440 described in FIG. 4 (for random replacement) and cache size Z and using the $Pmisstot_O$ estimated above for random replacement for the likelihood of a cache replacement: $Pm_A(i)$=Pmiss (Pmisstot*$rd_A(i)$), where $rd_A(i)$ is the reuse distance for each Sample i for Memory Object size A recorded in the ACD.

Another examples of how to estimate $Pm_A(i)$ includes, but is not limited to, the Method described with reference to FIG. 15 to first build a translation table S(D) based upon ACD data for Memory Object size O, and then use this S(D) individually to estimate either miss ($Pm_A(i)$=1) or hit ($Pm_A(i)$=0) based upon each value of the reuse distance $rd_A(i)$, where $rd_A(i)$ is the reuse distance for each Sample i for Memory Object size A recorded in the ACD.

While the technique described above works well for estimating the Spatial Usage for cache sizes with a high miss rate, the low miss rates of larger caches require the cold misses to also be taken into account in order to get an accurate estimate:

$$\text{Spatial\_usage}(S) = \frac{\sum_{c=1}^{no\_cold_A}(Asize(c)) + \sum_{i=1}^{M_A}(Asize(i) * Pm_A(i))}{Osize * (no\_nold_O + M_O * Pmisstot_O)}$$

The estimation of the number of cold misses (no_cold) can be estimated using the technique described with reference to FIG. 13 for each of the Memory Object size indicated by the subscript.

The number of unnecessary misses caused by poor Spatial usage for any given Memory Object size can be estimated by first calculating one minus the special usage, and then multiplying by the result with the estimated miss rate, which may be estimated using the Methods described in FIG. 14 or FIG. 17.

Spatial_miss_rate(S)=(1−Spatial_usage(S))*Miss_rate(S).

Figure 21:
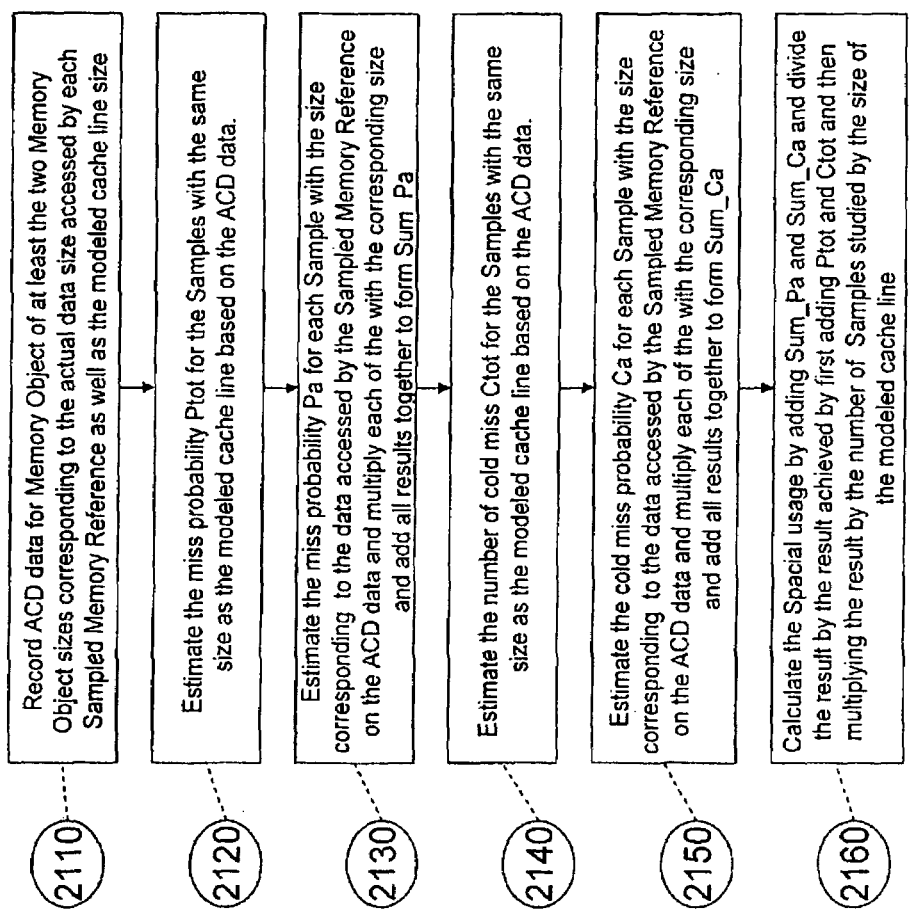
FIG. 21 is a flow chart of a method estimating spatial usage.

Turning now to FIG. 21: At step 2110 sampling of ACD data is performed for at least two Memory Object sizes, of which one is the size CL which may correspond to the cache line size of the cache to be modeled, and at least one of the other sampled sizes SL is smaller than CL. In one embodiment this could be done similarly to the method depicted at step 1101 in FIG. 11. One implementation is to choose size SL equal to the size of the data accessed by the sampled Memory Reference. Another example is to use a constant size for SL.

At step 2120 the miss probability Ptot is estimated for samples of size CL from ACD with respect to a chosen cache size. In one embodiment this could be done similarly to the method depicted in FIG. 14.

At step 2130 the miss probability Pa is estimated for each samples of size SL in ACD with respect to the chosen cache size. In one embodiment this could be done similarly to the method depicted in FIG. 14. Each Pa value is multiplied by the corresponding size SL and the results are summed to form Sum_Pa.

At step 2140 the coldmiss probability Ctot is estimated for samples of size CL from ACD with respect to the chosen cache size. In one embodiment this could be done similarly to the method depicted in FIG. 13.

At step 2150 the coldmiss probability Ca is estimated for each samples of size SL in ACD with respect to the chosen cache size. In one embodiment this could be done similarly to the method depicted in FIG. 13. Each Ca value is multiplied by the corresponding size SL and the results are summed to form Sum_Ca.

At step 2160 the Spatial_usage is estimated by, for example, calculating the value of (Ca+Pa)/(CL*M*(Ptot+Ctot)), where M is the number of samples from ACD used to estimate the values Ca, Pa, Ctot and Ptot.

Handling Samples from Different Contexts

The CPU executing the Studied Application may perform a context switch and start executing a different context, such as a different process and/or a different thread, fiber, strand, task or co-routine. In order to handle this case correctly, a virtualization of the hardware counters may seem necessary, i.e., the value of the hardware counters should be saved and restored by the operating system, or in some other way, such that it appears that each context has its own set of hardware counter, trap mechanisms and/or Watch Points.

If the system running is lacking virtualization of the hardware counters, this may be compensated for be the samples mechanism and/or the system model methods. One way of doing this is to tag a context ID (CID) to each of sample and to determine if some other context has been sampled between the sample was initiated and the reuse distance was recorded, i.e., during the Reuse Area as shown in FIG. 7. If so, the fraction of samples started by this context may be determined by dividing the number of samples started by this context with the total number of samples started during the Reuse Area. The reuse distance recorded may then be adjusted by multiplying its value with this fraction.

Modeling Parallel Activities

If several parallel activities, such as Threads or processes, are executing simultaneously on a Host Computer System, their ACD information may be recorded in a way that later allows a global view of the recorded activity of the execution. In this disclosure the term Thread is used to represent any such form of parallel activity.

The ACDs of several parallel activities may be put into the same data structure residing in memory, disk or elsewhere, or written into private ACD data structures. Each Sample can be tagged in a way that allows a representative approximation of the interleaving between the activities recorded for each Sample. This can be done, for example, using some kind of timestamptimestamp tagged to each Sample or by setting global Watch Points when recording reuse distances. Many possible schemes for tagging the Samples exist. In one scheme, a global clock is used to timestamp each recorded activity. Other solutions include, but are not limited to, using distributed clocks that are running in some synchronous or semi-synchronous way.

When modeling cache shared by several parallel activities, the reuse distance between two accesses to a Memory Object can be measured as the estimated sum of all intervening Memory References performed by all the Threads sharing that cache. The ACD data may be recorded with respect to one specific cache-sharing topology or may be recorded in a way that allows many different cache-sharing topologies to be modeled. In one embodiment, this may be done by determining or recording the number of Memory References performed so far for several of the Threads at the point in time a Sample is initiated as well as when the Sample is triggered (e.g., when one of its Watch Points is triggered). Another implementation is to timestamp the point in time when the sample is taken and triggered. This may be combined with an estimation of how many Memory References each Thread is performing per time unit. Another implementation includes, but is not limited to, recording of some Thread-local information, such as a local time stamp or the local number of Memory references performed at the Sampling point and triggering point, and to combine this with estimation of how many Memory References each Thread is performing for each of these units.

Modeling Coherence Misses

When modeling parallel activities accessing different caches, the cache coherence protocol, keeping the coherence between the caches, should also be taken into account. A coherence miss is defined as a Memory Reference which would have resulted in a cache hit in a non-coherent system, but has been turned into a cache miss caused by an intervening Memory Reference performed by another Thread not sharing the same cache. One examples of coherence misses can be found, for example, in a write-invalidate coherence protocol where a write performed by a Thread belonging to a different cache causes an invalidation activity and invalidates a Memory Object of the other cache. If such an intervening invalidation activity occurs between two Memory References performed by a Thread attached to one of the invalidated caches, a cache miss will occur regardless of the reuse distance between these two Memory Reference. Another coherence miss example is a downgrade miss, where a read Memory Reference performed by a Thread belonging to a different cache would cause downgrade activity and cause a Memory Object of a modeled cache to lose its write permission. A following local write Memory Reference to that cache will result in a cache miss regardless of the reuse distance to any previous local write Memory Accesses.

In order to model the coherent interaction as well as cache sharing between the Threads executing on any modeled memory configuration, each Watch Point mechanism used for the sampling of a Threaded execution may be set up in a global fashion. A Thread J may set a Watch Point for a Memory Object, which is later referenced by another Thread K between the point in time where the sampling was initiated by Thread J and the point in time where the Watch Point was triggered by Thread J. In that example, the intervening access to the memory Object by Thread K should cause the Watch Point to trigger in a way such that necessary information is recorded. In one embodiment, such an intervening Memory Reference by a different Thread K is recorded in the ACD associated with Thread J's first Memory Reference to A. One implementation is to keep the Watch Point active after the recording of the interleaving activity, anticipating the next Memory Reference to the Memory Object. Once the second access to Memory Object A by Thread J has been detected, the reuse distance to the first access to the Memory Object will be recorded in the ACD.

This way, the Sparse ACD 240 of FIG. 2 should be extended to also record information about intervening Memory References performed by other Threads. In one embodiment, information about every intervening Memory Reference is recorded. Examples of such information include, but are not limited to, the Thread ID of the intervening Thread, instruction address of the intervening instruction, as well as its access type, such as read, write or prefetech and the size of the Memory Object accessed.

In one embodiment, only information about a limited number of intervening Memory References is recorded in the ACD.

Figure 22:
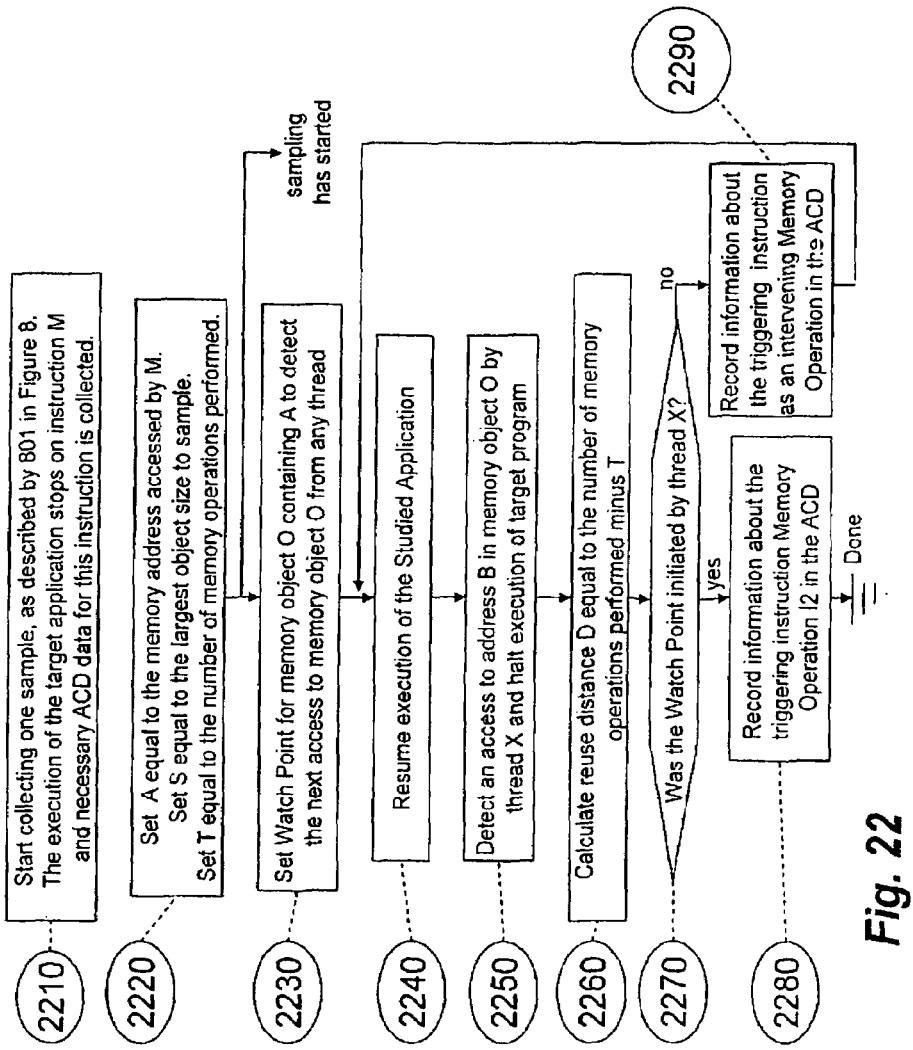
FIG. 22 is a flow chart of a method for collecting samples from multithreaded execution.

Turning now to FIG. 22: At step 2210 the Sampling of one Sample is initiated. This could for example be done as depicted in step 801 of FIG. 8.

At step 2220 information about the first Memory Reference of the Sample is recorded. Such recorded information could for example be the address of the Memory Reference instruction, the address accessed by that instruction, the Memory Reference type the thread ID, and some timestamp or ordering information associated with the event.

At step 2230 some kind of Watch Point mechanism is initiated for a Memory Object containing the data accessed by the Memory Reference such that the next reference to the Memory Object by any of the monitored threads will trigger step 2250.

At step 2240 the execution of the studied application is resumed.

At step 2250 the Watch Point set up at step 2230 is triggered.

At step 2260, some information about the Memory Reference triggering the Watch Point at step 2250 is recoded. Examples information that may be recorded include the address of the Memory Reference instruction, the address accessed by that instruction, the Memory Reference type and some timestamp or ordering information associated with the event.

At step 2270 it is determined if the Memory Reference triggering the Watch Point at step 2250 was performed by the same thread that initially initiated this Sample. If so, we turn to step 2280, otherwise we turn to step 2290.

At step 2280 information about the Memory Reference triggering the Watch Point mechanism at step 2250 is recoded and associated with the second access to the Memory Object in this sample. Examples information that may be recorded include the address of the Memory Reference instruction, the address accessed by that instruction, the Memory Reference type and some timestamp or ordering information associated with the event.

At step 2280 information about the Memory Reference triggering the Watch Point mechanism at step 2250 is recoded and associated with list of intervening Memory References. Examples information that may be recorded include the address of the Memory Reference instruction, the address accessed by that instruction, the Memory Reference type, the thread ID, and some timestamp or ordering information associated with the event.

Modeling Multithreaded Memory Systems

One way to model coherence misses is to use a two-phase procedure. The first phase is to estimate the overall miss ratio and the probability for a hit or a miss for a Memory Reference in a non-coherent system while only taking accesses from Threads sharing the same cache into account. This could for example be performed using the method described with reference to FIG. 14 or 17, depending on the cache organization model: random or LRU. The second phase determines if intervening Memory references by Threads attached to other caches will turn a previously determined cache hits into a cache miss. If a certain memory operation was deemed to be a cache hit with the probability X during the first phase, but it is later determined that an intervening Memory Reference by a different Thread turned it into a cache miss, a coherence miss has been determined with the probability X.

FIG. 23 illustrates an example with memory streams stemming from two simultaneously executing Threads J (2010) and K (2020). Each memory access has here been labeled with its global sequence number in this example. The memory access stream of Thread J (2010) contains two accesses to the Memory Object A.

Assuming that Threads J and K do not share the modeled cache, the reuse distance for Memory Object A is 5 (#3, #5, #7, #9; and #11) during the first phase and the corresponding miss probability Pmiss for the J's second access to A can be estimated, for example by using the Method 510 in FIG. 5. During the second phase it is determined that one intervening access by Thread K is recorded (#4 in 2320) between Thread J's two Memory References to Memory Object A in the memory stream 2310. This result in a communication miss probability Pmiss to be estimated depending on the memory operation (read or write) performed by Memory Reference #1, #4 and #13. Examples of combination where a coherence miss may be recorded include combinations where: #4 is a write and #13 is a read (invalidation); and, #1 and #13 are writes and #4 is either a read (downgrade) or a write (invalidation).

A communication for a specific memory operation can be detected by setting a Watch Point mechanism for the memory object accessed by one thread. If the Watch Point mechanism later is triggered by a memory operation performed by a thread other than the thread first accessing the memory object, and either of the two threads perform a write operation to the memory object, a communication miss has been detected.

If the Watch Point is kept alive to monitor more accesses to the memory object from the two threads the identity of the data-sized object within the memory object accessed by each thread is recorded and it is determined that the two threads do not access the same data-sized objects, the communication miss detected is of the type false sharing.

If the two Threads of FIG. 23 share the same cache in the modeled Memory System, the applicable reuse distance for the a Sample started for Memory Reference #1 could either be measured to #4 (reuse distance 3) or to #13 (reuse distance 11), depending on the type of memory references for #1, #4 and #13. For example, if #1 is a write and #4 is either a read or a write then reuse distance 3 should be used; if #1 is a read and #4 is a read then reuse distance 3 should be used; or if #1 is a read and #4 is a write then reuse distance 11 should be used.

Figure 24:
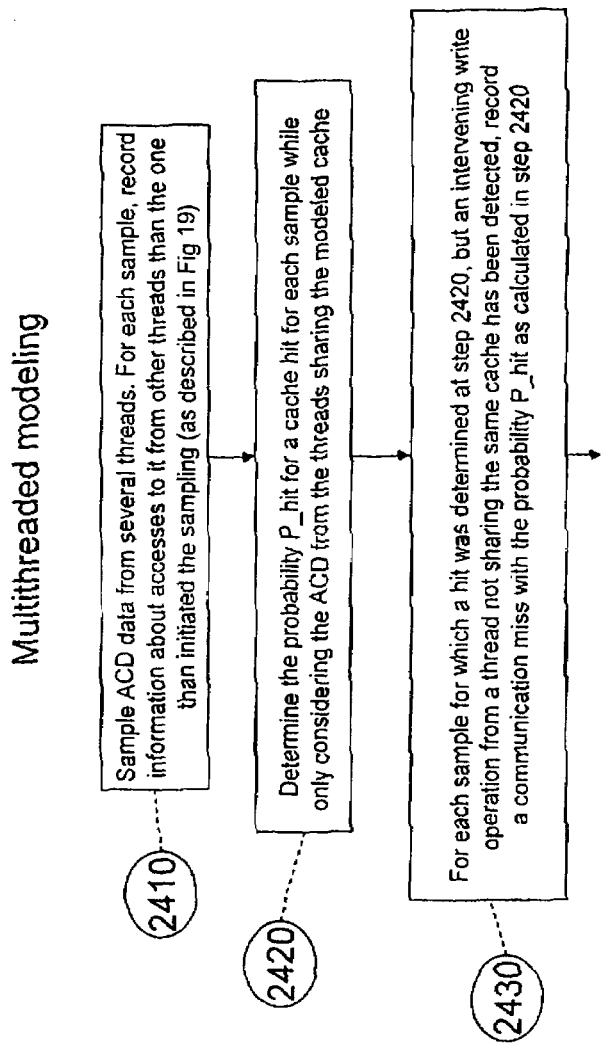
FIG. 24 is a flow chart describing multithreaded modeling.

FIG. 24 is a flow chart depicting a method of multithreaded modeling. As shown in FIG. 24, the method includes sampling ACD data from several threads, and for each sample, recording information about accesses to it from other threads than the one the initiated the sampling, at 2410. The method includes determining the probability P_hit for a cache hit for each sample while only considering the ACD from the threads sharing the modeled cache, at 2420. The method includes, for each sample for which a hit was determined, but an intervening write operation from a thread not sharing the same cache has been detected, recording a communication miss with the probability P_hit as calculated, at 2430.

Detecting False Sharing

The coherence misses described above would occur as long as the data accesses by the two Threads reside in the same Memory Object (sometimes referred to as a cache line) even if the Threads do not access the very same piece of data within that Memory Object. This is known as false sharing in the literature, i.e., the two memory operations do not directly share any piece of data values and the coherence miss detected is purely a caused by the Memory Object size in combination with the data layout in memory.

A different data layout in memory, such that the two data values do not reside in the same Memory Object, would remove the coherence miss. The false sharing coherence misses can potentially be removed if a different data layout or a different cache line size was applied. Thus, it is important to distinguish the false sharing coherence misses from the true sharing coherence misses.

One way to detect false sharing is to set up two Watch Points for each sampled memory access, one for the size corresponding to the cache line of the modeled cache and one for the size corresponding to the size of the data object being accessed by that very memory operation. For example, in the case of a "load byte" memory operation, one Watch Point mechanism of the size one byte and one Watch Point corresponding to the Memory Object size (cache line size) would be created. If the Memory Object-sized Watch Point detects coherence while the byte-sized Watch Point does not, false sharing has been detected. If the byte-sized Watch Point also detects coherence, true sharing has been detected. In one embodiment the smaller Watch Point size is chosen to some size smaller than the cache line size, but not necessarily equal the accessed data size. Still, many false sharing cases may still be detected.

Spatial Communication Locality

Similar to Spatial Locality, Spatial Communication Locality is a measurement of the fraction of a cacheline that has been involved in a coherence miss, and that is used before it is either evicted, downgraded, invalidated or affected in some way that will later result in a cache miss or coherence miss. Similar to the detection of Spatial Locality the amount of Spatial Communication Locality can be measured by comparing the amount of coherence activities that take place for differently sized Memory Objects. For example, the amount of miss activity (MA) associated with a Memory Object size A corresponding to the actual access size of the Memory Reference can be compared with the miss activity (MO) associated with a Memory Object size O corresponding to the cache line size or the coherence unit size or the data size for which the coherence is maintained if this differs from the cache line size Similarly to Spatial_usage, we can define Spacial_communication_usage to be the fraction of the cache line used. The following formula symbolizes one of many possible ways of estimating its value.

$$\text{Spatial\_communication\_usage}(S) = MA * \text{avg}(A) / MO * O$$

Estimating Cache Sharing Effects

The cache behavior of an application can be represented by a function or curve showing how the cache miss rate changes as a function of cache size. If memory accesses caused by other means than cache misses are taken into account, including but not limited to hardware and software prefetching, a function or curve showing how the number of fetches from the next higher cache level changes as a function of cache size. For the cache level closest to the memory system, such a function or curve would correspond to the number of accesses to the memory system.

In one embodiment, such miss functions or fetch functions can be produced based on ACD data. This could for example be performed using the method described with reference to FIG. 14 or 17, depending on the cache organization model: random or LRU, while varying the cache size modeled by the selected scheme. Similarly, the corresponding fetch functions can be estimated if memory accesses caused by other means than cache misses also is taken into account.

One can also model a function or a curve showing how the number of misses per time unit or fetches per time unit changes as a function of cache size, referred to as misses_per_tu and fetches_per_tu respectively. This could for example be done by scaling the earlier discussed miss function or fetch function.

In one embodiment, this is done by taking the latency effects of cache misses into account while taking the earlier discussed. Since smaller cache size causing a larger cache miss rate will cause the application to run slower compared with larger cache size resulting in a lower cache miss rate per time unit compare compared with if this fact was not being given any attention. The performance penalty for this may be estimated, for example by multiplying the increased number of misses with the miss penalty for each miss, and to compensate for this effect.

If the fetches_per_tu is known for several applications or threads sharing a cache, the fraction of the cache devoted to each application or thread can be estimated. Assuming a fully associative random replacement cache, all memory objects in the cache are equally likely to be evicted upon a replacement. From this follows that the fraction of an application's or thread's memory objects residing in a cache will be proportional to the fraction of memory objects it fetches to the cache with respect to the number of memory objects fetched to the cache by all applications or threads.

If we know the fetches_per_tu function for each of the applications or threads sharing a cache, we can find the fraction of the cache used by each application or thread by finding the collective working point for all threads such that the fraction between the amount of cache it uses and the fetches per time unit it produces at that point is equal for all the applications or threads. Furthermore, the sum of the amount of cache used by each application should be equal to the total cache size of the shared cache.

Figure 25:
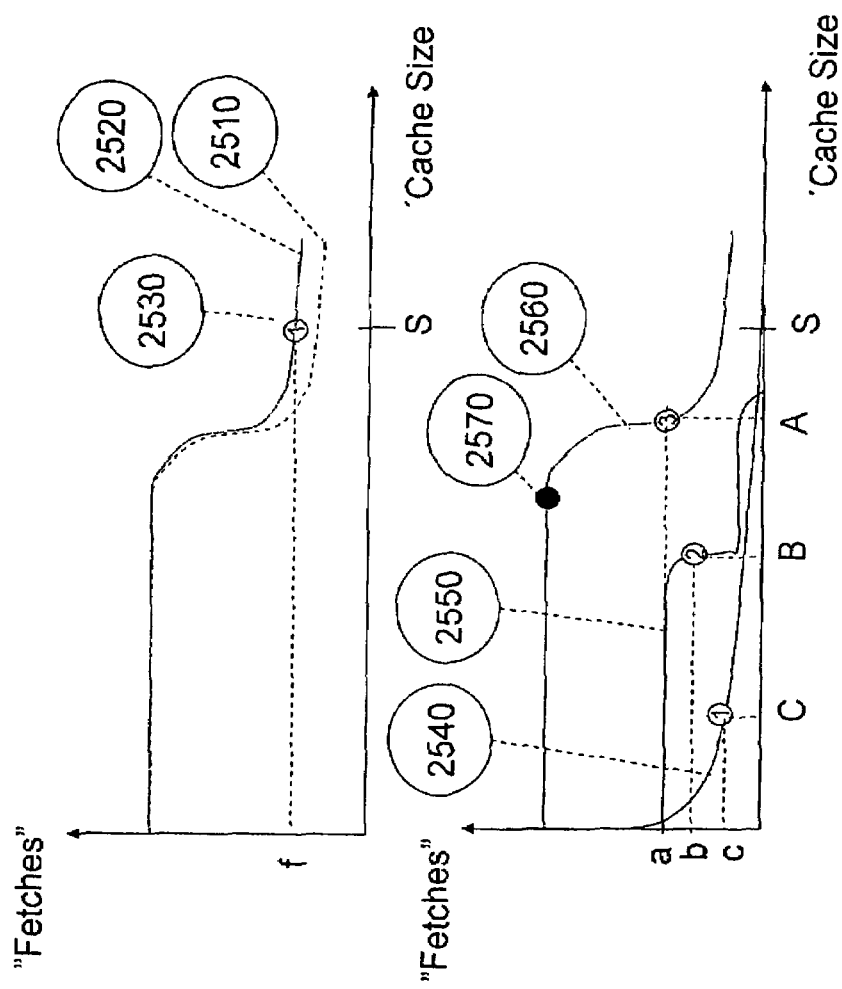
FIG. 25 is a drawing describing cache sharing modeling.

Turning now to FIG. 25, the top graph shows an example of a cache misses as a function of caches size for an application (2510), i.e., the fraction of memory accesses producing accesses to the next level (or memory for the top level), while curve 2520 displays the number of fetches per time unit. When the miss ratio goes down for larger caches the application runs faster and subsequently more fetches will occur per time unit if this is factored in. (For clarity, function 2520 and 2510 have been scaled to show the same value for a cache size=0). For a cache of size S, the working point for this application is shown by the number 1 labeled 2530. The number of fetches performed at the working point can be read out at the y-axis and is labeled f.

The lower graph of FIG. 25 showing the fetches per time unit as a function of caches size for three applications (2540, 2550 and 2560) sharing a cache of size S. The working points for each application, labeled 1, 2, and 3, has the property that the fraction of misses per second for each application (lower case letters a, b and c) divided by their respective cache size used (capital letters A, B, and C) is identical for all three applications, furthermore A+B+C=S. Given that the misses per second functions 2540, 2550 and 2560 are known, the three respective working points can be found by iterative methods.

In one embodiment of such an iterative method, each application is given an equal share of the cache to get an initial guess and the fraction between fetches and estimated share of the cache is calculated. Applications with too high ration are assigned a slightly larger cache size and application with a too low ratio is assigned a smaller portion of the cache in such a way that the sum of cache size assigned to each application is still equal to the total cache size, where after a new fraction is calculated for each application. This step is repeated until the fractions for all applications are within a certain threshold.

Modeling Other Forms of Caches

Caching techniques are widely used as hardware and software techniques to speed up various forms of execution, including but not limited to, web caching, disk caching, caching of address translations in a TLB and caching of branch history in a branch predictor. The virtual memory mechanism that moves data between different levels in the storage hierarch, for example a hierarchy consisting of fast RAM—slow RAM—disk—tape, is a form of caching of data. Even though the corresponding Memory Object size, the cache size and some other properties may vary widely compared with the memory systems described so far in this disclosure, the techniques and mechanisms described herein is also applicable for all kinds of caching. The conclusions drawn from the modeling of such system using the methods described herein can be used to improve the efficiency of the caching strategy, including but not limited to giving feedback and suggestion of improvements to the system developer or using the information to dynamically change the caching strategy at runtime.

The methods and techniques described in this disclosure may be applied at all ACD data collected during the entire execution of the Studied Application. Each method can also be applied to just a selection of ACD data, such as the ACD data associated with one data structure; with a set of data structures; with one specific instruction; with one set of instructions such as the instructions of one loop or the instructions of one function; with one phase of the execution; with one time window of execution; or any other possible selection of ACD data. Multiple cascaded selections may also be applied, such as a selection of ACD data performed by the instructions of one specific loop accessing one specific data structure.

Such selection can be performed, for example, through a three-phase strategy, where all ACD data is used in the first phase to estimate some overall performance properties, such as the miss rate (for the modeling of random replacement caches) or the translation table from reuse distance to stack distance (for modeling LRU caches).

The second phase is to pick out the selected Samples according to the selection criteria. For a data structure starting at address A and ending at address B, only Samples concerning data addresses in that address range are considered. Such can also be performed, for example, on a instruction address basis or time-stamp basis.

The third phase is to go through the selected Samples and estimate one of the estimations outlined by some estimation Methods outlined in this application.

One such example of how to apply the three phases is how to estimate the hit rate for all the Memory References performed by one specific instruction at address I in a random replacement cache of size S. First, the entire application is run and a sparse ACD is collected. As a first selection phase, the miss rate R of the application is estimated using all the samples as outlined in FIG. 14 with respect to a cache of size S. As described earlier in this application, this may be done by dividing the Samples of the ACD into Sample windows and applying the Method of FIG. 14 to each window and thus the R value for that specific window. As a second selection step, the Samples for which I2 (referring to ACD 240 of FIG. 2) is equal to I are selected. As a third step, the miss probability for each of these Samples is estimated using the Method 440 of FIG. 4, in which the number of cache misses since last touched is calculated as the miss probability for the corresponding sample window (estimated during phase two) multiplied by the reuse distance for that Sample with respect to a cache of size S. The average miss rate for Instruction I is calculated as the average of the miss probability values estimated in phase three.

Dynamic Instrumentation/De-Instrumentation

Dynamic instrumentation is a technique to alter executable code at execution time to change its behavior. Dynamic instrumentation can, for example, be used to speed up an application or to collect information about its behavior. In one embodiment, dynamic instrumentation techniques can be used to alter an executable to collect ACD during its execution. The altered code would for example implement the collection of ACD information 210 as described in connection with FIG. 2. One way of collecting such information is described in the method and steps of FIG. 10.

Controlling the dynamic instrumentation from activities originating outside of the running process supports new areas of usages. One such area is instrumenting an application which is already running. Another area is to make the instrumentation process more transparent to existing applications, which would not require any alteration before the process is started, nor is there any need to start the process in any new way.

The usefulness of dynamic instrumentation further increases with the ability to de-instrument the code after some time, i.e., restore the old code, or change the code back to a behavior similar to the original code in some respect, or in any other way change the code such that some functionality added by earlier instrumentation is removed. Whenever the term de-instrumentation is used, one alternative embodiment includes re-instrumentation, i.e., changing the instructions to form a third representation of the instructions, which neither is identical to their original representation nor to the instrumented representation of the original instructions.

In one embodiment, a code which has been dynamically instrumented to collect information about its behavior is de-instrumented after a time period and changed into a functionality that no longer collects such information. One of several advantages with such a scheme is that the de-instrumented code would be able to execute faster that the instrumented code. In one embodiment, the de-instrumented code is identical to the code before it was first dynamically instrumented. In another embodiment, the de-instrumented code is altered to only remove some of the new functionality added by some previous dynamic instrumentation activity. In yet another embodiment, the de-instrumented code is altered compared to the original code to improve upon the original code in some aspect.

Starting the dynamic instrumentation of an execution taking place in one process by means of external force may require one or many steps. According to one implementation, a signaling step provides a method of signaling to the processes that instrumentation should start. In one embodiment, this is accomplished by using a debugging API to attach a monitor process to the process to be instrumented and to signal it to stop and to further control aspects of its execution using the debugging API.

Another implementation borrows some memory locations from the process and alters the locations in order to make the process start the instrumentation. Examples of such memory locations include locations the process uses to store the data or instructions, such as a code page or data page. The contents of the borrowed location may be copied by the outside activity to a temporary location and is later restored by the outside activity again. In one embodiment, this is accomplished by first copying the contents of the borrowed location to some storage area outside the process being instrumented, to later allow for the contents of the borrowed location to be restored.

Another method is to alter the borrowed memory location to contain instructions that cause the process to start the dynamic instrumentation. The process may be known to begin execution according to instructions in that location. Another way to make sure the alteration will take effect is to force the process to start acting according to those instructions. In one embodiment, this is done by writing binary code to the borrowed area and to change the program counter of the process to start executing those instructions. In another embodiment, the process includes interpreting a representation of a program stored as data, in which case the interpreter is temporarily interrupted by bootstrapping the instrumentor, and interpreter operation is resumed under instrumentation control after the bootstrap process is completed and memory restored.

In order to allow for de-instrumentation, some means for signaling the instrumented process to start the de-instrumentation is required. This signal may be generated by the process itself, or may come from supplied externally to the process. In one embodiment, a flag residing in the memory of the process is used to signal the start of the de-instrumentation. Another embodiment utilizes an appropriate trap to occur. Those skilled in the art would readily appreciate and recognize the many different methods of signaling can be used in such a situation.

When receiving such a de-instrumentation signal, the behavior of the process may preferably be altered to remove some of the new functionality introduced by previous instrumentations. In one case of de-instrumentation, all the new functionality introduced by instrumentation is removed.

Copies of previous versions of instrumented code as well as the de-instrumented code may be stored somewhere in memory while the process is subject to dynamic instrumentation. If a de-instrumentation is signaled to the process, its state, such as its CPU state or its interpreter state, may be altered to be compatible with the previous program version or program state targeted by the signal and the process control changed to continue the execution from the previous version. In one embodiment for which the binary code has been altered by the instrumentation, the CPU registers are altered to be compatible with the de-instrumented code and the program counter changed to continue the execution in the place in the de-instrumented code which corresponds to the current place of execution in the instrumented code.

One method that may be used to collect performance information of an application is to collect performance information only during one or many shorter sample-windows throughout the execution of the application. These time windows may be distributed over time according to some distributions scheme, for example uniform distribution or some kind if random distribution, or may be guided by some phase detection algorithm, for example an algorithms which detects when the application enters a new phase with a new behavior. In one embodiment, the dynamic instrumentation is activated for the application at the beginning of such a sample window and de-instrumented at the end of the sample window.

Spatial and Temporal Reuse Distance

Reuse distance is the duration between two subsequent accesses to an object. The duration may be measured using a large variety of different time units, including, but not limited to: the number of clock cycles; the number of memory references; the number of unique memory references; and the wall-clock time or real-time. Examples of objects include, but are not limited to: data objects, cache lines, variables, memory pages, program instructions and basic blocks.

Reuse distance may be measured by studying a full trace of events and measuring the duration between two such accesses. In one embodiment, the reuse distance is measured by setting up a watchpoint or tracepoint mechanism for the studied object, which generates a trap the next time the object is touched, in combination with some means of measuring the distance of the point in time when the watchpoint or tracepoint was initiated and the point in time the point in time when the second access to the object triggered the watchpoint or tracepoint. Examples of such watchpoint mechanisms include, but are not limited to, the method and steps shown in FIG. 10.

A temporal reuse distance is the reuse distance between the point in time when the smallest possible object containing the information used by a first event is touched, and the point in time a different event touches the very same object. In one embodiment, it is sufficient if the second event only touches one part of the object that was touched originally. Examples of mechanisms measuring temporal reuse distance include, but are not limited to, the method and steps shown in FIG. 10 assuming that the object size O is identical to the object accessed by instruction M in step 1020.

A spatial reuse distance is the distance between the point in time when the smallest possible object containing the information used by a first event is touched, and the point in time when a different event touches a larger object containing the original object. Examples of mechanisms measuring temporal reuse distance include, but are not limited to, the method and steps shown in FIG. 10 assuming that the object size O is the larger object which is large than the original object M touched at step 1020.

In one embodiment, the temporal reuse distance is the duration between the point in time one part of a computer system's memory is touched and the point in time the same part is touched again. Examples of such memory parts include, but are not limited to, byte, word or instruction stored in memory. In the same system, the spatial reuse distance is measured between one part of a computer system's memory that is touched and the point in time a certain larger part of the memory, containing the previously touched memory part, is touched again. Examples of such larger memory parts include, but are not limited to, word, cacheline, basic block, page, and superpage.

Sequence Stitching

When collecting sparse samples from an execution, for example the ACD data collection described in FIG. 2, the sequence of instructions executed by the program can not directly be read out from the data collected. In the example discussed in connection with FIG. 2 the address for each sampled instruction is labeled I1. If samples from several adjacent instructions have been collected, and we know their respective instruction I1, we have recorded a partial sequence of instructions addresses. In other words, we know the sequence of those objects sampled.

The partial order of specific program objects, e.g., operations executed in response to a program, and instruction types may be collected in a similar way. For example, if only memory operations are sampled and if it can be determined that the memory operation B is the first memory operation to follow memory operation A, then the partial sequence between the two operations can be determined. It may also be possible to build up a statistically valid picture of the order from several instances of non-adjacent samples. Similar partial sequences can be determined for other object and instruction types, including but not limited to branches, basic blocks and so on.

One way to increase the likelihood of sampling adjacent program objects is to perform the sampling in batches, such that several samples are collected close in time. One example of this is to sample many of the program objects during some short time interval. Another way to achieve a similar effect is to also introduce more light-weight samples, collecting less rigorous information, and to record these light-weight samples more often than the normal and more costly samples. As long as the program object identifier, such as its address, is part of the information collected for the light-weight samples, they can be used to observe the partial sequence of program objects. Another method to observe a partial sequence of program objects is to add the identifier of the next (or preceding) program object, such as its address, to the information collected in for each sample. We refer to the identifier of the next program object as I1+(I1−). Another method to observe a partial sequence of program objects is to extract such information from the dynamic instrumenter.

If we know the partial order between program sequences objects: sequence B follows sequence A; and based on a different observation also have observed the partial order: sequence C follows sequence B; we may stitch together the larger partial order: sequence C follows sequence B which follows sequence A. This and other techniques may be used to stitch larger partial orders between objects together based on sparsely sampled information. If a partial order contains the same object more than once, a cyclic sequence of objects may have been observed. Examples of such cyclic include, but are not limited to, loop constructs in program. If for example the sequence of memory operation (or sequences) A, B, C, A has been observed, we can suspect that a cyclic flow, such as a loop, containing the three memory operations (or sequences) A, B and C exists. If the same cyclic sequence is observed several times, we can further determine that this is a common cyclic flow.

Some program objects have several different successor program objects which may be recorded with different probability in a ACD. For example, in the above illustration we may have recorded that A follows C for most of the samples, but that a different program object D (in this case a memory operation) follows C 10% of the time. In such a situation, we have detected an exit point from the loop A, B, C which will be taken approximately one out of ten times through the loop.

This exit point D may belong to an alternative path of the previously detected loop A, B, C of the above example. The exit point may also lead to a higher level cyclic sequence of program objects, such as an outer loop.

In one embodiment, the stitching may be performed by starting a traversal at an arbitrarily selected program object that is not yet identified to be part of a cycle, and stitching along one of the successor paths until the next program object successor has already been visited during this stitching, at which point a cyclic sequence has been detected.

In another embodiment, the previously described embodiment is started at the most frequently sampled program object. One implementation includes a strategy where, at each stitching step, the most probable successor is chosen. Should such a successor be part of an already identified cyclic sequence, that sequence is noted to be a probable inner cycle of the one being traversed, and traversal continues along the most probable of the currently unused exit links from that inner cycle.

The above described methods can be used in the other direction such that the stitching is performed backwards. In such schemes, the predecessor instruction, for example I1−, is used instead of the successor, for example I1+.

In another embodiment, the instrumentation emits partially stitched sequences of program objects, including but not limited to instruction traces and basic blocks.

According to yet another embodiment, a method of reconstructing a sequence of instructions executed by a program of instructions includes the steps of starting to execute a sequence of operations in response to the program of instructions; selecting a set of operations from the sequence of operations; and, recording memory usage information associated with respective operations of the set of operations from which several partial sequences of the sequences of instructions can be determined; determining one of the partial sequences wherein a first sequence of instructions is followed by a second sequence of instructions; determining that the second sequence of instructions is followed by a third sequence of instructions; and reconstructing a longer sequence of instructions to be the first sequence followed by the second sequence followed by the third sequence.

Dependence Groups

Two program objects may touch data belonging to the same studied data object, such as a cache line, and be labeled as belonging to the same dependence group. Methods to determining program objects touching the same data object include, but are not limited to, the method and steps described in FIG. 10 if the object size S is identical to the data object size. The ACD information recorded by these steps will include a sample for which the program objects identified by I1 and I2, respectively, belong to the same dependence group with respect to data objects of size S.

Memory objects may be reused for different purposes in different parts of the code. One method for avoiding that unrelated program objects are inappropriately grouped together in a dependency group is to require that instructions that are part of the same dependency group share a similar call stack. Another method is requiring instructions to be part of the same detected cycle.

In one embodiment two instructions are only determined to belong to the same dependence group if their reuse distance has a certain relationship to the number of program objects in the corresponding cyclic sequence, for example only if the reuse distance is less than three times the number of memory operations of the cyclic sequence they belong to.

Data Chains

Data chains between two memory operations can be determined if they touch the very same piece of data. If data chain analysis determines that memory operation A is data dependent on memory operation B; and that memory operation B is data dependent on memory operation C, then it can be determined that A is data-dependent on memory operation C. We say that memory operations A, B and C belong to the same data chain.

In one embodiment the method and steps described in FIG. 10 with the object size S identical to the data size can be used to determine which instructions are included as touching the same data. Thus, a memory operation A identified by the instruction address I2 of the sparse ACD 240 in FIG. 2 collected using the steps described in FIG. 10 is data dependent upon the memory operation B with the instruction address I1 of the same sample. If another sample with I2 equal to B has been detected, that memory operation B is data dependent on the memory operation C determined by the memory operation address I1 of the sample. Such a scheme may determine many, but not necessarily all, memory operations that may have touched the same piece of data prior to memory operation C.

Data chains can be used to identify the points previous to (or following) a particular program object into which the very same data object was written. In one embodiment, this is done by determining that a previous instruction in the data chain performed a write instruction. In one embodiment the data chain discovery process is terminated at an operation of a specific type. In one application this can be used for augmenting debug information to help identify language level data structures, since it is common that for each statement, at most one variable or structure is written to and it will be identified by following data chains. In another application this can be used for analyzing the possibilities for moving code around, since moving code across a dependent write operation might alter program semantics.

In yet another embodiment all the instructions belonging to the same data chain is detected and presented to the user.

In one embodiment, the call stack information of each instruction address is considered when establishing the data chains.

According to another embodiment a method of identifying data-chained instructions in a program of instructions includes the steps of starting to execute a sequence of operations in response to the program of instructions; selecting a set of operations from the sequence of operations; recording memory usage information associated with respective operations of the set of operations; and based on the memory usage information, detecting an identity of a first operation of the sequence of operations accessing a data object and an identity of a second operation of the sequence of operations accessing the data object so as to identify data-chained instructions.

Heuristics:

Many of the properties previously mentioned in this disclosure can be used to identify performance shortcomings of the application from which the performance information, such as ACD, was derived. In one embodiment, one or many of the properties: miss rate, temporal reuse distance, spatial reuse distance, size of the data object accessed, spatial usage, reuse histogram, dependence group, and/or data chains are used to determine if an application contains performance shortcomings that would result in a poor performance on a given computer system. In another embodiment, the above mentioned properties are used to determine what type of performance problem(s) present in or exhibited by the application. In yet another embodiment, the above mentioned properties are used to determine suggestions as to how the application can be altered to improve its performance. In a preferred embodiment, the information from one or many of the three embodiments above are presented to a programmer. In another embodiment, that information is provided to a software component, such as a runtime system, linker or compiler so as to optimize application performance.

The performance shortcomings of the application can for example be determined with respect to one specific cache organization, including but not limited to, a specific cache size, cache line size, replacement strategy and associativity, and portions of the application identified that may be altered to perform better for a system with a cache of that organization. In one embodiment, the application's properties for that cache organization is first determined and then certain performance heuristics are used to identify the performance shortcomings.

Performance shortcomings mentioned above include, but are not limited to issues concerning the order of a cyclic sequence of an application, such as the loop order of nested loops. Nested loops, which have one or more loops inside the body of another loop, can often execute more efficiently if one of the loops as far in as possible traverse data structures along the same dimension as the layout of the cache line in the memory system. Those skilled in the art would recognize and appreciate that the second index x of an array variable a[y][x] accessed in a nested loop written in the language C should be advanced by a loop further in than the loop advancing the first index y of that array in order to better utilize caches and thus create a more efficient execution.

Methods for detecting loops include, but are not limited to, sequence stitching. Such methods can for example determine the addresses of the memory instruction of a loop and subsequently also the number of memory operations of a loop.

One way of detecting performance shortcomings concerning cyclic sequences of an application include heuristics based of the properties spatial reuse distance. In one embodiment, a loop is determined to have performance shortcomings if none of its dependence groups have a spatial reuse distance equal to or smaller than a specific threshold, for example the number of memory operations of that loop, and at the same time has a spatial locality lower than a specific threshold, for example lower then 80% for the studied cache size. In another embodiment, a filtering property is added to the previous embodiment, such that performance shortcoming is only determined if the spatial locality for that dependence group is above a threshold for some larger cache size, for example above 90% for a 256 Mbyte cache.

Performance shortcomings mentioned above include, but are not limited to issues concerning poor data layout. A data structure may be allocated in a way that will result in performance shortcomings. This is referred to as poor data layout. If frequently used data are placed adjacent to rarely or never used data, or if frequently used data is placed adjacent to memory locations that are never used, their co-location in the same cache line will result in a poor spatial locality. This is referred to as poor data layout. In one embodiment poor data layout may be detected if a dependence group is experiencing a spatial locality below a certain threshold for a cache size above a certain size, for example a spatial locality below 90% for caches larger that 256 Mbyte.

Performance shortcomings mentioned above include, but are not limited to issues concerning poor sparse accesses. A data structure may be allocated in a way that does not concur with the way the data is being accessed by the loops of the application. For example, if a data structure contains two or more adjacent data values associated with each data item of the structure, such as the struct construct in the language C, and all the items are looped through in a loop which only accesses a subset of the data values stored for each item, the loop may experience poor spatial locality. We refer to this as sparse accesses. In one embodiment this is detected if the spatial locality of a dependence group limited to the instruction of one loop is low, while the spatial locality is higher for a corresponding dependence group which also includes instructions from the loop and also instructions from outside of the loop.

Sparse accesses to a data structure may be caused by a randomized access pattern. Examples of this include, but are not limited to, hash tables and other tables used for randomized lookups as well as pointer-chasing algorithms. We refer to this as randomized accesses.

In one embodiment, sparse accesses are determined to also be randomized accesses if the reuse distance measured for these have a rather randomized distribution, such as a uniform distribution, rather than a few frequently occurring reuse distance ranges.

In another embodiment, sparse accesses are determined to also be randomized accesses if the stride between subsequent accesses to the data structure have a rather randomized distribution, such as a uniform distribution, rather than a few frequently occurring reuse distance ranges. Yet another method to determine random distribution is determining that the stride varies between positive and negative values in a rather irregular manner. In another embodiment, this is established by observing that the number of positive strides are not either much larger or much smaller than the number of negative strides.

In one embodiment, randomized accesses are detected as a separate performance shortcoming and sparse accesses are only detected as such if they are determined to not be randomized accesses.

In yet another embodiment, a method of detecting performance shortcomings for a program of instructions includes the steps of starting to execute a sequence of operations in response to the program of instructions; selecting a set of operations from the sequence of operations; recording memory usage information associated with respective operations of the set of operations; based on the memory usage information determining for a part of the program of instructions corresponding to the set of operations, at least one of the following properties: (i) temporal reuse distance, (ii) spatial reuse distance, (iii) spatial usage; and, based on at least one of the properties determining a performance shortcoming of the program of instructions.

Performance shortcomings mentioned above include, but are not limited to issues concerning loop fusion. A loop may access elements of a data structure previously accessed by a different loop. If the distance between the two loops is too large, or if the amount of data accessed between accesses to the same data in the two loops is large, the accesses to the data structure performed by the second loop may experience cache misses. We refer to this performance shortcoming as loop fusion. The misses may be avoided if the two loops were moved closer, or if some of the activities performed by the two different loops are instead performed by the same loop. In one embodiment, this performance shortcoming is detected by studying the identity of the last instruction previously touching data from a data structure touched by a loop. In yet another embodiment the likelihood of a cache miss for the access of the second loop should be above a certain threshold in order to determine loop fusion. In yet another embodiment similarities between the two loops, for example looping along the same dimension, are used as indicators or a loop fusion condition.

A data structure may be repeatedly accessed by the same loop, but the duration between the accesses so long (i.e., time interval between accesses exceeding some threshold value) that the probability for a cache miss is high. This may be overcome if the algorithm is changed so that more work is performed on a portion of the data structure before the algorithm moves on to work on a new portion of the data structure. This technique is often referred to as blocking in the literature. In one embodiment, the need for blocking is determined by detecting repeated accesses from memory operations of a loop to a data structure so far apart the accesses are estimated to cause a cache miss. In another embodiment, both the sample address I1 and the trigger address I2 are determined to be in the same loop and the reuse distance so large that the miss probability is high.

Some performance shortcomings, including, but not limited to loop fusion and blocking issues, come in two variations: spatial and temporal. The temporal variant can be detected if the studied properties are measured between data object of the size being accessed by the application, while the temporal variants are determined if larger data objects, for example object of a certain cache line size, are studied.

Some of the performance optimization required to overcome some of the shortcomings discussed, including but not limited to loop fusion and blocking, require parts of the program to be moved. For example, loop fusion will require some statements of the first loop to be moved to the second loop, or statements from the second loop to be moved to the first loop. It can be complex to determine if such a move would be in violation of the behavior of the program, i.e., cause unforeseen anomalies in program execution. An example of such possible violations would be a read instruction being moved above a write instruction producing the value it is supposed to read. A different example is a write operation which is moved below a read instruction which is supposed to read its newly stored value. In one embodiment, data chains are used to detect if a code move is valid and will not violate, for example, some expected order of operations, processes, etc. For example, for every read operation planned to move upwards, a determination is made concerning whether the read operation would be moved past a write operation in its data value chain. Likewise, for every write operation considered to be moved upwards, it is determined if it would be moved past a read operation in its data value chain. In one embodiment, the existence of dependent operations is determined using the algorithm for follow data value chains.

Some of the properties described can also be used to assess the efficiency of prefetch operations. In one embodiment, information about prefetch operations is recorded in the ACD information and labeled as a specific type of sample. In one embodiment, a sampled prefetch operation will start a normal sampling activity, as shown in FIG. 10 and it will be treated as instruction M. In one embodiment, a prefetch triggering a watch-point activity will also terminate a watchpoint, as described in step 1060 in FIG. 10, and the ACD information associated with the event will record the fact that the triggering operation was a prefetch operation. In an alternative embodiment, a prefetch triggering a watch-point activity will not terminate a sample operation, as described in step 1060 in FIG. 10. Instead, an entry will be created in ACD stating that a prefetch operation occurred and necessary ACD data, such as reuse distance may be recorded in the ACD. A timestamp indicating when the watchpoint was started will be altered to the point in time the prefetch was performed.

When analyzing performance data collected from an execution, the effectiveness of prefetch operations can be determined. Examples of such an analysis include methods that determine if there execution makes any more accesses to the prefetched data and further determines: if those accesses are done sufficiently close in time for a high likelihood of a cache hit; if those accesses would have had a high likelihood of a cache miss if the prefetch was removed; and if the prefetch was performed too far ahead of the next access. In one embodiment the reuse distance of ACD data is used to determine if the prefetch is sufficiently far from the instruction subsequently using the data. In another embodiment the miss ratio of the instruction subsequently using the data is used to determine if the prefetch is placed sufficiently close to the instruction requiring the data.

In another embodiment, the miss ratio of the prefetch instruction is used to determine whether the prefetch instruction is necessary at all, or if data already resided in the cache.

When a performance shortcoming has been detected, the address information associated with it, such as the I1 and I2 instruction may be used to point to the corresponding source code line in the application. One way to perform this mapping is to make use of the debug information, such as DWARF, produced by many compilers. This information can often only link an instruction address to the line in the source code, but not to the specific sub-operation on that source code line. Furthermore, the debug information available from the compiler may not be capable of identifying the data structure associated with the shortcoming. Since a source code line may contain many more possible sub-operations than may actually be responsible for the shortcoming, a more precise method may be needed.

In one embodiment, data chaining is used to follow a data access, associated with a performance shortcoming, backwards or forwards until a write access has been found. The source code line of this write accesses may be determined, for example by using debugging information from a compiler. Since often only one data structure is updated per source code line, finding this source code line may allow the data structure associated with the shortcoming to be identified. In one embodiment, the call stack information associated with each instruction address I1 and I2 is used to uniquely identify instructions from the same call stack scoop.

Presentation

When a performance shortcoming has been identified we may want to transfer the knowledge, i.e., provide information about these shortcomings to a user.

In one embodiment, the shortcomings are associated with the loops of the application. One way to perform the association is to determine if there is a match between (i) the addresses of the program objects of a loop, for example instruction addresses, and (ii) the identifier of the performance shortcoming.

In one embodiment, the summary of the shortcomings associated to each loop are presented to a user. Such summary information may include, but is not limited to, the following summary fields: the total number of cache misses of a loop, the total number of cache misses caused by shortcomings of a loop, the total number of misses for which have been determined to be avoidable, and/or the different types of performance shortcomings. All values may be presented as either an absolute value or as a fraction number (e.g., a suitable ratio), such as the percentage of all cache misses that is determined to occur inside a loop. This information may be sorted in one of many ways, for example by the value of a chosen summary field.

In another embodiment, the user is presented with an information list of the performance shortcomings. Such shortcoming information may include, but are not limited to, the following summary fields: the total number of cache misses caused by a shortcoming, the total number of misses which have been determined to be avoidable, and/or the different types of shortcomings. All values may be presented as either an absolute value or as a fraction number, such as the percentage of all cache misses which is determined to occur due to a shortcoming. This information may be sorted in one of many ways, for example by the value of a chosen summary field.

In one embodiment, the loop-centric and shortcoming-centric embodiments above are combined in a way that allows a user to move between the two schemes.

In one embodiment, performance graphs are presented. The performance graphs contain the miss rate and/or the spatial locality, for example the fraction of each cache line used before eviction from the cache, as a function of cache size.

In one embodiment, the performance graphs may be presented for one or many of the entities; the entire application, each loop, each dependence group, or each instruction, or for any set of instructions, related or otherwise.

In one embodiment, each performance shortcoming has separate information associated with it, such as the identity of the source code line, or the source code lines of the dependence group, where the performance shortcoming has been detected. In one embodiment, the identity of the last writer to the data structure associated with the performance shortcoming is also presented.

In one embodiment, one or many of the references to loops, performance shortcoming, dependence groups, last writer may be implemented, and explanation of the nature of the performance shortcoming, beyond other means may also by represented as and/or accessed by hyperlinks.

In one embodiment, the source code is annotated with information including but not limited to miss rates, spatial locality, performance shortcoming. In another embodiment, separate call stacks leading up to the same instruction are identified and statistics are separated for the different call stacks.

Alternative Implementations

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. It should be noted and understood that certain publications, patents and patent applications mentioned in this specification are indicative of the level of skill in the art to which the invention pertains. All publications, patents, and patent applications are herein incorporated by reference to the same extent as if each individual publication, patent or patent application was specifically and individually indicated to be incorporated by reference in its entirety.

What is claimed is:

1. A method of identifying a cycle of instructions in a program of instructions comprising:
   starting to execute a sequence of operations in response to said program of instructions;
   selecting a set of operations from said sequence of operations;
   recording memory usage information associated with respective operations of said set of operations;
   identifying a partial sequence of operations from said memory usage information;
   a cycle of instructions being a set of instructions corresponding to a cyclic set of operations of said partial sequence of operations that occur between a recurring operation and an immediately subsequent occurrence of said recurring operation, including said recurring operation;

identifying a plurality of call stacks, each operation from the set of operations being associated with a call stack from the plurality of call stacks;

separating a set of call stacks from the plurality of call stacks that are associated with said recurring operation;

identifying and separating statistics associated with the set of call stacks; and annotating a source code associated with the program of instructions with the statistics, the cycle of instructions being selectively terminated in response to a part of a call stack from the plurality of call stacks associated with said immediately subsequent occurrence of said recurring operation being in common with a part of a call stack associated with an earlier occurrence of said recurring operation.

2. The method according to claim 1, further including the step of counting a number of recorded instructions between the recurrences of said recurring operation and to identify said number as the number of instructions executed in said cycle of instructions.

3. The method according to claim 1, wherein said cycle of instructions is only considered if each call stack from the set of call stacks associated with each operation from the cyclic set of operations includes an predetermined call stack part.

4. The method according to claim 1, wherein said step of identifying a partial sequence of operations includes identifying a plurality of sequences of operations and combining said plurality of sequences to form said partial sequence.

5. A method of identifying data-chained instructions in a program of instructions comprising:

starting to execute a sequence of operations in response to said program of instructions;

selecting a set of operations from said sequence of operations;

recording memory usage information associated with respective operations of said set of operations; and based on said memory usage information, detecting an identity of a first operation of said sequence of operations accessing a data object and an identity of a second operation of said sequence of operations accessing said data object so as to identify data-chained instructions;

identifying a plurality of call stacks, each operation from the set of operations being associated with a call stack from the plurality of call stacks;

separating a set of call stacks from the plurality of call stacks that are associated with the data-chained instructions;

identifying and separating statistics associated with the set of call stacks; and annotating a source code associated with the program of instructions with the statistics, the cycle of instructions being selectively terminated in response to a part of a call stack from the plurality of call stacks associated with said immediately subsequent occurrence of said data-chained instructions being in common with a part of a call stack associated with an earlier occurrence of said data-chained instructions.

6. The method according to claim 5 wherein a third operation associated with a third instruction is identified as accessing a same data object as either said first or said second operation and, in response, determining that said third instruction is a data-chain property that is data-chained on the instructions corresponding to said first and said second operation.

7. The method according to claim 6 wherein said data-chain property is only identified in response to said first, second and third operations all having at least a portion of a call stack from the plurality of call stacks associated with the first operation, a call stack from the plurality of call stacks associated with the second operation, and a call stack from the plurality of call stacks associated with the third operation are identical.

8. The method according to claim 7 wherein it is further determined that the data object accessed by a write instruction can be used to identify a data structure accessed by a read instruction, if said write instruction and said read instruction belong to the data-chain property.

9. The method according to claim 7 wherein it is further determined that a first operation and a second operation are data dependent if they belong to the data-chain property and at least one of said operations is of write type.

10. A method of detecting performance shortcomings for a program of instructions comprising:

starting to execute a sequence of operations in response to said program of instructions;

selecting a set of operations from said sequence of operations;

recording memory usage information associated with respective operations of said set of operations;

based on said memory usage information determining for a part of said program of instructions corresponding to said set of operations, at least one of the following properties indicative of a recurring operation:

(i) temporal reuse distance, (ii) spatial reuse distance, (iii) spatial usage; and (iv) a first thread from a set of threads making an access to a portion of a data object and a second thread from the set of threads making an access to the portion of the data object; and based on at least one of said properties determining a performance shortcoming of said program of instructions;

identifying a plurality of call stacks, each operation from the set of operations being associated with a call stack from the plurality of call stacks;

separating a set of call stacks from the plurality of call stacks that are associated with the recurring operation;

identifying and separating statistics associated with the set of call stacks; and annotating a source code associated with the program of instructions with the statistics, the cycle of instructions being selectively terminated in response to a part of a call stack from the plurality of call stacks associated with said immediately subsequent occurrence of said recurring operation being in common with a part of a call stack associated with an earlier occurrence of said recurring operation.

11. The method according to claim 10, wherein:

said selection of set of operations corresponds to a subset of instructions of said program;

wherein said subset of instructions comprises either (i) a single instruction or (ii) several instructions belonging to the same cycle of instructions and further are determined to be data-chained; and, wherein said at least one property and said performance shortcoming are attributed to said subset of instructions.

12. The method according to claim 11, wherein said performance shortcoming is determined to be poor spatial usage if said property spatial usage, for said subset of instructions, is determined to be below a threshold.

13. The method according to claim 12, wherein said spatial usage is with respect to some specific cache size.

14. The method according to claim 11, wherein said performance shortcoming is determined to be inefficient loop nesting, the method further comprising:
- forming a histogram over said spatial reuse distance property; and
- establishing that one or more buckets in said histogram have a reuse distance exceeding a threshold.

15. The method according to claim 11, wherein said performance shortcoming is determined to be inefficient loop nesting if said spatial reuse distance, for said subset of instructions, is higher than a threshold.

16. The method according to claim 11, wherein said performance shortcoming is determined to be sparse data layout if said property spatial usage, for said subset of instructions, is lower than a threshold when evaluated for infinitely large caches.

17. The method according to claim 10, wherein said performance shortcoming is determined to be an unused data reuse blocking opportunity, said method further comprising:
- identifying a spatial or temporal reuse of a data object from one instruction to itself or to another instruction in the same loop; and,
- establishing that either of said properties of spatial reuse distance or temporal reuse distance for said reuse of a data object is greater than a threshold.

18. The method according to claim 10, wherein said performance shortcoming is determined to be unused data reuse loop fusion opportunity, said method further comprising:
- identifying a spatial reuse or temporal reuse of a data object from an instruction in a first loop to an instruction in a different second loop; and
- establishing that either of said properties spatial or temporal reuse distance of said reuse of a data object is above a certain threshold.

19. The method according to claim 10, wherein a predetermined type of said performance shortcoming is used to select a corresponding passage in a manual.

20. The method according to claim 10, wherein the set of threads is a first set of threads, the portion of the data object being a first portion of the data object, said performance shortcoming is determined to be false sharing, said method further comprising:
- identifying a first thread from a second set of threads making an access to a second portion of the data object and a second thread from the second set of threads making an access to the second portion of the data object; the second portion of the data object being of size smaller than a cache line;
- establishing that accesses from threads in said first set of threads cause coherence traffic while accesses from threads in said second set of threads do not cause coherence traffic; and
- establishing that at least one of said accesses is a write operation.

* * * * *